(12) United States Patent
Mao et al.

(10) Patent No.: US 12,434,236 B2
(45) Date of Patent: Oct. 7, 2025

(54) METHODS AND MATERIALS FOR TREATING CANCER

(71) Applicant: The Johns Hopkins University, Baltimore, MD (US)

(72) Inventors: Chih-Ping Mao, Baltimore, MD (US); Shih-Chin Wang, Baltimore, MD (US); Jie Xiao, Baltimore, MD (US); Tzyy Choou Wu, Stevenson, MD (US); Chien-Fu Hung, Timmonium, MD (US)

(73) Assignee: The Johns Hopkins University, Baltimore, MD (US)

( * ) Notice: Subject to any disclaimer, the term of this patent is extended or adjusted under 35 U.S.C. 154(b) by 920 days.

(21) Appl. No.: 17/604,535

(22) PCT Filed: Apr. 24, 2020

(86) PCT No.: PCT/US2020/029879
§ 371 (c)(1),
(2) Date: Oct. 18, 2021

(87) PCT Pub. No.: WO2020/219923
PCT Pub. Date: Oct. 29, 2020

(65) Prior Publication Data
US 2022/0203361 A1    Jun. 30, 2022

Related U.S. Application Data

(60) Provisional application No. 62/839,403, filed on Apr. 26, 2019.

(51) Int. Cl.
*B01L 3/00*    (2006.01)
*G01N 33/58*   (2006.01)
*G01N 33/68*   (2006.01)

(52) U.S. Cl.
CPC ... *B01L 3/502707* (2013.01); *B01L 3/502715* (2013.01); *G01N 33/582* (2013.01);
(Continued)

(58) Field of Classification Search
None
See application file for complete search history.

(56) References Cited

U.S. PATENT DOCUMENTS

2012/0264646 A1* 10/2012 Link ............... C12Q 1/6851
435/23
2016/0319361 A1    11/2016 Spetzler et al.
(Continued)

FOREIGN PATENT DOCUMENTS

WO    WO 2017034970    3/2017
WO    WO 2018058085    3/2018

OTHER PUBLICATIONS

Bardelli et al., "Liquid Biopsies, What We Do Not Know (Yet)," Cancer Cell, Feb. 13, 2017, 31(2):172-179.
(Continued)

*Primary Examiner* — Lore R Jarrett
(74) *Attorney, Agent, or Firm* — Fish & Richardson P.C.

(57) ABSTRACT

This document relates to methods and materials for assessing and/or treating mammals (e.g., humans) having, or suspected of having, cancer. For example, methods and materials for identifying a mammal as having cancer are provided. For example, microfluidic devices that can be used to detect one or more target polypeptides (e.g., cancer-specific polypeptides) in a fluid sample obtained from a mammal (e.g., a mammal suspected of having cancer) are provided.

12 Claims, 25 Drawing Sheets

Specification includes a Sequence Listing.

(52) U.S. Cl.
CPC ..... *G01N 33/6854* (2013.01); *G01N 33/6893* (2013.01); *B01L 2200/12* (2013.01); *B01L 2200/16* (2013.01); *B01L 2300/0819* (2013.01); *B01L 2300/0867* (2013.01); *B01L 2300/163* (2013.01)

(56) References Cited

U.S. PATENT DOCUMENTS

| | | | |
|---|---|---|---|
| 2017/0233781 A1* | 8/2017 | Iverson | C12Y 207/10001 424/133.1 |
| 2018/0307005 A1 | 10/2018 | Price et al. | |

OTHER PUBLICATIONS

Bell et al., The Cancer Genome Atlas Research Network, "Integrated Genomic Analyses of Ovarian Carcinoma," Nature, 2011, 474(7353):609-615.
Bettegowda et al., "Detection of Circulating Tumor DNA in Early- and Late-Stage Human Malignancies," Sci Transl Med, Feb. 19, 2014, 6(224):224ra24, 11 pages.
Carlson et al., "Somatic integration of an oncogene-harboring Sleeping Beauty transposon models liver tumor development in the mouse," Proceedings of the National Academy of Sciences, 2005, 105:17059-17064.
Charles et al., "Reduction of Non-Specific Protein Adsorption Using Poly(ethylene) Glycol (PEG) Modified Polyacrylate Hydrogels in Immunoassays for Staphylococcal Enterotoxin B Detection," Sensors, Jan. 23, 2009, 9:645-655.
Cohen et al., "Combined circulating tumor DNA and protein biomarker-based liquid biopsy for the earlier detection of pancreatic cancers," Proc Natl Acad Sci, Sep. 19, 2017, 114(38):10202-10207.
Cohen et al., "Detection and localization of surgically resectable cancers with a multi-analyte blood test," Science, Feb. 23, 2018, 359:926-930.
Diamandis, "The failure of protein cancer biomarkers to reach the clinic: why, and what can be done to address the problem?," BMC Med, Aug. 9, 2012, 10:87, 5 pages.
Fredriksson et al., "Multiplexed protein detection by proximity ligation for cancer biomarker validation," Nature Methods, Apr. 2007, 4(4):327-329.
Fredriksson et al., "Protein detection using proximity-dependent DNA ligation assays," Nature Biotechnology, May 2002, 20:473-477.
Giljohann et al., "Drivers of biodiagnostic development," Nature, Nov. 26, 2009, 462:461-464.
Hartwell et al., "Cancer biomarkers: a systems approach," Nature Biotechnology, Aug. 2006, 24(8):905-908.
Hill et al., "The bio-barcode assay for the detection of protein and nucleic acid targets using DTT-induced ligand exchange," Nature Protocols, Jun. 29, 2006, 1(1):324-336.
International Preliminary Report on Patentability in Appl. No. PCT/US2020/029879, dated Sep. 28, 2021, 7 pages.
International Search Report and Written Opinion in International Application No. PCT/US2020/029879, dated Aug. 13, 2020, 8 pages.

Jain et al., "Probing cellular protein complexes using single-molecule pull-down," Nature, May 26, 2011, 473:484-488.
Jain et al., "Single-molecule pull-down for studying protein interactions," Nature Protocols, Feb. 9, 2012, 7(3):445-452.
Kaier et al., "Cardiac Myosin-Binding Protein C to Diagnose Acute Myocardial Infarction in the Pre-Hospital Setting," Journal of the American Heart Association, Aug. 6, 2019, 8:e013152, 42 pages.
Lee et al., "p53, secreted by K-Ras-Snail pathway, is endocytosed by K-Ras-mutated cells; implication of target-specific drug delivery and early diagnostic marker," Oncogene, Apr. 6, 2009, 28:2005-2014.
Levine et al., "The first 30 years of p53: growing ever more complex," Nat Rev Cancer, Oct. 2009, 9(10):749-758.
Lin et al., "Treatment of Established Tumors with a Novel Vaccine That Enhances Major Histocompatibility Class II Presentation of Tumor Antigen," Cancer Research, Jan. 1, 1996, 56:21-26.
Mao et al., "Protein detection in blood with single-molecule imaging," Sci Adv. Aug. 11, 2021, 7(33):eabg6522.
Muller et al., "Mutant p53 in Cancer: New Functions and Therapeutic Opportunities," Cancer Cell, Mar. 17, 2014, 25(3):304-317.
Muller et al., "p53 mutations in cancer," Nature Cell Biology, Jan. 2013, 15(1):2-8.
Nam et al., "Nanoparticle-Based Bio-Bar Codes for the Ultrasensitive Detection of Proteins," Science, Sep. 26, 2003, 301:1884-1886.
Niemeyer et al., "Detecting antigens by quantitative immuno-PCR," Nature Protocols, Aug. 2, 2007, 2(8):1918-1930.
Ovesny et al., "ThunderStorm: a comprehensive ImageJ plug-in for Palm and Storm data analysis and super-resolution imaging," Bioinformatics, Apr. 25, 2014, 30(16):2389-2390.
Polanski et al., "A List of Candidate Cancer Biomarkers for Targeted Proteomics," Biomark Insights, Jan. 1, 2007, 1:1-48.
Rissin et al., "Single-molecule enzyme-linked immunosorbent assay detects serum proteins at subfemtomolar concentrations," Nature Biotechnology, Jun. 2010, 28(6):595-599.
Ruzicka et al., "Immuno-PCR with a Commercially Available Avidin System," Science, Apr. 30, 1993, 260:698-699.
Sano et al., "Immuno-PCR: Very Sensitive Antigen Detection by Means of Specific Antibody-DNA Conjugates," Science, Oct. 2, 1992, 258:120-122.
Soussi, "p53 Antibodies in the sera of patients with various types of cancer: a review," Cancer Research, 2000, 60:1777-1788.
Stroock et al., "Chaotic Mixer for Microchannels," Science, Jan. 25, 2002, 295(5555):647-651.
Thaxton et al., "Nanoparticle-based bio-barcode assay redefines "undetectable" PSA and biochemical recurrence after radical prostatectomy," Proc Natl Acad Sci, Nov. 3, 2009, 106(44):18437-18442.
Todd et al., "Ultrasensitive flow-based immunoassays using single-molecule counting," Clinical chemistry, Nov. 2007, 53(11):1990-1995.
Wang et al., "Mutant proteins as cancer-specific biomarkers," Proc Natl Acad Sci, Feb. 8, 2011, 108(6):2444-2449.
Yeung et al., "Evaluation of highly sensitive immunoassay technologies for quantitative measurements of sub-pg/mL levels of cytokines in human serum," Journal of immunological methods, Oct. 2016, 437:53-63.

* cited by examiner

METHODS AND MATERIALS FOR TREATING CANCER

CROSS-REFERENCE TO RELATED APPLICATIONS

This application is a National Stage application under 35 U.S.C. § 371 of International Application No. PCT/US2020/029879 having an International Filing Date of Apr. 24, 2020, which claims the benefit of U.S. Provisional Application No. 62/839,403, filed Apr. 26, 2019; the contents of which are hereby incorporated by reference in its entireties.

STATEMENT REGARDING FEDERAL FUNDING

This invention was made with government support under grant CA098252, CA096784, CA114425, CA194896, and CA177221 awarded by the National Institutes of Health. The government has certain rights in the invention.

SEQUENCE LISTING

This document includes a sequence listing that has been submitted electronically as an ASCII text file named sequencelisting.txt. The ASCII text file, created on Oct. 15, 2021, is 1.33 kilobytes in size. The material in the ASCII text file is hereby incorporated by reference in its entirety.

BACKGROUND

1. Technical Field

This document relates to methods and materials for assessing and/or treating mammals (e.g., humans) having cancer. For example, this document provides methods and materials for identifying a mammal as having cancer. For example, this document provides microfluidic devices that can be used to detect one or more target polypeptides (e.g., cancer-specific polypeptides) in a fluid sample obtained from a mammal (e.g., a mammal suspected of having cancer).

2. Background Information

Recently, 'liquid biopsies' designed for circulating tumor DNA (ctDNA) and a panel of tumor-associated proteins demonstrated promising results for identifying multiple cancer types at a surgically resectable stage (Cohen et al., 2018 *Science*, 359:926-930). While ctDNA is cancer-specific, it exists at extremely low levels (below one copy per ml plasma) in early-stage cancer (Cohen et al., 2018 Science, 359:926-930; Bardelli et al., 2017 *Cancer cell* 31:172-179; Cohen et al., 2017 *Proc Natl Acad Sci USA* 114:10202-10207; and Bettegowda et al., 2014 *Sci Transl Med* 6:224ra224). By comparison, tumor-derived proteins are more abundant than ctDNA and hence offer a more reliable source for early cancer detection. Current blood tests for tumor-derived proteins largely focus on extracellular (i.e. secreted or membrane outer leaflet-associated) proteins due to their accessibility (Polanski, 2007 *Biomark Insights* 1:1-48), but many of these extracellular proteins are often found in the blood of healthy individuals and are thus not disease-specific (Diamandis, 2012 *BMC Med* 10:87). Tumor-derived intracellular proteins—in particular mutant or viral oncoproteins, as well as mutant tumor suppressor proteins—are exquisitely cancer-specific, essentially analogous to (but in higher copy number than) their corresponding ctDNA. The release of these intracellular tumor-specific proteins (ITSPs) has been observed in vitro (Lee et al., 2009 *Oncogene* 28:2005-2014); however, their presence in blood has not been reported, likely due to their low release levels.

SUMMARY

Conventional cancer biomarker detection methods, such as ELISA, are typically unable to measure protein concentrations lower than $10^{-12}$M (Giljohann et al., 2009 *Nature* 462:461-464), and circulating ITSPs are likely present in concentrations far below this (Wang et al., 2011 *Proc Natl Acad Sci USA* 108:2444-2449). Newer technologies including digital ELISA (Rissin et al., 2010 *Nat Biotechnol* 28:595-599), DNA biobarcoding (Hill et al., 2006 *Nat Protoc* 1:324-336; Nam et al., 2003 *Science* 301:1884-1886; and Thaxton et al., 2009 *Proc Natl Acad Sci USA* 106:18437-18442), proximity ligation (Fredriksson et al., 2007 *Nat Methods* 4:327-329; and Fredriksson et al., 2002 *Nat Biotechnol* 20:473-477), and immuno-PCR (Niemeyer et al., 2007 *Nat Protoc* 2:1918-1930; Ruzicka et al., 1993 *Science* 260:698-699; and Sano et al., 1992 *Science* 258:120-122) have been developed to improve the sensitivity of protein assays to the femtomolar (fM; $10^{-15}$ M) or attomolar (aM; $10^{-18}$M) range (Giljohann et al., 2009 *Nature* 462:461-464), but these methods are susceptible to detection errors from background or non-specific binding of the detection reagent (Hartwell et al., 2006 *Nat Biotechnol* 24:905-908).

This document provides methods and materials for assessing and/or treating mammals (e.g., humans) having, or suspected of having, cancer. For example, this document provides microfluidic devices that can be used to detect one or more target polypeptides (e.g., cancer-specific polypeptides such as, without limitation, ITSPs) in a fluid sample obtained from a mammal (e.g., a mammal suspected of having cancer) with high sensitivity (e.g., sub-fM sensitivity) and with minimal detection errors (e.g., errors from background or errors from non-specific binding). This document also provides methods for making and using such microfluidic devices. For example, microfluidic devices provided herein can be used for detecting one or more cancer-specific polypeptides in a fluid sample obtained from a mammal (e.g., a mammal suspected of having cancer).

As demonstrated herein, a single-molecule imaging-based technology (e.g., Single-Molecule Augmented Capture (SMAC) or Single-Molecule Analysis by Shape (SMASH)) can be used to capture and quantify rare circulating tumor-specific proteins with minimal detection errors. For example, a novel single-molecule imaging approach was used to detect sub-fM amounts of circulating mutant p53 proteins, the gene most commonly altered in human cancer, or its autoantibodies in close to 90% of ovarian cancer patients but not in any healthy subjects. Detection of circulating ITSPs can be used in a sensitive, robust assay and can provide opportunities for early cancer detection and profiling.

Having the ability to identify miniscule amounts of mutant proteins shed from tumor cells into the bloodstream can create opportunities for specific, minimally invasive cancer detection and profiling. For example, blood tests offer an attractive, minimally invasive approach to detect, diagnose, monitor, and/or treat cancers as well as a minimally invasive approach to monitor the efficacy of cancer treatments. In addition, the analysis of circulating ITSPs opens new avenues for identifying and profiling human cancer. For example, insights garnered from single-molecule imaging approaches described herein can be used to shed light on the pathologic processes, such as dysfunctional signaling pathways or gene expression networks, or immune recognition of tumor antigens, unfolding within the tumor of individual cancer patients and point to effective management strategies. For example, insights garnered from single-molecule imaging approaches described herein can also be used to investigate cancer-associated proteins that naturally form complexes or different permutations of proteins within these complexes. Notably, the design of single-molecule imaging approaches described herein can be readily adapted into multiplex or high-throughput formats, which would enable large-scale, parallel profiling of ITSPs and their associated complexes.

In general, one aspect of this document features microfluidic chips. Microfluidic chips provided herein can include a capture surface including a plurality of multi-valent capture antibodies, where the capture surface has a side comprising a poly(ethylene)glycol (PEG) coating; and a chip enclosure including a flow channel disposed on the capture surface, where the flow channel is in fluid contact with the capture surface, and where the flow channel includes patterned grooves on an inner channel surface. The capture surface can have an area of 22 mm×22 mm. The capture surface can include borosilicate glass. The PEG coating can include methoxy (PEG) succinimidyl valerate (mPEG-SVA). The PEG coating can include a plurality of biotin moieties (biotin-PEG moieties). The capture antibodies can be conjugated to the biotin-PEG moieties via an avidin linker. The avidin linker can be a deglycosylated avidin linker. Each of the avidin linkers can conjugate three capture antibodies to each biotin-PEG moiety. The patterned grooves can include arrays of staggered herringbone grooves.

In another aspect, this document features methods for detecting a target polypeptide in a fluid sample. The methods can include, or consist essentially of, providing a microfluidic chip including a) a capture surface including a plurality of multi-valent capture antibodies, where the capture surface can have a side including a biotin-poly(ethylene)glycol (PEG) coating, the said capture antibodies can be conjugated to the biotin-PEG moieties via a deglycosylated avidin linker, and where each of the avidin linkers conjugates a plurality of capture antibodies to each biotin moiety on the biotin-PEG coating; and b) a chip enclosure including a flow channel disposed on the capture surface, where the flow channel is in fluid contact with the capture surface, and where the flow channel can include staggered herringbone grooves on an inner channel surface; infusing the fluid sample through the flow channel of the microfluidic chip under conditions that, when the target polypeptide is present in the fluid sample, the capture antibodies can bind to the target polypeptide; infusing fluorophore-labeled detection antibodies through the flow channel of the microfluidic chip under conditions that, when the target polypeptide is bound to the capture antibodies, the fluorophore-labeled detection antibodies can bind to the target polypeptide; imaging the presence or absence of the fluorophore-labeled detection antibodies in at least 10 regions of the capture surface, where the imaging can include time-stream total internal reflection (TIRF) microscopy, where the imaging can spatially resolve individual clusters of target proteins, and where each cluster is a fluorescent spot; determining a number of fluorescent counts, where the determining can include generating 2D scatter plots of $\sigma$ and intensity of each fluorescence spot, converting the 2D scatter plots into 2D histograms, converting the 2D scatter plots into a heat map, and correcting for detection errors; and determining the presence of the target polypeptide, where the number of fluorescent counts corresponds to the presence of the target polypeptide. The target polypeptide can be present in the sample in sub-femtomolar amounts. The converting the 2D scatter plots into heat maps can include calculating a mean count and standard deviation of count in each bin of the heat map. The correcting for detection errors can include subtracting the mean of each bin by a sum of a mean count and two times a standard deviation of a reference sample. The infusing can include an oscillating flow. The fluorophore-labeled detection antibodies can include an Alexa Fluor dye. The TIRF microscopy can be single-molecule TIRF microscopy. Each imaged region of the capture surface can be about 80 μm apart. The mammal can be a human. The sample can be a blood sample, a saliva sample, or a urine sample. When the sample is a blood sample, the blood sample can be a plasma sample. The target polypeptide can be a tumor-specific antigen. The tumor-specific antigen can be a mutant p53. The tumor-specific antigen can be an anti-p53 autoantibody. The cancer can be lung cancer, liver cancer, pancreatic cancer, ovarian cancer, bladder cancer, breast cancer, colon cancer, endometrial cancer, cervical cancer, renal cell cancer, leukemia, bile duct cancer, melanoma, Hodgkin lymphoma, non-Hodgkin lymphoma, prostate cancer, or thyroid cancer. The method also can include administering one or more cancer treatments to the mammal, where the one or more cancer treatments can include surgery, chemotherapy, hormone therapy, targeted therapy, radiation therapy, or combinations thereof.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
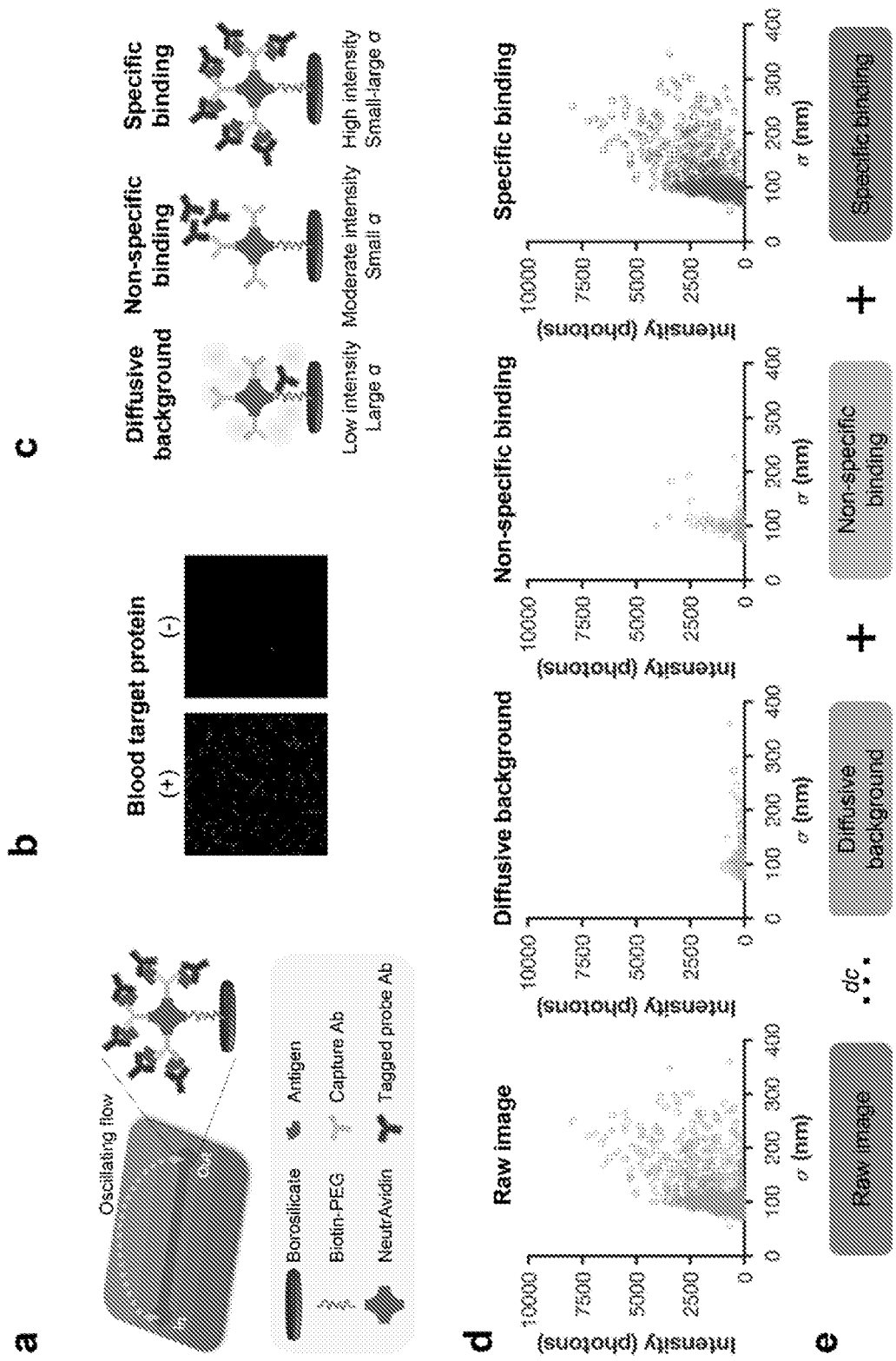
FIG. 1. Single-molecule imaging-based technology and protein analysis methods. a, Schematic diagram of the SMAC platform. Proteins-of-interest were pulled down as clusters via continuous oscillating flow on a multivalent microfluidic device and then probed with fluorophore-labeled detection antibody. b, Target protein clusters were visualized by TIRF microscopy. c, Schematic diagrams depicting different binding types that give rise to different fluorescence intensity and spot size combinations. d, e, Scatter plots (d) and decomposition (e) of spot size ($\sigma$) and intensity arising from different binding types after Gaussian fitting of each spot. These data were converted into a two-dimensional (2D) histogram of intensity and $\sigma$ as shown in f f, The number of specific binding spots (SR counts) is obtained by subtracting the 2D histogram of a scaled reference histogram conveying the intensity-$\sigma$ distributions of diffusive background and non-specific binding from the 2D histogram of raw counts. g, SMAC images of purified GFP molecules at sub-fM concentrations. The intrinsic fluorescence of GFP was measured without detection antibody. h, Graph illustrating the sensitivity of SMAC with shape analysis (SR counts) using purified GFP from 10 aM to 1 fM. A sample was considered positive if the number of counts two standard deviations below the mean number of SR counts was ≥1. Data are expressed as mean±SD. Scale bar, 4 μm.
Figure 1:
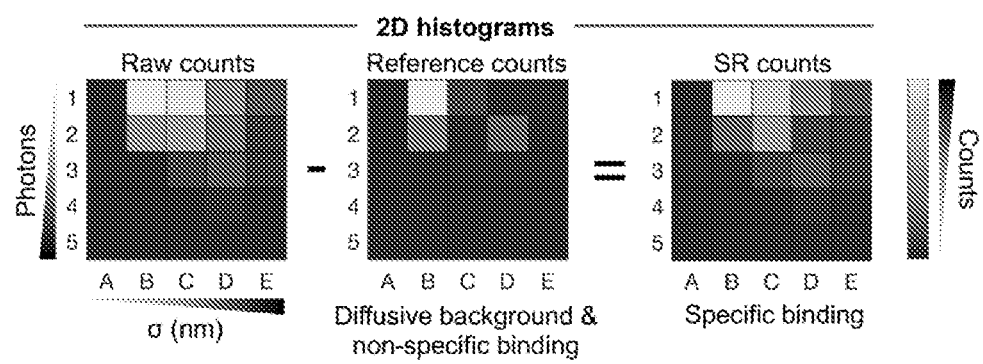
Figure 1:
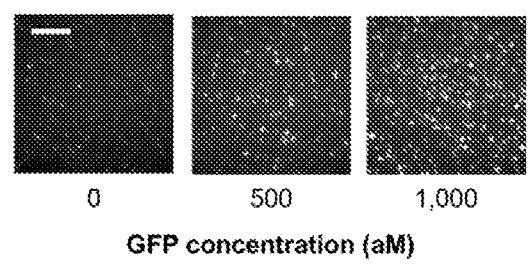
Figure 1:
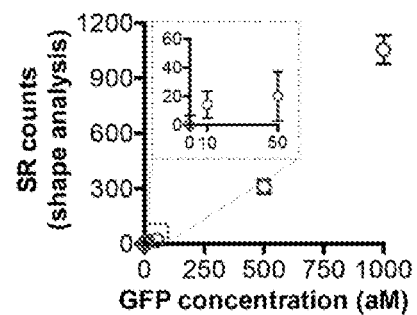

This document provides microfluidic devices that can be used to detect one or more target polypeptides (e.g., cancer-specific polypeptides such as, without limitation, ITSPs) in a sample obtained from a mammal (e.g., a mammal suspected of having cancer); as well as methods for using such microfluidic devices. As described herein, microfluidic devices provided herein can be used in single-molecule imaging-based technologies (e.g., SMAC or SMASH) to capture and quantify rare circulating tumor-specific proteins high sensitivity (e.g., sub-fM sensitivity) and with minimal detection errors (e.g., errors from background or errors from non-specific binding). In some cases, the methods and materials described herein can determine a fluorescent shape distribution of disease-associated polypeptide clusters that are pulled down by a capture antibody and probed by a fluorophore-labeled detection antibody on a microfluidic chip, and can use this information to discriminate disease-associated polypeptides from non-specifically absorbed background. For example, a microfluidic chip provided herein can be used in methods for detecting an intracellular target polypeptide present in a fluid sample in sub-femtomolar amounts. A schematic diagram of an exemplary single-molecule imaging-based technology is shown in FIG. 1.

Microfluidic devices provided herein can be used to detect one or more target polypeptides (e.g., cancer-specific polypeptides such as, without limitation, ITSPs) in a sample (e.g., a fluid sample obtained from a mammal such as a mammal suspected of having cancer) with high sensitivity. For example, the methods and materials described herein can be used to detect sub-fM amounts of a target polypeptide (e.g., a target polypeptide associated with a disease, disorder, or condition). In some cases, a microfluidic device can be used to detect a target polypeptide present in a sub-picomolar (pM) concentration. For example, a microfluidic device can such as, without limitation, ITSPs detect a target polypeptide present in a concentration lower than 10$^{-12}$ M in a sample. In some cases, a microfluidic device can be used to detect a target polypeptide present in a sub-fM concentration. For example, a microfluidic device can be used to detect a target polypeptide present in a concentration lower than 10$^{-15}$ M in a sample. For example, a microfluidic device can be used to detect a target polypeptide present in a sample with a sensitivity of <10 fM. In some cases, a microfluidic device can be used to detect a target polypeptide present in a sub-aM concentration. For example, a microfluidic device be used to can detect a target polypeptide present in a concentration lower than 10$^{-18}$ M in a sample. For example, a microfluidic device can be used to detect a target polypeptide present in a sample with a sensitivity of <500 aM.

Microfluidic devices provided herein can be used to detect one or more target polypeptides (e.g., cancer-specific polypeptides such as, without limitation, ITSPs) in a sample (e.g., a sample obtained from a mammal such as a mammal suspected of having cancer) with minimal detection errors (e.g., errors from background or errors from non-specific binding). For example, the methods and materials described herein can be used to detect circulating disease-associated polypeptides with minimal detection errors. In some cases, a detection error can be from background binding of an auto-fluorescent compound (e.g., an auto-fluorescent substance within a sample such as a blood sample). For example, the methods and materials provided herein can be used to determine the 'fluorescence shape' of individual clusters of target polypeptides that are pulled down out of a sample by one or more capture antibodies and probed by one or more fluorophore-labeled detection antibodies, and this information can be used to discriminate target polypeptides from non-specifically absorbed background (FIG. 1).

Microfluidic devices provided herein (e.g., microfluidic devices that can be used to detect one or more target polypeptides (e.g., cancer-specific polypeptides such as, without limitation, ITSPs) can include a capture surface having a plurality of capture antibodies (e.g., multi-valent capture antibodies); and a chip enclosure having one or more flow channels disposed on the capture surface where the one or more flow channels are in fluid contact with the capture surface, and where the one or more flow channels include a micromixer.

A capture surface can be any appropriate size. In some cases, a capture surface can have any appropriate thickness. For example, a capture surface can have a thickness of from about 1 μm to about 1000 μm (e.g., from about 1 μm to about 750 μm, from about 1 μm to about 600 μm, from about 1 μm to about 500 μm, from about 1 μm to about 400 μm, from about 1 μm to about 300 μm, from about 1 μm to about 200 μm, from about 1 μm to about 100 μm, from about 1 μm to about 50 μm, from about 1 μm to about 30 μm, from about 1 μm to about 20 μm, from about 10 μm to about 1000 μm, from about 50 μm to about 1000 μm, from about 100 μm to about 1000 μm, from about 200 μm to about 1000 μm, from about 300 μm to about 1000 μm, from about 400 μm to about 1000 μm, from about 500 μm to about 1000 μm, from about 600 μm to about 1000 μm, from about 750 μm to about 1000 μm, from about 25 μm to about 800 μm, from about 50 μm to about 500 μm, from about 100 μm to about 300 μm, from about 50 μm to about 250 μm, from about 250 μm to about 500 μm, or from about 500 μm to about 750 μm). For example, a capture surface can have a thickness of about 130 μm to about 170 μm. In some cases, a capture surface can have any appropriate length. For example, a capture surface can have a length of from about 1 mm to about 100 mm (e.g., from about 1 mm to about 80 mm, from about 1 mm to about 50 mm, from about 1 mm to about 30 mm, from about 1 mm to about 25 mm, from about 10 mm to about 100 mm, from about 20 mm to about 100 mm, from about 25 mm to about 100 mm, from about 50 mm to about 100 mm, from about 15 mm to about 75 mm, from about 25 mm to about 50 mm, from about 10 mm to about 25 mm, or from about 25 mm to about 50 mm). For example, a capture surface can have a length of about 22 mm. In some cases, a capture surface can have any appropriate width. For example, a capture surface can have a width of from about 1 mm to about 100 mm (e.g., from about 1 mm to about 80 mm, from about 1 mm to about 50 mm, from about 1 mm to about 30 mm, from about 1 mm to about 25 mm, from about 10 mm to about 100 mm, from about 20 mm to about 100 mm, from about 25 mm to about 100 mm, from about 50 mm to about 100 mm, from about 15 mm to about 75 mm, from about 25 mm to about 50 mm, from about 10 mm to about 25 mm, or from about 25 mm to about 50 mm). For example, a capture surface can have a width of about 22 mm. A capture surface can be any appropriate shape (e.g., a square, a rectangle, and a circle). In some cases, a capture surface can have any appropriate area. For example, when a capture surface is a square, the capture surface can have an area of about 1 mm×1 mm. For example, when a capture surface is a square, the capture surface can have an area of about 22 mm×22 mm.

A capture surface can include any appropriate number of antibodies. A capture surface can include any capture antibodies in any appropriate density. In some cases, a plurality of capture antibodies can include from about $10^3$ antibodies to about $10^6$ antibodies (e.g., from about $10^3$ antibodies to about $10^5$ antibodies, from about $10^3$ antibodies to about $10^4$ antibodies, from about $10^4$ antibodies to about $10^6$ antibodies, from about $10^5$ antibodies to about $10^6$ antibodies, or from about $10^4$ antibodies to about $10^5$ antibodies) per $\mu m^2$ of a capture surface.

A capture surface can include any appropriate material(s). In some cases, a material can be a biocompatible material. In some cases, a material can be a sterile material. Examples of materials that can be used for a capture surface include, without limitation, glass (e.g., borosilicate glass and quartz) and polymeric materials (e.g., silicon, PDMS, polystyrene, polycarbonate, polyvinylchloride, polymethyl methacrylate, and cyclic olefin copolymer). For example, a capture surface can include borosilicate glass. In some cases, a capture surface include (e.g., can be coated with) one or more additional materials. For example, a capture surface can have 2 sides (e.g., a top surface and a bottom surface) where one side (e.g., a top surface) is coated, and one (e.g., a bottom surface) side is uncoated. In some cases, a coating can be a continuous coating. In some cases, a coating can be a discontinuous coating. A coating can include any appropriate material(s). In some cases, a coating can include one or more polymers. As used herein, a "polymer" is a compound formed by covalently linking smaller molecules termed "monomers" into a covalently bonded chain. The monomers present in a polymer molecule can be the same or different. If the monomers are the same, the polymer may also be called a homopolymer. If the monomers are different, the polymer may also be called a copolymer. A polymer can be obtained from a commercial source or be synthesized from the polymerization of a desired monomer or combination of different monomers. Examples of polymers include, without limitation, poly(ethylene glycol) (PEG), methoxypoly(ethylene glycol) succinimidyl valerate (mPEG-SVA), polyacrylamide, poly(acrylic acid), poly(N-hydroxyethyl acrylamide), poly(2-hydroxyethyl methacrylate), poly(2-methacryloyloxyethyl phosphorylcholine), poly(vinyl alcohol), poly(vinyl pyrrolidone), hydroxyethylcellulose, hydroxypropyl methylcellulose, dextran, and hyaluronic acid. In some cases a polymer can include PEG PEGs are typically characterized by MW. For example, "$PEG_{5000}$" typically denotes a preparation that includes a mixture of oligomers having an average MW of 5000 g/mol. In some embodiments, PEG may have an average MW of from about 2000 g/mol to about 20000 g/mol (e.g., about 2000 g/mol to about 15000 g/mol, about 2000 g/mol to about 12000 g/mol, about 2000 g/mol to about 10000 g/mol, about 2000 g/mol to about 8000 g/mol, about 2000 g/mol to about 5000 g/mol, about 4000 g/mol to about 20000 g/mol, about 5000 g/mol to about 20000 g/mol, about 8000 g/mol to about 20000 g/mol, about 10000 g/mol to about 20000 g/mol, about 15000 g/mol to about 20000 g/mol, about 4000 g/mol to about 15000 g/mol, about 5000 g/mol to about 12000 g/mol, about 8000 g/mol to about 10000 g/mol, about 3000 g/mol to about 5000 g/mol, or about 5000 g/mol to about 10000 g/mol). For example, a capture surface can include (e.g., can be coated with) a polymer that includes PEG having an average MW of 5000 g/mol. In some cases, a polymer can include one or more moieties that can bind to one or more molecules (e.g., one or more capture antibodies and/or one or more linkers). Examples of moieties that can bind to one or more capture antibodies and/or one or more linkers include, without limitation, biotin, SVA, aminosilane, and other silane coupling reagents (e.g., reagents that contain vinyl, epoxy, acryloxy, methacryloxy, styryl, isocyanurate, ureide, sulfide, isocyanate, or mercapto groups). For example, a polymer including one or more moieties that can bind to one or more capture antibodies and/or one or more linkers can be a biotin-PEG polymer (e.g., a biotin-mPEG-SVA polymer). In some cases, a capture surface can include (e.g., can be coated with) a biotin-mPEG-SVA polymer.

A capture surface can include any appropriate capture antibody. As used herein, the term "antibody" includes whole antibodies, antibody fragments, and antibody derivatives provided that the fragment or derivative contains at least one antigen-binding domain and maintains the ability to bind, directly or indirectly, to a target polypeptide. Examples of antibodies include, without limitation, single-chain variable fragments (scFvs), single domain antibodies (sdAbs), antigen-binding (Fab) fragments (e.g., Fab' or (Fab)$_2$), Fv fragments, polyclonal antibodies, monoclonal antibodies, bispecific antibodies, diabodies, bi-specific T-cell engagers (BiTEs), bivalent single-chain variable fragments (bi-scFvs), trispecific (trifunctional) antibodies (also referred to as triabodies or tribodies), VHH-scAb, a VHH-Fab, a dual scFab, a F(ab')$_2$, a crossMab, a DAF (two-in-one), a DAF (four-in-one), a DutaMab, a DT-IgG, a knobs-in-holes common light chain, a knobs-in-holes assembly, a charge pair, a Fab-arm exchange, a SEEDbody, a LUZ-Y, a Fcab, a KX-body, an orthogonal Fab, a DVD-IgG, a IgG (H)-scFv, a scFv-(H)IgG, IgG(L)-scFv, scFv-(L)IgG, IgG (L,H)-Fv, IgG(H)-V, V(H)—IgG, IgG(L)-V, V(L)-IgG, KIH IgG-scFab, 2scFv-IgG, IgG-2scFv, scFv4-Ig, Zybody, DVI-IgG, diabody-CH$_3$, a triple body, a miniantibody, a minibody, a TriBi minibody, scFv-CH$_3$ KIH, Fab-scFv, a F(ab')$_2$-scFv$_2$, a scFv-KIH, a Fab-scFv-Fc, a tetravalent HCAb, a scDiabody-Fc, a diabody-Fc, a tandem scFv-Fc, an Intrabody, a dock and lock, a ImmTAC, an IgG-IgG conjugate, a Cov-X-Body, a scFv1-PEG-scFv$_2$ and other antibody-like molecules. In some cases, an antibody, antibody fragment, or antibody derivative can be monospecific (e.g., can bind a single target polypeptide). In some cases, an antibody, antibody fragment, or antibody derivative can be multispecific (e.g., can simultaneously bind to multiple (e.g., two, three, or more) target polypeptides). For example, a multispecific antibody, antibody fragment, or antibody derivative can be a bispecific antibody, antibody fragment, or antibody derivative (e.g., can simultaneously bind to two target polypeptides). For example, a multispecific antibody, antibody fragment, or antibody derivative can be a trispecific antibody, antibody fragment, or antibody derivative (e.g., can simultaneously bind to three target polypeptides). Examples of multispecific antibodies include, without limitation, bispecific antibodies, bi-scFvs, BiTEs, diabodies, dual-affinity re-targeting antibodies, and trispecific antibodies. An antibody, antibody fragment, or antibody derivative can be of any class (e.g., IgQ IgA, IgM). An antibody, antibody fragment, or antibody derivative can be naturally occurring or can be artificial. In some cases, an antibody, antibody fragment, or antibody derivative fragment can be chimeric. In some cases, an antibody, antibody fragment, or antibody derivative can be humanized. In some cases, an antibody, antibody fragment, or antibody derivative can be human antibody, antibody fragment, or antibody derivative.

In some cases, a capture surface can include capture antibodies targeting a single target polypeptide (e.g., a single cancer-specific polypeptide). For example, antibodies targeting a single polypeptide can bind the same epitope on the polypeptide. For example, antibodies targeting a single polypeptide can bind different epitopes on the polypeptide.

In some cases, a capture surface can include capture antibodies targeting two or more target polypeptides. For example, a capture surface can include from about 2 to about 1000 (e.g., from about 2 to about 1000, from about 2 to about 800, from about 2 to about 700, from about 2 to about 600, from about 2 to about 500, from about 2 to about 400, from about 2 to about 300, from about 2 to about 200, from about 2 to about 100, from about 2 to about 50, from about 2 to about 25, from about 5 to about 1000, from about 10 to about 1000, from about 25 to about 1000, from about 50 to about 1000, from about 100 to about 1000, from about 200 to about 1000, from about 300 to about 1000, from about 400 to about 1000, from about 500 to about 1000, from about 600 to about 1000, from about 700 to about 1000, from about 800 to about 1000, from about 25 to about 750, from about 50 to about 500, from about 100 to about 250, from about 250 to about 500, or from about 500 to about 750) capture antibodies targeting a two or more target polypeptides. In some cases, a plurality (e.g. 2, 3, 4, 5, 6, 7, 8, 9, 10, or more) of chips could be chained together (e.g., in any appropriate configuration) to include capture antibodies targeting two or more target polypeptides.

A capture antibody can be directly or indirectly conjugated to a capture surface. In some cases, a capture antibody can be conjugated (e.g., directly conjugated or indirectly conjugated) to a capture surface by one or more covalent bonds. In some cases, a capture antibody can be conjugated (e.g., directly conjugated or indirectly conjugated) to a capture surface by one or more non-covalent bonds (e.g., interactions such as electrostatic interactions, π-effects, van der Waals forces, and hydrophobic effects).

In some cases, when a capture antibody is indirectly conjugated to a capture surface, the capture antibody can be conjugated to the capture surface via a linker. For example, a capture antibody can be conjugated to a linker which can be conjugated to a capture surface. A linker can be any appropriate type of linker. Examples of linkers include, without limitation, polypeptide linkers, nucleic acid linkers, biotin, polymer-based linkers (e.g., PEG polyacrylamide, poly(acrylic acid), poly(N-hydroxyethyl acrylamide), poly (2-hydroxyethyl methacrylate), poly(2-methacryloyloxyethyl phosphorylcholine), poly(vinyl alcohol), poly(vinyl pyrrolidone), hydroxyethylcellulose, hydroxypropyl methylcellulose, dextran, or hyaluronic acid). For example, when a capture surface includes (e.g., is coated with) a biotin containing polymer (e.g., biotin-mPEG-SVA), a linker can be a polypeptide linker that can bind biotin. Examples of polypeptide linkers that can bind biotin include, without limitation, neutravidin, avidin, and streptavidin. In some cases, a linker can be a deglycosylated linker. For example, when a linker is a deglycosylated polypeptide linker that can bind biotin, the linker can be a neutravidin linker. In some cases, a linker (e.g., a single linker) can conjugate a single capture antibody to a capture surface. In some cases, a linker (e.g., a single linker) can conjugate two or more (e.g., 2, 3, 4, 5, or 6) capture antibodies to a capture surface. For example, a linker can conjugate 3 capture antibodies to a capture surface. In cases where a capture surface includes (e.g., is coated with) a biotin linker, the biotin linker can be part of a multi-arm biotin polymer (e.g., a polymer that contains 2, 4, or 8 arms of biotin conjugated to, for example, a pentaerythritol core). In cases where a capture surface includes (e.g., is coated with) a biotin containing polymer (e.g., biotin-mPEG-SVA) and a linker is a polypeptide linker that can bind biotin (e.g., an avidin linker such as a neutravidin linker), a capture antibody can be a biotinylated antibody (e.g., to conjugate the capture antibody to the neutravidin linker).

A capture antibody can bind (e.g., capture) any appropriate target polypeptide. In some cases, a target polypeptide can be an intracellular polypeptide. For example, a target polypeptide can be a circulating intracellular polypeptide (e.g., an intracellular polypeptide that is shed, released, and/or exported from the cell such that the intracellular polypeptide is present in a biological fluid (e.g., blood, saliva, or urine) of a mammal). In some cases, a target polypeptide can be a polypeptide associated with a disease, disorder, or condition. For example, a target polypeptide can be associated with a neoplastic disease (e.g., a cancer). In some cases, a target polypeptide associated with a neoplastic disease can be a tumor-specific antigen (e.g., an antigen present only on tumor cells and not on any other cell). In some cases, a target polypeptide associated with a neoplastic disease can be a tumor-associated antigen (e.g., an antigen present on some tumor cells and also some normal cells). In cases where a target polypeptide associated with a neoplastic disease is a tumor-specific antigen, the tumor-specific antigen can be an intracellular tumor-specific protein (ITSP; e.g., a circulating ITSP). Examples of target polypeptides associated with one or more neoplastic diseases include, without limitation, p53 (associated with lung, stomach, breast, colon, liver, prostate, cervical, head and neck, esophageal, bladder, and ovarian cancers), CD19 (associated with B cell lymphomas, ALLs, and CLLs), AFP (associated with germ cell tumors and/or hepatocellular carcinomas), CEA (associated with bowel cancers, lung cancers, and/or breast cancers), CA-125 (associated with ovarian cancers), MUC-1 (associated with breast cancers), ETA (associated with breast cancers), MAGE (associated with malignant melanomas), PSA (associated with prostate cancers), and an autoantibody against target polypeptide associated with a neoplastic disease.

In some cases, a target polypeptide can be associated with a disease other than cancer (e.g., non-neoplastic disease). For example, a target polypeptide can be a polypeptide associated with an infection-specific polypeptide. For example, a target polypeptide can be a polypeptide associated with an autoimmune-associated polypeptide.

A chip enclosure can include any appropriate flow channel(s). A flow channel can be in fluid contact with a capture surface. A flow channel can be any appropriate size. For example, a flow channel can have a height of from about 1 μm to about 1000 μm (e.g., from about 1 μm to about 750 μm, from about 1 μm to about 600 μm, from about 1 μm to about 500 μm, from about 1 μm to about 400 μm, from about 1 μm to about 300 μm, from about 1 μm to about 200 μm, from about 1 μm to about 100 μm, from about 1 μm to about 50 μm, from about 1 μm to about 30 μm, from about 1 μm to about 20 μm, from about 10 μm to about 1000 μm, from about 50 μm to about 1000 μm, from about 100 μm to about 1000 μm, from about 200 μm to about 1000 μm, from about 300 μm to about 1000 μm, from about 400 μm to about 1000 μm, from about 500 μm to about 1000 μm, from about 600 μm to about 1000 μm, from about 750 μm to about 1000 μm, from about 25 μm to about 800 μm, from about 50 μm to about 500 μm, from about 100 μm to about 300 μm, from about 50 μm to about 250 μm, from about 250 μm to about 500 μm, or from about 500 μm to about 750 μm). For example, a flow channel can have a width of from about 10 μm to about 10000 μm (e.g., from about 10 μm to about 7500 μm, from about 10 μm to about 6000 μm, from about 10 μm to about 5000 μm, from about 10 μm to about 4000 μm, from about 10 μm to about 3000 μm, from about 10 μm to about 2000 μm, from about 10 μm to about 1000 μm, from about 10 μm to about 500 μm, from about 10 μm to about 300 μm, from about 10 μm to about 200 μm, from about 100 μm to about 10000 μm, from about 500 μm to about 10000 μm, from about 1000 μm to about 10000 μm, from about 2000 μm to about 10000 μm, from about 3000 μm to about 10000 μm, from about 4000 μm to about 10000 μm, from about 5000 μm to about 10000 μm, from about 6000 μm to about 10000 μm, from about 7500 μm to about 10000 μm, from about 250 μm to about 8000 μm, from about 500 μm to about 5000 μm, from about 1000 μm to about 3000 μm, from about 500 μm to about 2500 μm, from about 2500 μm to about 5000 μm, or from about 5000 μm to about 7500 μm). A flow channel can be any appropriate length. For example, a flow channel can be from about 1 mm to about 100 mm (e.g., from about 1 mm to 75 mm, from about 1 mm to 50 mm, from about 1 mm to 25 mm, from about 1 mm to 10 mm, from about 1 mm to 5 mm, from about 10 mm to 100 mm, from about 25 mm to 100 mm, from about 50 mm to 100 mm, from about 75 mm to 100 mm, from about 10 mm to 75 mm, from about 25 mm to 50 mm, from about 5 mm to 25 mm or from about 50 mm to 75 mm) in length. A flow channel can be any appropriate shape. In some cases, a flow channel can be (or can include segments that are) straight. In some cases, a flow channel can be (or can include segments that are) curved. In some cases, a flow channel can include one or more additional features such as twisting, serpentine, split, intersect, trap, or spiral features, or any combinations thereof. A flow channel can have an inlet (e.g., a point of entrance for a fluid such as a sample) and an outlet (e.g., a point of exit for a fluid such as a sample). In some cases, a flow channel can include a micromixer. A micromixer can be any appropriate micromixer. A micromixer can be a passive micromixer or active micromixer. A micromixer can include patterned grooves on an inner surface of a flow channel. In some cases, a flow channel can include patterned grooves. Patterned grooves can be any appropriate pattern. For example, patterned grooves can be staggered herringbone grooves, embedded barriers, intersecting channels, laminated channels, serpentine channels, slanted wells, twisted channels, or zigzag channels. Patterned grooves can be any appropriate size. For example a patterned groove can have a height of from about 1 μm to about 1000 μm (e.g., from about 1 μm to about 750 μm, from about 1 μm to about 600 μm, from about 1 μm to about 500 μm, from about 1 μm to about 400 μm, from about 1 μm to about 300 μm, from about 1 μm to about 200 μm, from about 1 μm to about 100 μm, from about 1 μm to about 50 μm, from about 1 μm to about 30 μm, from about 1 μm to about 20 μm, from about 10 μm to about 1000 μm, from about 50 μm to about 1000 μm, from about 100 μm to about 1000 μm, from about 200 μm to about 1000 μm, from about 300 μm to about 1000 μm, from about 400 μm to about 1000 μm, from about 500 μm to about 1000 μm, from about 600 μm to about 1000 μm, from about 750 μm to about 1000 μm, from about 25 μm to about 800 μm, from about 50 μm to about 500 μm, from about 100 μm to about 300 μm, from about 50 μm to about 250 μm, from about 250 μm to about 500 μm, or from about 500 μm to about 750 µm). Patterned grooves can be any appropriate length of a flow channel. For example, from about 1% to about 100% (e.g., from about 1% to about 75%, from about 1% to about 50%, from about 1% to about 25%, from about 1% to about 10%, from about 10% to about 100%, from about 25% to about 100%, from about 50% to about 100%, from about 75% to about 100%, from about 10% to about 90%, from about 25% to about 75%, from about 10% to about 25%, from about 25% to about 50%, or from about 50% to about 75%) of the length of a flow channel can include patterned grooves. Examples of micromixers include, without limitation, staggered herringbone mixers, micromixers containing embedded barriers, micromixers containing intersecting channels, micromixers containing laminated channels, micromixers containing serpentine channels, micromixers containing slanted wells, micromixers containing twisted channels, micromixers containing zigzag channels, acoustic/ultrasonic, dielectrophoretic, electrohydrodynamic, electrokinetic (instability and time-pulsed), magnetic, magneto-hydrodynamic, pressure perturbation, and thermal micromixers. In some cases, a micromixer can be as described elsewhere (see, e.g., Stroock et al., 2002 *Science* 295:647-651). In some cases, a microfluidic device provided herein (e.g., a microfluidic device that can be used to detect one or more target polypeptides (e.g., cancer-specific target polypeptides) can include a staggered herringbone mixer.

A chip enclosure can include any appropriate material(s). In some cases, a material can be a biocompatible material. In some cases, a material can be a sterile material. In some cases, a material can be a polymeric material. In some cases, a material can be an elastomer Examples of materials that can be used for a chip enclosure include, without limitation, silicone (e.g., a polymeric organosilicon such as polydimethylsiloxane (PDMS)), glass, and polymers (e.g., polystyrene, polycarbonate, polyvinylchloride, polymethyl methacrylate, and cyclic olefin copolymer). For example, a chip enclosure can include a PDMS elastomer.

Microfluidic devices provided herein (e.g., microfluidic devices that can be used to detect one or more target polypeptides (e.g., cancer-specific target polypeptides such as, without limitation, ITSPs) can be made using any appropriate methods. A capture surface having a plurality of capture antibodies can be made using any appropriate method. In some cases, a capture surface can be a commercially available material. For example, when a capture surface is glass, the capture surface can be a commercially available microscope slide or a commercially available microscope slide coverslip. In some cases, a capture surface can undergo passivation. Passivation can be performed using any appropriate method. For example, passivation of a capture surface can be as described in Example 1. In some cases, passivation can include coating a capture surface with one or more additional materials as described herein. For example, a capture surface can be coated with a biotin-polymer (e.g., a biotin containing polymer such as biotin-mPEG-SVA) by contacting the capture surface with a polymer (e.g., a mPEG-SVA) in 10 mM sodium bicarbonate (pH 8.5) for about 6 hours in a sandwich manner, and then contacting the capture surface with the biotin-polymer (e.g., a biotin containing polymer such as biotin-mPEG-SVA) for about 12 hours in a sandwich manner. In some cases, a capture surface can be cleaned prior to including (e.g., prior to being coated with) a polymer. For example, a capture surface can be cleaned in about 1% alconox with sonication for about 10 minutes, washed with water for about 10 minutes, and dried with filtered air. For example, a capture surface can be exposed to high power atmospheric plasma for about 5 minutes for surface cleaning and activation, and then immediately dipped in methanol (e.g., methanol containing about 1% N-(2-aminoethyl)-3-aminopropylt-rimethoxysilane) and about 5% glacial acetic acid. Capture antibodies can be conjugated to a capture surface using any appropriate method. In some cases, a linker and/or capture antibodies can be conjugated to a capture surface prior to assembling the capture surface and a chip enclosure into a microfluidic device described herein. In some cases, a linker and/or capture antibodies can be conjugated to a capture surface after to assembling the capture surface and a chip enclosure into a microfluidic device described herein. In some cases, capture antibodies can be conjugated to a capture surface as described in Example 1. For example, a capture surface can be contacted with capture antibodies (e.g., capture antibodies in a buffer such as a T50-BSA buffer). In some cases, a capture surface can be washed (e.g., with a buffer such as a T50 buffer) prior to contacting the capture surface with antibodies. In some cases, a capture surface can be washed (e.g., with a buffer such as a T50 buffer) after to contacting the capture surface with antibodies.

A chip enclosure containing one or more flow channels (e.g., containing one or more flow channels including a micromixer) can be made using any appropriate method. In some cases, a chip enclosure can be made by pouring a chip enclosure material (e.g., a PDMS elastomer) mixed with a curing agent (e.g., a platinum-based curing agent) onto silicon (e.g., a silicon wafer) containing a template for synthesis of a chip enclosure (e.g., a silicone containing a template for one or more flow channels and a template for a micromixer). The chip enclosure material can be removed from the template. In some cases, a chip enclosure can be washed (e.g., in an ultrasonic bath with isopropanol for about 20 minutes and then with water for about 5 minutes). In some cases, a chip enclosure can be dried (e.g., with filtered air). In some cases, the methods also can include making a template for synthesis of a chip enclosure (e.g., a silicone containing a template for one or more flow channels and a template for a micromixer). For example, a chip enclosure can be made using photolithography. In some cases, a chip enclosure can be made as described in Example 1. For example, a photoresist material (e.g., SU-8 photoresist 2050) can be coated (e.g., spin-coated) onto silicone (e.g., a silicon wafer). The photoresist material can be coated on the silicone at any appropriate thickness. For example, the photoresist material can be coated on the silicone at a thickness of about 100 µm. In some cases, silicon can be treated prior to application of any photoresist material to promote photoresist adhesion. For example, prior to application of any photoresist material, a silicon wafer can be rinsed (e.g., with acetone and isopropanol), dehydrated (e.g., at about 200° C. for about 15 minutes), and exposed to high power oxygen plasma (e.g., about 100 W for about 3 minutes at about 300-500 mTorr oxygen pressure) to promote photoresist adhesion. The silicon coated with the photoresist material can be baked (e.g., soft-baked (65° C./95° C.) for about 5 minutes), exposed to UV light in an EVG620 mask aligner (EVG) loaded with a mask printed at 32,512 DPI resolution, and baked again (e.g., hard-baked (65° C./95° C.) for about 15 minutes). The photoresist material can be applied in layers. For example, a layer (e.g., a first layer) of photoresist material can include a template for one or more flow channels. For example, a layer (e.g., a second layer) of photoresist material can include a template for a micromixer. Any appropriate number of layers can be added. In some cases, alternating layers of a first layer of photoresist material can include a template for one or more flow channels, and a second layer of photoresist material can include a template for a micromixer can be added. After all layers of photoresist are deposited, the silicon can be developed (e.g., under ultrasonic agitation) to yield a master template for synthesis of a chip enclosure.

A capture surface and a chip enclosure can be assembled into a microfluidic device provided herein (e.g., a microfluidic device that can be used to detect one or more target polypeptides (e.g., cancer-specific target polypeptides such as, without limitation, ITSPs) using any appropriate method. In some cases, capture surface and a chip enclosure can be assembled into a microfluidic device as described in Example 1. For example, a chip enclosure can be sealed (e.g., under a stereomicroscope) to a capture surface. For example, a chip enclosure can be sealed to a capture surface by attaching an alignment guide patterned with an imprint matching the shape and size of the flow channel(s) to an uncoated side of a capture surface, placing a cover (e.g., an elastomer cover) including a template for synthesis of a chip enclosure on a coated side of a capture surface at the position of the flow channel imprint on the alignment guide. In some cases, a cover can be a PDMS elastomer having the dimensions of the flow channel. In some cases, when a capture surface undergoes passivation, a cover can permit a passivation surface to be activated for bonding via oxygen plasma while preserving a high-density PEG/biotin-PEG passivation in one or more flow channel(s). For example, in cases, where a capture surface undergoes passivation, a capture surface containing a cover can be placed inside a plasma etcher and can be treated with oxygen plasma (e.g., for about 30 seconds at about 40 W RF power under about 100 mTorr oxygen atmosphere), and then the cover can be removed, and the chip enclosure can be sealed to a coated side of the capture surface (e.g., under a stereomicroscope) using an alignment guide as a reference for the channel position). In some cases, microfluidic devices can be incubated (e.g., at about 80° C. for about 3 minutes) to complete the bonding of the capture surface and the chip enclosure.

This document also provides methods for using microfluidic devices provided herein (e.g., microfluidic devices that can be used to detect one or more target polypeptides (e.g., cancer-specific target polypeptides such as, without limitation, ITSPs) in a sample obtained from a mammal such as a mammal suspected of having cancer). In some cases, the methods and materials provided herein can be used for detecting one or more target polypeptides (e.g., cancer-specific target polypeptides such as, without limitation, ITSPs). For example, microfluidics devices provided herein can be used to detect the presence or absence of a target polypeptide (e.g., a circulating intracellular target polypeptide) in a sample obtained from a mammal (e.g., a mammal suspected of having cancer). In some cases, the methods and materials provided herein can be used for multiplexed detection of target polypeptides (e.g., cancer-specific polypeptides) and/or high throughput detection of one or more target polypeptides (e.g., cancer-specific target polypeptides). In some cases, a capture surface (e.g., a capture surface in an assembled microfluidic device) can be contacted with a sample (e.g., a sample obtained from a mammal having or suspected of having a cancer) under conditions that allow capture antibodies conjugated to the capture surface to bind to one or more target polypeptides (e.g., cancer-specific target polypeptides such as, without limitation, ITSPs) present in the sample. For example, a sample can be contacted with a capture surface by providing the sample to the capture surface by infusing the flow channel with the sample (e.g., via an inlet). In some cases, a capture surface (e.g., a capture surface in an assembled microfluidic device), prior to contacting the capture surface with a sample, can be preparing by infusing the flow channel with a buffer (e.g., a buffer such as a 10 mM Tris-HCl pH 8.0, 50 mM NaCl, 0.05% Tween-20 (T50) buffer) and/or by evacuating any air trapped inside the flow channel (e.g., by degassed under vacuum for about 1 minute). In some cases, a flow channel, prior to contacting the capture surface with a sample, can be equilibrated with a buffer (e.g., T50 buffer) by infusing a flow channel with the buffer via an inlet (e.g., at about 50 µl/minute flow rate for about 10 minutes). In some cases, a capture surface (e.g., a capture surface in an assembled microfluidic device), prior to contacting the capture surface with a sample, can be prepared by conjugating one or more linkers to the capture surface. For example, when a capture surface includes (e.g., is coated with) a biotin-mPEG-SVA polymer, a capture surface can be prepared by conjugating one or more avidin linkers to the capture surface. For example, an avidin linker (e.g., a deglycosylated avidin linker such as a neutravidin linker) can be provided to a capture surface in a fluid containing the avidin linker (e.g., about 20 µL of a T50 buffer containing a neutravidin linker at about 0.1 mg/mL) by infusing a flow channel with the buffer via an inlet (e.g., for about 10 minutes). In some cases, a capture surface (e.g., a capture surface in an assembled microfluidic device), prior to contacting the capture surface with a sample and/or prior to contacting the capture surface with one or more linkers, can be prepared by conjugating a plurality of capture antibodies to the capture surface. For example, when a capture surface includes (e.g., is coated with) a biotin-mPEG-SVA polymer and one or more avidin linkers (e.g., a deglycosylated avidin linker such as a neutravidin linker), a capture surface can be prepared by conjugating a plurality of biotinylated capture antibodies (e.g., biotinylated multi-valent capture antibodies) to the avidin linkers on the capture surface. For example, a plurality of capture antibodies (e.g., multi-valent capture antibodies) can be provided to a capture surface in a fluid containing the capture antibodies (e.g., about 2 µL of a T50-BSA buffer containing capture antibodies at about 1 µg/ml-1 mg/mL) by infusing a flow channel with the buffer via an inlet (e.g., for about 30 minutes). In some cases, a capture surface can be washed (e.g., by infusing a flow channel with about 1 mL of a T50 buffer via an inlet at about 500 µL/min) before and/or after conjugating a plurality of capture antibodies to the capture surface.

A fluid (e.g., a sample obtained from a mammal having or suspected of having a cancer, or a buffer such as a buffer containing one or more linkers and/or a buffer containing a plurality of capture antibodies) can be contacted with a capture surface (e.g., by infusing a fluid through a flow channel) using any appropriate method (e.g., flow scheme). For example, a fluid can be contacted with a capture surface by providing the fluid to the capture surface by infusing the flow channel with the fluid (e.g., via an inlet). Flow of a fluid through a flow channel can be a continuous flow. Flow of a fluid through a flow channel can be a non-continuous flow. Flow of a fluid through a flow channel can be an oscillating flow. For example an oscillating flow can include repeated infusion/withdrawal cycles (e.g., at about 500 µL/minute for about 2-4 hours). In some cases, after contacting a capture surface with a sample, the capture surface can be washed (e.g., by contacting the capture surface with about 1 mL of T50-BSA buffer at about 500 µL/minute). After contacting the capture surface with a sample, the capture surface can be contacted with a plurality of detection antibodies. A detection antibody can include any appropriate detectable label. Examples of detectable labels include, without limitation, fluorophores (e.g., fluorescent dyes such as such as Texas Red, Cascade Blue, Oregon Green, Marina Blue, and the Alexa Fluor dyes; and fluorescent proteins such as green fluorescent protein (GFP), yellow fluorescent protein (YFP), blue fluorescent protein (BFP), and cyan fluorescent protein (CFP)), peptide labels (e.g., biotin, human leukocyte antigen (HLA), glutathione-S transferase (GST), and poly-histidine tag (His)), enzyme labels (e.g., chemiluminescent labels and chromogenic labels), epitope tags (e.g., myc tags, human influenza hemagglutinin (HA) tags, and FLAG tags), single stranded DNA probes (e.g., single stranded DNA probes from about 3 bp to about 100 bp in length), and double stranded DNA probes (e.g., double stranded DNA probes from about 3 bp to about 100 bp in length). In some cases, a fluorophore-labeled detection antibody can used to obtain super resolution images. For example, Alexa Flour 647 can be imaged 4,000-10,000 frames and analyzed with ImageJ plugin ThurderSTORM to generate stochastic optical reconstruction microscopy (STORM) images (30 nm-100 nm resolution). In some cases, 3D STORM images can be generated with different 3D high-precision imaging methods (e.g., astigmatism, multiplane and multiple-helix PSF). In some cases, super resolution images can be obtained on stimulated emission depletion (STED), structured illumination microscopy (SIM), stochastic optical reconstruction microscopy (STORM). In some cases, a DNA probe-labeled detection antibody can be used to generate super resolution or multiplex imaging with DNA-based point accumulation for imaging in nanoscale topography (DNA-PAINT). In some cases, DNA-PAINT can be combined with 3D high-precision imaging methods (e.g., astigmatism, multiplane and multiple-helix PSF). In some cases, a detection antibody can be a fluorophore-labeled detection antibody (e.g., an Alexa Fluor 488-labeled detection antibody or an Alexa Fluor 555-labeled detection antibody). For example, a capture surface can be contacted with a plurality of detection antibodies by providing a fluid containing the detection antibodies (e.g., a fluid containing from about 1 µM to about 10 nM of detection antibodies) to the capture surface by infusing the flow channel with the fluid (e.g., for about 30 minutes). In some cases, after contacting a capture surface with a plurality of detection antibodies, the capture surface can be washed (e.g., with about 1 ml of T50 buffer at about 500 µl/minute). In some cases, when a sample is a human sample, a capture surface can be contacted with immunoglobulins (e.g., Ig) having a corresponding isotype (e.g., IgG) to the capture antibodies and the detection antibodies. For example, a capture surface can be contacted with an excess (e.g., about $10^4$-fold excess) of IgG (e.g., to reduce non-specific binding).

Figure 3:
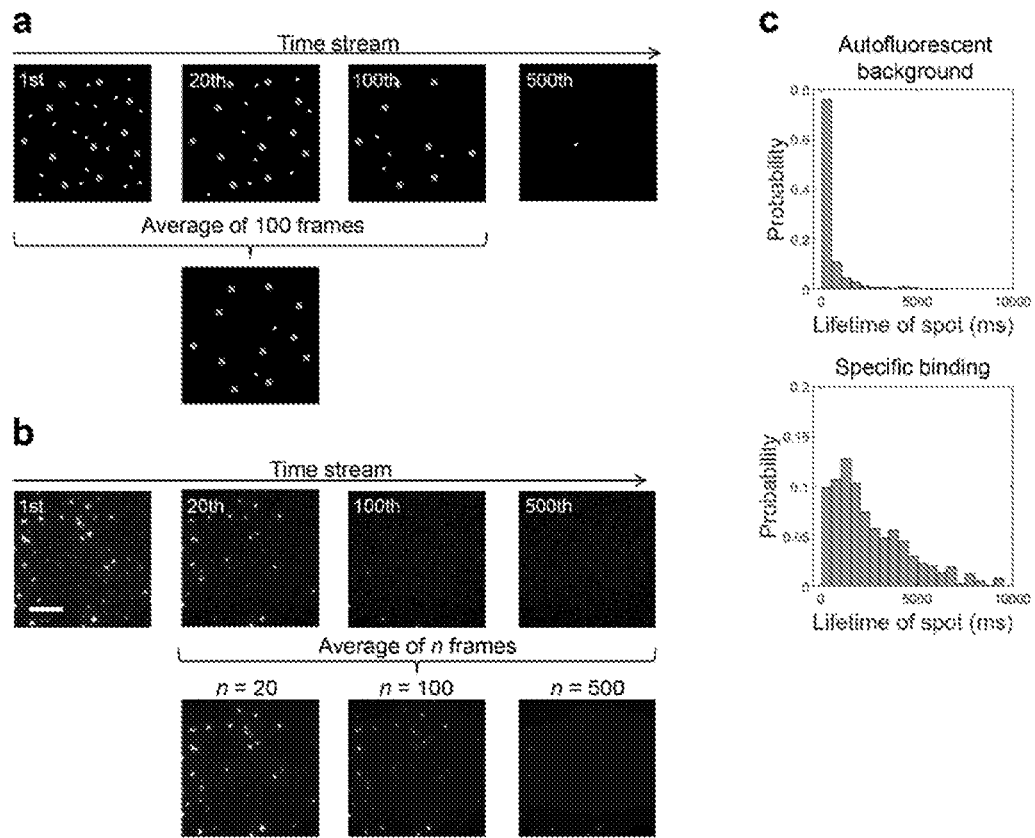
FIG. 3. Single-molecule imaging and analysis components. Illustration of TIRF time-stream processing to average out diffusive background and non-specific binding signals. Schematic (a) and actual empirical data (b) depicting outcomes of this procedure using different time-average windows (n). In (a), orange and white spots indicate specific antibody clusters and non-specific antibody, respectively. c, Comparison of the fluorescent spot lifetime of autofluorescent background versus specific binding under time-stream imaging with continuous laser excitation. Note: the average lifetime of autofluorescent background is $585\pm1.38\times10^3$ ms, while the lifetime of specific binding is $2.9\times10^3\pm2.87\times10^3$ ms.

The presence or absence of one or more target polypeptides (e.g., cancer-specific target polypeptides such as, without limitation, ITSPs) in a sample (e.g., a sample obtained from a mammal having or suspected of having a cancer) can be detected by imaging a detectable label present on the detection antibodies. For example, when a detection antibody is a fluorophore-labeled detection antibody, imaging a fluorophore-labeled detection antibody can include fluorescent microscopy. In some cases, fluorescent microscopy can include illumination microscopy and total internal reflection microscopy (TIRF; e.g., with frame averaging to spatially resolve individual clusters of target proteins). In some cases, TIRF microscopy can be objective-based and prism-based TIRF microscopy. In some cases, TIRF microscopy can be single-molecule TIRF microscopy as described in Example 1 and as shown in (FIG. 1B and FIG. 3A, B). An objective can be any appropriate type of objective (e.g., an air objective, an oil objective, and a water objective). For example, single-molecule TIRF microscopy can include objective with a high numerical aperture (e.g., an aperture from about 1.2 to about 1.45), and the incident laser angle can be adjusted to full TIRF mode with a prism. Flow channels in a microfluidic device described herein can be identified, and an imaging region of 150×150 pixels (e.g., a physical area of about 15 µm²×about 15 µm², can be set to obtain an image of detectable labels present on the detection antibodies in a first region of a capture surface. A camera (e.g., a charge-coupled device (CCD), an electron-multiplying charge-coupled device (EMCCD) camera and complementary metal-oxide semiconductor (CMOS) camera) can be programmed to capture a time stream (e.g., of about 500 consecutive frames with about 50 ms exposure time under laser excitation of from about 40 W/cm² to about 1400 W/cm²). In some cases, after imaging a detectable label present on the detection antibodies in a first region, additional regions of a capture surface can be imaged for a detectable label present on the detection antibodies in the additional regions of the capture surface. For example, after imaging a detectable label present on the detection antibodies in a first region, a microscope stage can be displaced (e.g., by about 80 µm) down the length of a flow channel, and the imaging can be repeated. The imaging can be repeated any appropriate number of times. For example, the imaging can be repeated from about 5 times to about 50 times. In some cases, microspheres (e.g., microspheres from about 1 µm to about 1 mm in diameter) can be put into a channel as a focal plane adjustment. A microsphere can be any appropriate type of microsphere (e.g., glass, gold, TetraSpeck™, and polystyrene microspheres). For example, microspheres can be visualized in bright field and then used to adjust focal plane. After the focal plane adjustment, the fluorescent imaging can be taken without moving. In some cases, the imaging can be repeated until at least 10 regions of a capture surface are imaged per sample.

Imaging the presence or absence of one or more target polypeptides (e.g., cancer-specific target polypeptides such as, without limitation, ITSPs) in a sample (e.g., a sample obtained from a mammal having or suspected of having a cancer) as described herein can be used to distinguish between diffusive background fluorescence, non-specific binding, and specific binding. In cases where a capture surface includes neutravidin linkers and each neutravidin linker includes 3 capture antibodies, detection antibodies can form clusters around each individual target polypeptide. For example, when a detection antibody is a fluorophore-labeled detection antibody and imaging a fluorophore-labeled detection antibody include fluorescent microscopy (e.g., single-molecule TIRF microscopy), clusters of target polypeptides can be subjected to a spot counting analysis (e.g., a spot counting analysis using an absolute threshold).

In some cases, each individual fluorescence spot can be fitted with a two-dimensional (2D) Gaussian function to determine its width ($\sigma$) and peak (intensity). Such peaks can be shown as a scatter plot. For example, peaks resulting from different binding types (e.g., diffusive background fluorescence, non-specific binding, and specific binding) can result in different combinations of $\sigma$ and intensity. In some cases, different combinations of $\sigma$ and intensity result in distinct scatter plots (see, e.g., FIG. 1D). For example, fluorescence spots from different binding types (e.g., diffusive background fluorescence, non-specific binding, and specific binding) can occupy distinct regions in a scatter plot and can be separated from each other. In some cases, a final image can be obtained which can include, for example, contributions from diffusive background fluorescence, non-specific binding, and specific binding of the detection antibody.

Imaging the presence or absence of one or more target polypeptides (e.g., cancer-specific target polypeptides such as, without limitation, ITSPs) in a sample (e.g., a sample obtained from a mammal having or suspected of having a cancer) as described herein can be used to determine the amount of one or more target polypeptides present in the sample. In cases where a capture surface includes neutravidin linkers and each neutravidin linker includes 3 capture antibodies, detection antibodies can form clusters around each individual target polypeptide. For example, when a detection antibody is a fluorophore-labeled detection antibody and imaging a fluorophore-labeled detection antibody include fluorescent microscopy (e.g., single-molecule TIRF microscopy), clusters of target polypeptides can be quantified. In some cases, a reference sample can be used as a control for background fluorescence and for non-specific binding. Examples of reference samples include, without limitation, samples from healthy mammals (e.g., mammals that do not have a disease, disorder, or condition associated with a target polypeptide), samples from cell line lysates (e.g., cells lines that are not from a mammal having a disease, disorder, or condition associated with a target polypeptide or cell lines with a known target polypeptide status), water, aqueous buffers, non-aqueous inorganic solvents, and organic solvents. In some cases, a reference sample can be a pooled reference sample (e.g., a sample including a pool of multiple reference samples). In some cases, false positive counts can be removed. For example, a corresponding 2D histogram of σ and intensity for a reference sample can be scaled based on its standard deviation and then subtracted from that of a sample to remove false positive counts. In some cases, an index for an amount of target polypeptides in a sample can be obtained. For example, a corrected number of specific detection antibody clusters can be obtained by summing the counts from a final 2D histogram obtained from a sample. In cases where a target polypeptide is a relatively abundant target polypeptide (e.g., a target polypeptide present in a concentration that is greater than about 100 fM), the number of fluorescence spots above a preset absolute threshold (referred to hereafter as absolute threshold analysis) can be counted to determine the amount of one or more target polypeptides present in the sample. The number of polypeptide molecule counts can be converted into an absolute quantitative molar concentration using a series of standard curves for the target molecule. In cases where a target polypeptide is a less abundant target polypeptide (e.g., a target polypeptide present in a concentration that is less than about 100 fM), a fluorescence shape recognition algorithm can be used to determine the amount of one or more target polypeptides present in the sample. Likewise, the number of polypeptide molecule counts can be converted into an absolute quantitative molar concentration using a series of standard curves for the target molecule.

In cases where a target polypeptide is a relatively abundant target polypeptide (e.g., a target polypeptide present in a concentration that is greater than about 100 fM), direct spot counting can be used to determine the amount of one or more target polypeptides (e.g., cancer-specific target polypeptides such as, without limitation, ITSPs) present in a sample (e.g., a sample obtained from a mammal having or suspected of having a cancer). The number of polypeptide molecule counts can be converted into an absolute quantitative molar concentration using a series of standard curves for the target molecule. For example, when a detection antibody is a fluorophore-labeled detection antibody and imaging a fluorophore-labeled detection antibody include fluorescent microscopy (e.g., Epi-illumination microscopy and single-molecule TIRF microscopy), direct fluorescent spot counting can be used to determine the amount of one or more target polypeptides. In some cases, direct spot counting can be performed as described in Example 1. For example, single-molecule TIRF data can be analyzed with a software program (e.g., the ThunderSTORM plug-in in ImageJ software), and an absolute threshold can be applied to filter out low intensity spots. In some cases, the absolute threshold can be set individually for each target protein. For example, to determine a threshold for a particular target molecule, a calibration test can be performed (see, e.g., FIG. 19A, B). In some cases, a calibration test can be performed with two groups: (1) a defined concentration of a positive control sample (e.g., a sample having a target polypeptide in a buffer), and (2) a negative control sample (e.g., buffer only without a target polypeptide). The algorithm can be applied to both groups, and the number of counts per field in each control can be calculated over threshold intensities ranging from about $10^3$ to about $1.6 \times 10^4$. The number of counts per field in a positive control sample can be divided by that in a negative control sample at each threshold value to compute the signal-to-noise score for that threshold value. The threshold that yielded the highest signal-to-noise score can be chosen for absolute threshold analysis of the particular target polypeptide. In some cases, spots within a cutoff distance (e.g., a cutoff distance of about 20 nm) across multiple frames can be identified as the same fluorescence spots. In some cases, direct spot counting can be performed for comparison with a shape recognition algorithm (e.g., a fluorescence shape recognition algorithms such as SMAC or SMASH).

In cases where a target polypeptide is a less abundant target polypeptide (e.g., a target polypeptide present in a concentration that is less than about 100 fM), a fluorescence shape recognition algorithm (e.g., SMAC or SMASH) can be used to determine the amount of one or more target polypeptides (e.g., cancer-specific target polypeptides such as, without limitation, ITSPs) present in a sample (e.g., a sample obtained from a mammal having or suspected of having a cancer). The number of polypeptide molecule counts can be converted into an absolute quantitative molar concentration using a series of standard curves for the target molecule. For example, when a detection antibody is a fluorophore-labeled detection antibody and imaging a fluorophore-labeled detection antibody include fluorescent microscopy (e.g., Epi-illumination microscopy and single-molecule TIRF microscopy), single-molecule imaging approaches described herein can be used to determine the amount of one or more target polypeptides. In some cases, a single-molecule imaging approaches described herein algorithm can be used to remove background and correct detection errors. In some cases, single-molecule imaging approaches described herein can be performed as described in Example 1. For example, when single-molecule TIRF data are analyzed with a software program such as the ThunderSTORM plug-in, a wavelet filter can be applied to remove noise and subsequently identify individual fluorescence spots for 2D Gaussian fitting to obtain the corresponding width (a) and peak intensity. 2D scatter plots of a and intensity of all fluorescence spots in each sample can be generated, and the scatter plots can be converted into 2D histograms (e.g., 2D histogram with bin sizes customized for each target molecule depending on the pair of capture and detection antibodies used). In some cases, the minimum intensity can be set accordingly for the fluorescent channels (e.g., to filter out intrinsic autofluorescence). For example, when the fluorescent channel is a green fluorescent channel, the minimum intensity can be set to about 200 photons. For example, when the fluorescent channel is a red fluorescent channel, the minimum intensity can be set to about 400 photons. In some cases, a reference sample (e.g., a pooled reference sample) can be generated. In some cases, the a/intensity scatter plots of a reference sample and a sample (e.g., a sample from a mammal having or suspected of having a cancer) can be converted to one or more heat maps. For example, when a sample is a reference sample, the mean ($R^{mean}$) and standard deviation ($R^{SD}$) of counts in each bin of the heat maps can be calculated. For example, when a sample is a sample (e.g., a sample from a mammal having or suspected of having a cancer), the mean counts ($T^{mean}$) in each bin can be generated by bootstrapping about 100 sets of data points. In some cases, to correct for detection errors, the $T^{mean}$ in each bin of the test samples can be subtracted by the sum of $R^{mean}$ and $2 \times s^{SD}$. In some cases, certain spots from diffusive background can occupy low intensity and high σ values, and the corrected counts in certain heat map bins can come out to values below zero; in these cases, bins can be considered to contain zero counts. The number of remaining molecule counts in all heat map bins can be summated as single-molecule imaging counts. In some cases, prior to performing single-molecule imaging, background fluorescence from non-specific compounds present on the capture surface can be excluded by averaging the first from about 2 to about 500 frames. For example, when a detection antibody is a fluorophore-labeled detection antibody and the fluorophore is GFP, the first about 50 frames can be averaged to exclude background fluorescence. For example, when a detection antibody is a fluorophore-labeled detection antibody and the fluorophore is Alexa Fluor 555, the first about 100 frames can be averaged to exclude background fluorescence.

In some cases, microfluidic devices provided herein (e.g., microfluidic devices that can be used to detect one or more target polypeptides (e.g., cancer-specific target polypeptides such as, without limitation, ITSPs) in a fluid sample obtained from a mammal such as a mammal suspected of having cancer) can be used to identify a mammal as having a disease, disorder, or condition associated with the target polypeptide (e.g., an intracellular target polypeptide). For example, the methods and materials provided herein can be used for the detection, diagnosis, and/or characterization of one or more neoplastic conditions (e.g., one or more cancers) from a fluid sample (e.g., blood, saliva, and urine). For example, the methods and materials provided herein can be used for the detection, diagnosis, and/or characterization of one or more non-neoplastic diseases and/or conditions from a fluid sample (e.g., blood, saliva, and urine).

In some cases, the methods and materials described herein can be used to treat a mammal having a disease, disorder, or condition associated with a target polypeptide (e.g., an intracellular target polypeptide) as described herein. For example, a mammal identified as having a disease, disorder, or condition associated with a target polypeptide based, at least in part, on detecting one or more target polypeptides in a sample (e.g., a fluid sample) obtained from the mammal, the mammal can be treated accordingly. For example, when a mammal is identified as having a cancer based, at least in part, on the presence of one or more cancer-specific target polypeptides in a sample (e.g., a fluid sample) obtained from the mammal, the mammal can be treated with one or more cancer treatments (e.g., surgery, radiation therapy, cell therapy, immunotherapy, administration of a pharmacotherapy such as chemotherapy, hormone therapy, targeted therapy, and/or cytotoxic therapy. For example, when a mammal is identified as having a non-neoplastic disease (e.g., an infection or an autoimmune disease) based, at least in part, on detecting the presence of one or more target polypeptides (e.g., an infection-specific target polypeptide or an autoimmune-associated target polypeptide) in a sample (e.g., a fluid sample) obtained from the mammal, the mammal can be treated accordingly. In cases where a non-neoplastic disease is an infection a mammal can be treated with, for example, antibiotics, antivirals, and/or antiparasitic agents. In cases where a non-neoplastic disease is an autoimmune disease, a mammal can be treated with, for example, anti-inflammatory agents, corticosteroids, and/or other immunosuppressive agents.

When treating a mammal having, or suspected of having, a disease, disorder, or condition associated with a target polypeptide (e.g., an intracellular target polypeptide) as described herein, the treatment can be effective to treat the disease, disorder, or condition associated with a target polypeptide. For example, when the disease, disorder, or condition associated with a target polypeptide is a cancer (e.g., a cancer associated with a cancer-specific target polypeptide), the treatment can be effective to treat the cancer (e.g., to reduce one or more symptoms of the cancer). In some cases, the number of cancer cells present within a mammal can be reduced using the materials and methods described herein. In some cases, the size (e.g., volume) of one or more tumors present within a mammal can be reduced using the materials and methods described herein. In some cases, the size (e.g., volume) of one or more tumors present within a mammal does not increase.

Any appropriate mammal can be assessed and/or treated as described herein. Examples of mammals having, or at risk of developing, a disease, disorder, or condition associated with a target polypeptide (e.g., an intracellular target polypeptide) that can be assessed and/or treated as described herein include, without limitation, humans, non-human primates (e.g., monkeys), dogs, cats, horses, cows, pigs, sheep, mice, rats, hamsters, guinea pigs, donkeys, rabbits, goats, chickens, llamas, and alpacas. For example, a human having, or at risk of developing, a disease, disorder, or condition associated with a target polypeptide (e.g., an intracellular target polypeptide) can be assessed and/or treated as described herein.

A mammal can be assessed and/or treated for any appropriate type of cancer as described herein. A cancer can be a primary cancer or a metastatic cancer. In some cases, a cancer can include one or more solid tumors. In some cases, a cancer can be a cancer in remission. In some cases, a cancer can be a metastatic cancer. In some cases, a cancer can include quiescent (e.g., dormant or non-dividing) cancer cells. In some cases, a cancer can be cancer that has escaped chemotherapy and/or has been non-responsive to chemotherapy. Examples of cancers that can be assessed and/or treated as described herein include, without limitation, lung cancer, liver cancer, pancreatic cancer, ovarian cancer, bladder cancer, breast cancer, colon cancer, endometrial cancer, cervical cancer, renal cell cancer, leukemia, bile duct cancer, melanoma, Hodgkin lymphoma, non-Hodgkin lymphoma, prostate cancer, and thyroid cancer. In some cases, a mammal (e.g., a human) having, or suspected of having, ovarian cancer can be assessed and/or treated as described herein.

Any appropriate sample from a mammal can be assessed as described herein (e.g., assessed for the presence or absence of one or more target polypeptides (e.g., one or more intracellular target polypeptides)). In some cases, a sample can be a clinical sample. In some cases, a sample can be a fluid sample. Examples of samples that can contain one or more target polypeptides include, without limitation, blood samples (e.g., whole blood, serum, or plasma samples), saliva, urine, cerebrospinal fluid, sputum, broncho-alveolar lavage, bile, lymphatic fluid, cyst fluid, stool, ascites, and solid tissue biopsies. In some cases, a sample can be a blood sample such as a plasma sample.

In some cases, the methods and materials provided herein can be used for monitoring the progression of a disease, disorder, or condition associated with a target polypeptide (e.g., an intracellular target polypeptide). For example, clinical samples may be collected longitudinally over time from patients with a particular disease. The amount of target polypeptide in the samples can be quantified by single molecule imaging as an index of disease burden or progression. For example, the total burden of disease varies as an expenditure function of the amount of Target polypeptide within the blood.

In some cases, the methods and materials provided herein can be used for nucleic acid detection and sequencing. For example, a microfluidic capture surface can be conjugated with biotinylated oligonucleotides that can recognize a specific target nucleic acid sequence. The target sequence can be detected using fluorescently labeled oligonucleotides probes that can hybridize to a separate, distinct region of the target sequence. The target nucleic acid within the sample can be visualized by single-molecule imaging and quantified using approaches described above.

In some cases, the methods and materials provided herein can be used for screening pharmacologic agents. For example, a microfluidic capture surface can be conjugated with biotinylated drug targets, which can be polypeptides, nucleic acids, carbohydrates, lipids, or small organic molecules. A library of candidate pharmacologic agents can be added to this captures surface, probed with the target molecule, and visualized by single-molecule imaging. Kinetic biophysical experiments can be performed to characterize the association and dissociation parameters of these pharmacologic agents. Promising agents would be selected for further rounds of screening.

In some cases, the methods and materials provided herein can be used for identifying biomarkers associated with a particular disease, disorder, or condition. For example, antibodies against rationally chosen, functionally significant candidate biomarkers can be coated onto the microfluidic capture surface, followed by circulation of blood samples from patients with the disease of interest throughout the microfluidic device as described above. The presence of the candidate biomarkers with these samples can be probed using complementary fluorescent detection antibodies, and visualized by single-molecule imaging as described above.

The invention will be further described in the following examples, which do not limit the scope of the invention described in the claims.

EXAMPLES

Example 1: A Single-Molecule Blood Test for Mutant Tumor Proteins

This example describes a single-molecule imaging-based technology that was developed to capture and quantify rare circulating tumor-specific proteins with minimal detection errors, and demonstrates that a single-molecule imaging-based technology can be used in a wide variety of applications for blood-based human disease profiling.

Results

Figure 2:
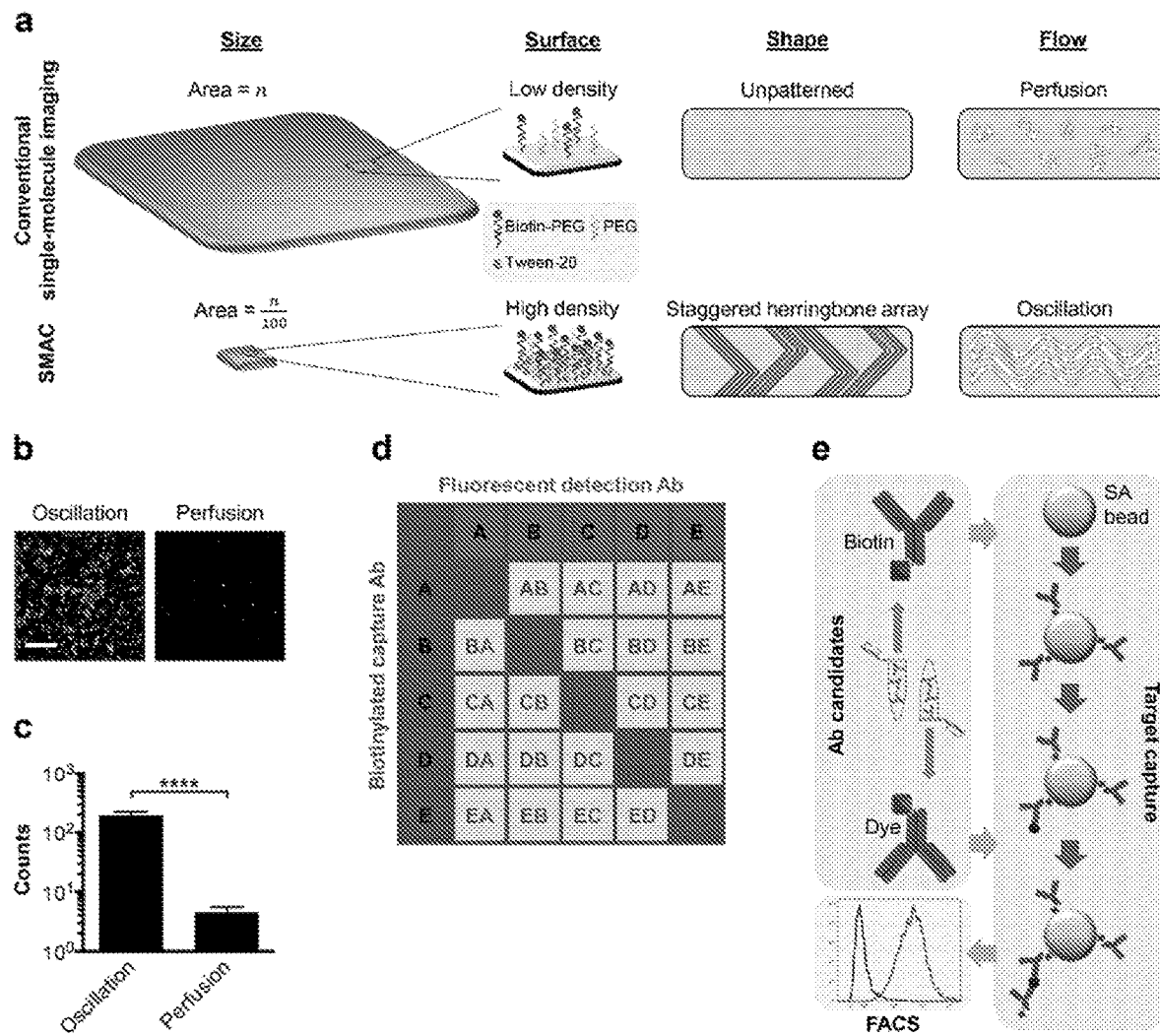
FIG. 2. Single-molecule imaging chip design and target protein capture platform. a, Schematic diagram depicting features of an exemplary single-molecule imaging approach provided herein (bottom), contrasted to conventional single-molecule imaging methods (top), that enable single-molecule imaging of blood samples at attomolar sensitivity. The miniature size, high-density capture surface, patterned channel shape, and continuous oscillating flow scheme of the single-molecule imaging chip synergize to efficiently concentrate proteins-of-interest on the chip. b, c, SMAC images (b) and quantification (c) of purified GFP pulled down on the single-molecule imaging chip via either oscillating flow or perfusion in aqueous buffer. d, e, Bead-based flow cytometry assay for screening capture and detection antibody (Ab) pairs. Schematic of possible capture/detection reagent combinations (d) and the assay setup (e). In e, biotinylated capture antibody was loaded onto streptavidin (SA)-coated magnetic beads and incubated with dye-labeled detection antibody in the presence or absence of the corresponding target protein. The beads were then washed and examined by flow cytometry (FACS) to determine an index of the binding affinity of capture/detection antibody pairs. Data are expressed as mean±SD. ****P<0.0001. P-values are from a two-sided unpaired t-test. Scale bar, 4 μm.

In SMAC, proteins-of-interest are continuously pulled down by a capture antibody on a microfluidic device, probed by a fluorophore-labeled detection antibody, and visualized by single-molecule imaging (FIG. 1a). A sub-fM sensitivity was achieved by implementing the following strategies (FIG. 2a). First, a single-molecule imaging chip, an efficient target-capture microfluidic device, was created (FIG. 1a). To optimize performance of this chip, (a) it was coated with a dense layer of multi-valent, biotinylated antibody via a NeutrAvidin linker (see, e.g., Charles et al., 2009 *Sensors (Basel)* 9:645-655; and Jain et al., 2012 *Nat Protoc* 7:445-452), which enhanced capture affinity and suppressed non-specific binding; (b) its total capture area was minimized, which concentrated proteins-of-interest by >$10^4$-fold; and (c) a staggered herringbone micromixer roof (see, e.g., Stroock et al., 2002 *Science* 295:647-651) and oscillating sample flow scheme was incorporated, which promoted target-antibody collisions (FIG. 2a-c). Second, a flow cytometry-based antibody screening process was employed to identify the best capture/detection antibody pairs for target proteins (FIG. 2d, e). Third, time-stream averaged total internal reflection fluorescence (TIRF) microscopy was conducted to spatially resolve individual fluorescent spots of target proteins (FIG. 3a, b). Time-stream TIRF microscopy helps overcome diffusive background from autofluorescent substances in test samples and in the microfluidic device itself. These autofluorescent substances dissociate rapidly from the chip surface and tend to be photobleached more quickly than fluorophore-labeled detection antibodies. By contrast, detection antibodies specifically bound to target protein molecules remain attached to the chip for a longer time (FIG. 3c). Thus, by time-averaging an imaging stream, single-molecule imaging removes autofluorescent background signals while preserving specific signals from detection antibodies (FIG. 3a, b).

Finally, and most importantly, to achieve sub-fM sensitivity with minimal detection errors for proteins of rare occurrence in samples, a 'fluorescence shape' recognition algorithm was applied (also referred to as shape analysis). Because NeutrAvidin and the capture antibody are multi-valent (FIG. 1a), fluorophore-labeled detection antibody molecules form clusters around target protein molecules on each NeutrAvidin tetramer, generating fluorescent spots with combinations of size (measured by the σ of the Gaussian fitting of the spot) and intensity (I; measured in number of photons) that are distinct from those of background spots due to diffusive background and non-specifically absorbed detection antibody molecules (FIG. 1c, d). These combinations of size and intensity were referred to as the I-σ shape. For example, spots due to specific binding displayed high intensity and large size, reflected by an I-σ shape containing more spots in territories with greater I and σ values (FIG. 1c, d). Conversely, diffusive autofluorescent molecules produced spots with low I and large σ (FIG. 1c, d). Spots due to non-specific detection antibody binding produced spots with medium I and small σ because the chance of having multiple non-specific antibody molecules absorbed simultaneously at the same NeutrAvidin tetramer is statistically low (FIG. 1c, d). Thus, the raw SMAC image can be deconvoluted into components of diffusive background, non-specific binding, and specific binding (FIG. 1d, e).

To perform shape analysis, the I-σ shape of a test sample was first represented as a two-dimensional (2D) histogram depicting the absolute number of spots in a set number of I-σ bins (FIG. 1f). For each target protein under different conditions, single-molecule imaging was performed on control samples lacking the target protein (e.g. buffer only or blood samples from many individual healthy donors) to generate reference 2D histograms depicting the I-σ shapes of diffusive and non-specific detection antibody binding. The mean and variance in spot number in each bin of these reference histograms provided an index of the projected amount and range of 'background contribution' to each region of the I-σ shape. Detection errors were corrected for by subtracting out the maximum projected number of background spots from each bin of the test sample I-σ histogram (FIG. 1f). This analysis allowed us to overcome confounding effects of background signals at extremely low target protein concentrations in complex fluids such as blood.

For proteins of relatively high abundance, it is not necessary to use the shape-recognition algorithm. Instead, the overall fluorescence intensity was measured per sample (referred to as integrated intensity analysis). Because the intensity values were recorded by an electron-multiplier (EM) charge-coupled device, the value of the EM gain was adjusted to control the degree of signal amplification individually for each sample such that the signal image would fall within the linear range of the standard curve, allowing a wide dynamic range to be achieved.

Figure 4:
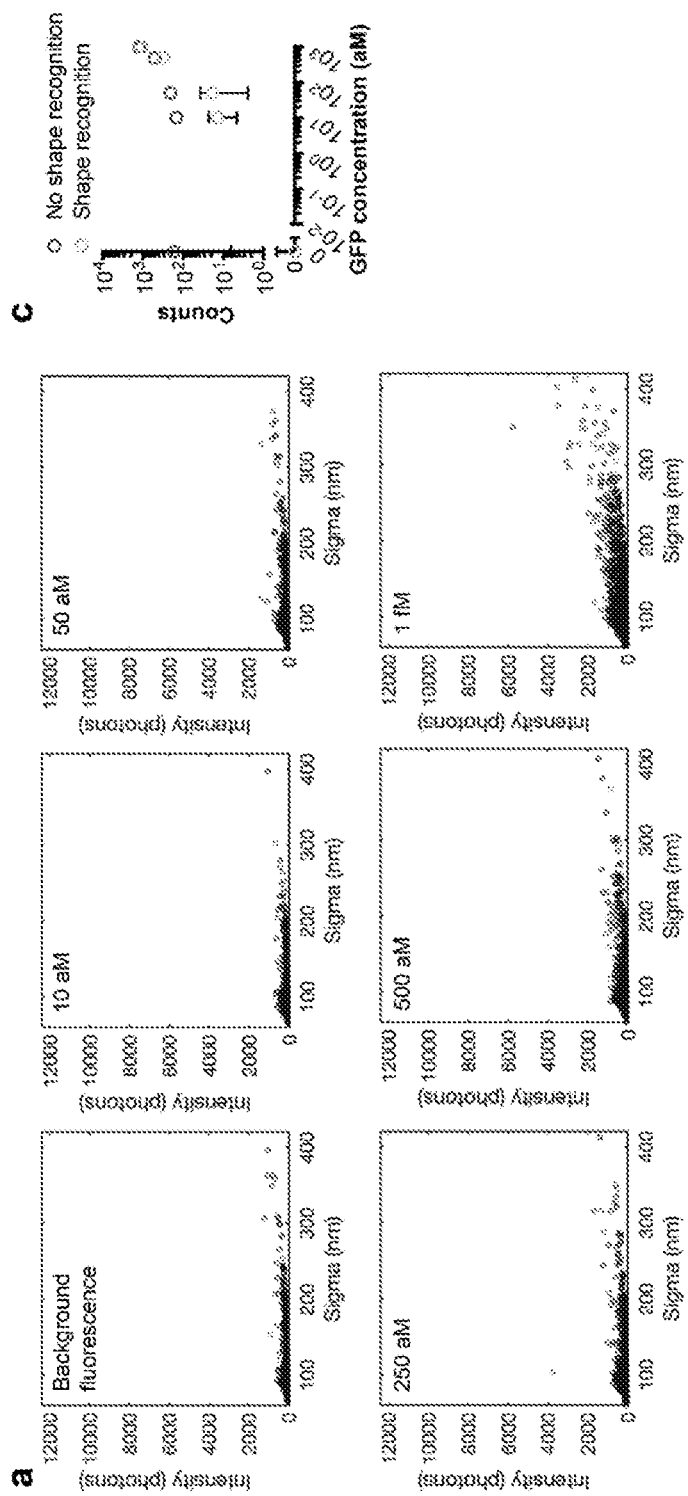
FIG. 4. Fluorescence shape distributions and outcomes of error correction using GFP as a target protein. a, b, Scatter plots (a) and 2D histograms (b) depicting distributions of spot fluorescence intensity versus size (σ) at purified GFP concentrations in the sub-fM range in aqueous buffer. Individual copies of GFP were pulled down on the single-molecule imaging chip and visualized via their intrinsic fluorescence. In b, the numbers inside the boxes indicate remainder spots in the corresponding intensity-σ bins after 2D histogram processing. c, Comparison of GFP single-molecule imaging results for GFP in the sub-fM range without (magenta circles) or with (green circles) error correction using shape recognition algorithms. Data are expressed as mean±SD.
Figure 4:
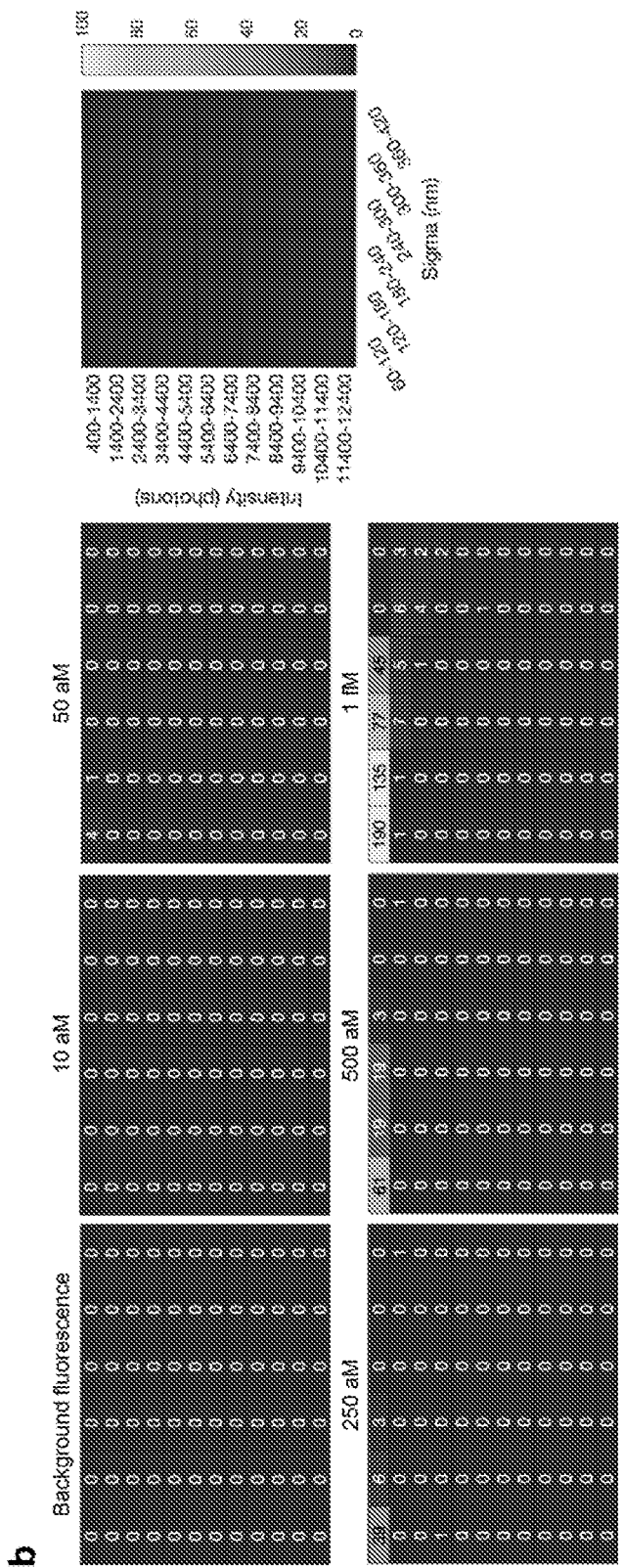
Figure 5:
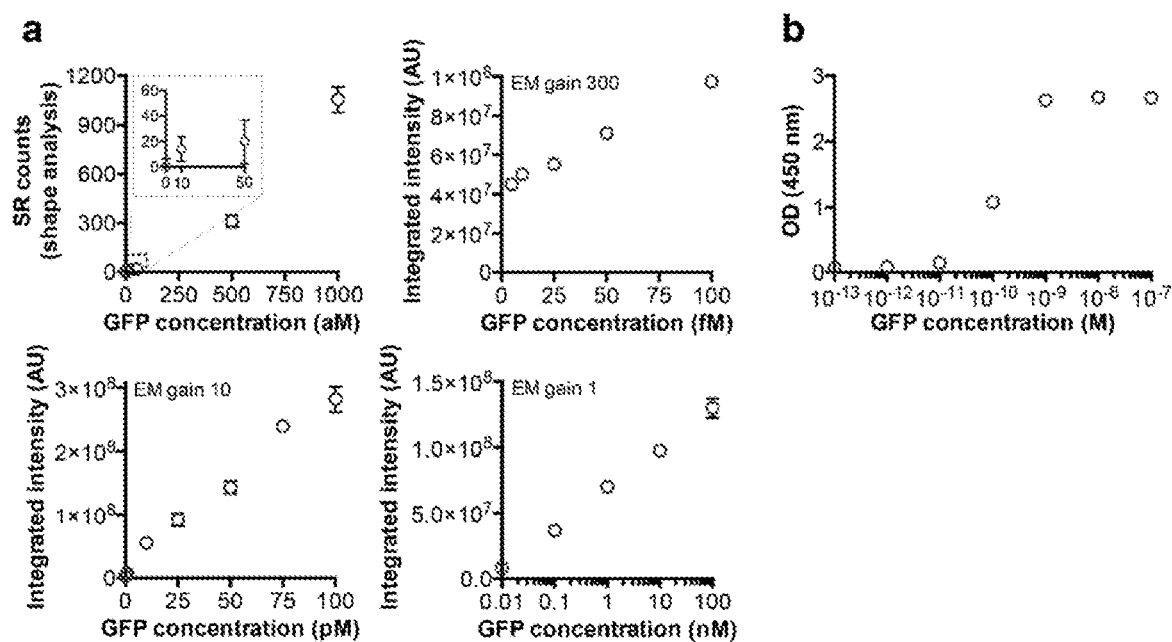
FIG. 5. Comparison of GFP detection by single-molecule imaging or ELISA. a, purified GFP at different concentrations (10 aM to 100 nM) was added into aqueous buffer and examined by single-molecule imaging with either shape analysis (top left, EM gain 300) or intensity analysis at different EM gain settings. Single-molecule imaging detection of GFP had sub-fM sensitivity and a dynamic range from <1 fM to 100 nM. b, ELISA detection of purified GFP. ELISA had a sensitivity of ~10 μM and had a dynamic range from 10 μM to 1 nM.

First, the design of single-molecule imaging was validated using a capture antibody targeting purified GFP. A sensitivity of <0.5 fM GFP was achieved (FIG. 1g, h and FIG. 4, 5a), which was more sensitive than ELISA and existing single-molecule imaging approaches (Jain et al., 2012 Nat Protoc 7:445-452; and Jain et al., 2011 Nature 473:484-488) by >$10^4$-fold (FIG. 5b). For samples with >10 fM GFP, integrated intensity analysis was performed and the camera EM gain was optimized based on fluorescent spot density, which yielded a dynamic range of around nine orders of magnitude, allowing accurate measurement of up to 100 nM GFP (FIG. 5b).

Figure 6:
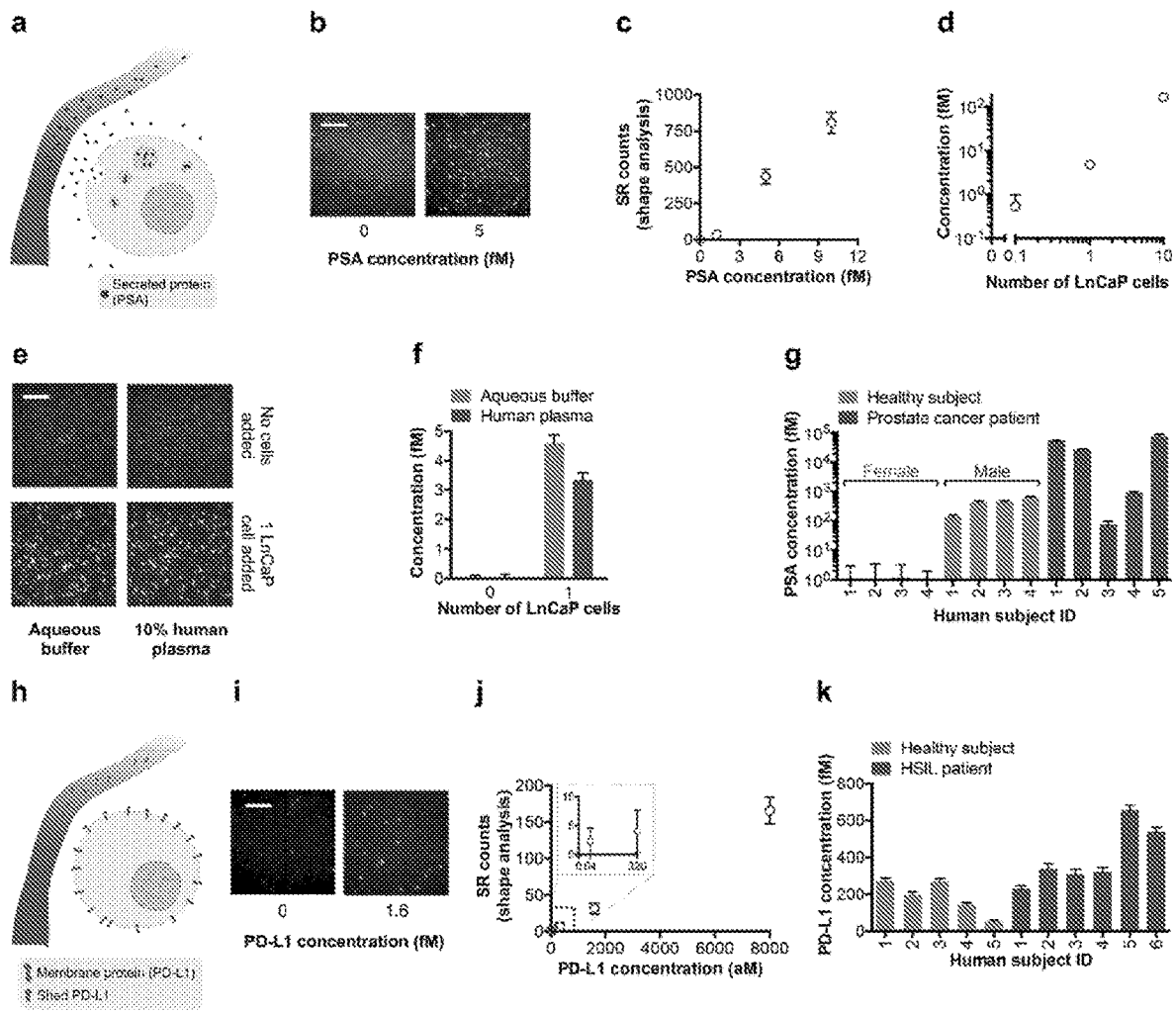
FIG. 6. Detection of secreted and membrane proteins in blood by single-molecule imaging. a, Schematic diagram of secreted PSA release a tumor cell (lime) into a blood vessel (red). b, c, SMAC images (b) and shape analysis (c) of purified human PSA at fM concentrations in aqueous buffer. d, Quantification of PSA in lysate from different numbers of human prostate cancer cells (LnCaP) added into aqueous buffer. e, f, SMAC images (e) and quantification of PSA (f) in lysate from one LnCaP cell in either aqueous buffer or human plasma. g, PSA levels in the blood of prostate cancer patients (n=5) and healthy male (n=4) and female (n=4) control blood donors. h, Schematic diagram of membrane-bound PD-L1 release from a tumor cell (lime) into a blood vessel (red). i, j, SMAC images (i) and shape analysis (j) of purified human PD-L1 at fM concentrations in aqueous buffer. A sample was considered positive if the number of counts two standard deviations below the mean number of SR counts was ≥1. k, Quantification of circulating PD-L1 levels in patients with high-grade squamous intraepithelial lesions (HSIL; n=6) and healthy donors (n=5). PSA data and PD-L1 data are expressed as mean±SD. Scale bars, 4 μm.
Figure 7:
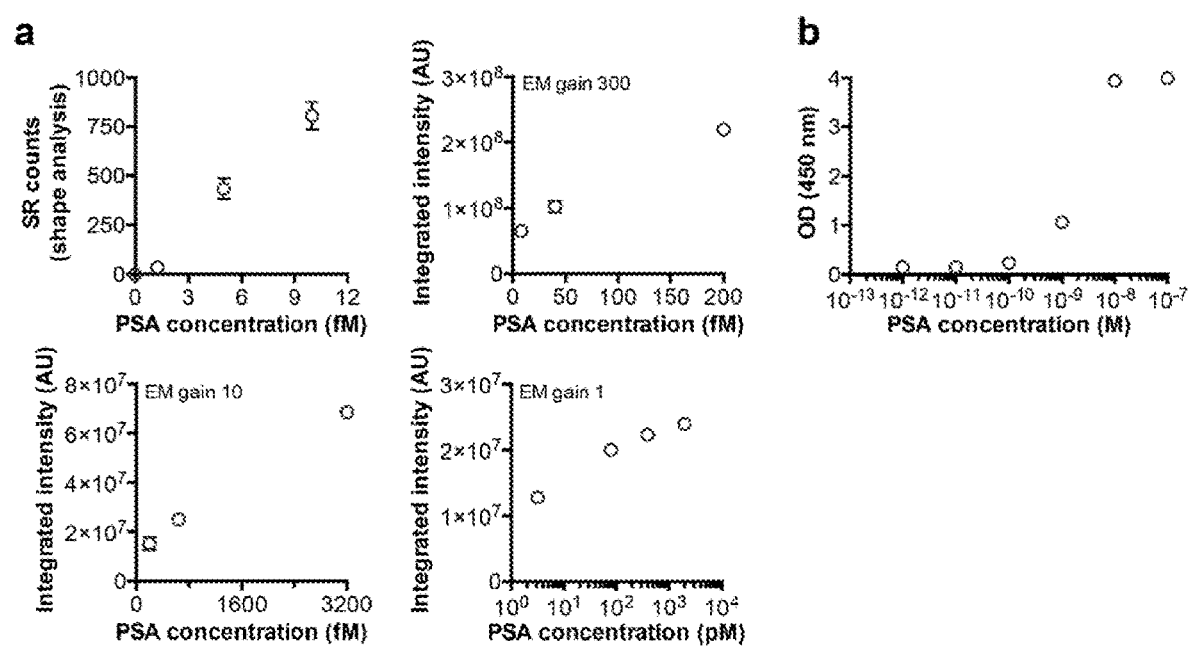
FIG. 7. Comparison of PSA detection by single-molecule imaging or ELISA. a, purified PSA at different concentrations (1 fM to 2 nM) was added into aqueous buffer and examined by single-molecule imaging with either shape analysis (top left, EM gain 300) or intensity analysis at different EM gain settings. Single-molecule imaging detection of PSA had a sensitivity limit of <1 fM and was linear across six orders of magnitude, from 1 fM to 1 nM. b, ELISA detection of purified PSA. ELISA had a sensitivity limit of ~10 pM and was linear across two orders of magnitude, from 10 pM to 1 nM.

Next, single-molecule imaging was developed to detect a disease-associated secreted protein: prostate-specific antigen (PSA; FIG. 6a), a well-established biomarker for prostate cancer, for the application of single-molecule imaging to clinical samples. While the normal prostate gland constitutively produces PSA, the expression of this protein is often dysregulated in prostate cancer cells, leading to either elevated or reduced PSA levels in the blood. Single-molecule imaging could detect purified PSA at <1 fM concentration (FIG. 6b, c), $10^4$ times below the limit of the current clinical PSA test (FIG. 7b) and comparable to the reported limit of digital ELISA (Rissin et al., 2010 Nat Biotechnol 28:595-599). The single-molecule imaging PSA assay also had a dynamic range of over six orders of magnitude (from 1 fM to >1 nM) (FIG. 7a). Furthermore, single-molecule imaging detected PSA in the lysate of less than one prostate cancer cell added in aqueous buffer or human blood (FIG. 6d-f).

Figure 8:
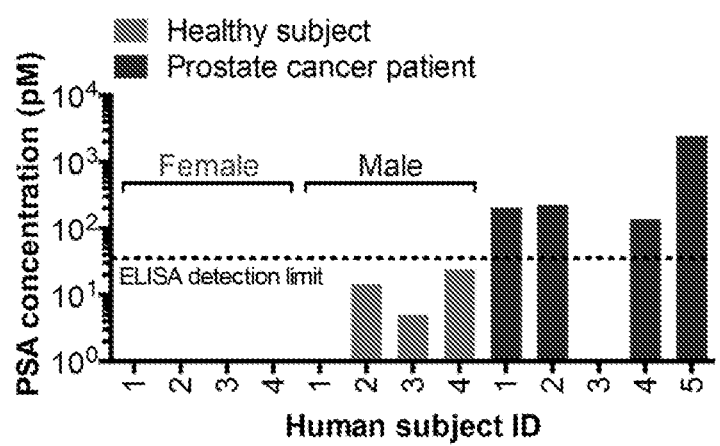
FIG. 8. ELISA of PSA levels in plasma from prostate cancer patients or healthy donors. PSA protein levels were measured by ELISA in plasma collected from prostate cancer patients (n=5; red bars), as well as healthy male (n=4; gray bars) or female (n=4; gray bars) blood donors (all subjects from the same cohort as in FIG. 6g and Table 1). Note: 50 μl of plasma was used to detect PSA from prostate cancer patients (compared to 4 μl used for single-molecule imaging), and basal circulating PSA levels in healthy male blood donors fell below the ELISA detection limit (dotted line).

Single-molecule imaging was then employed to determine PSA levels in plasma samples derived from peripheral blood of prostate cancer patients (Table 1) as well as healthy male and female control blood donors (FIG. 6g). Single-molecule imaging measured dysregulated circulating PSA levels in prostate cancer patients, which was in most cases abnormally high (~10-100 pM) compared to baseline PSA levels in healthy male donors (~100 fM) (FIG. 6g). ELISA required >10-fold greater plasma volume to detect circulating PSA from prostate cancer patients, and could not detect basal PSA levels in healthy male blood donors (FIG. 8). One prostate cancer patient had abnormally low circulating PSA levels as assessed by both single-molecule imaging and ELISA (FIG. 6g and FIG. 8); it has been observed that ~10% of prostate cancer patients have very low circulating PSA levels, which correlates with poor prognosis. These results illustrate the clinical utility of single-molecule imaging for established, secreted biomarkers and demonstrate the first single-molecule imaging-based blood test, paving the way to applications of single-molecule imaging in non-invasive profiling of disease-associated proteins.

Figure 9:
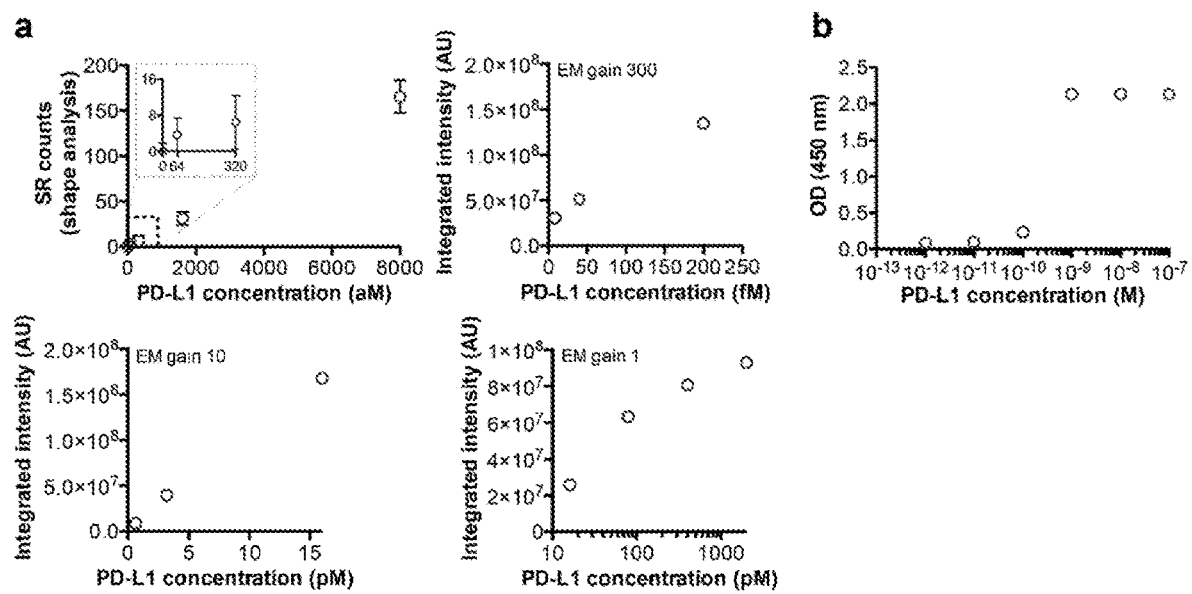
FIG. 9. Comparison of PD-L1 detection by single-molecule imaging or ELISA. a, purified PD-L1 at different concentrations (64 aM to 2 nM) was added into aqueous buffer and examined by single-molecule imaging with either shape analysis (top left, EM gain 300) or intensity analysis at different EM gain settings. Single-molecule imaging detection of PD-L1 had a sensitivity limit of <1 fM and was linear from <1 fM to 1 nM. b, ELISA detection of purified PSA. ELISA had a sensitivity limit of ~10 pM and was linear across two orders of magnitude, from 10 pM to 1 nM.
Figure 10:
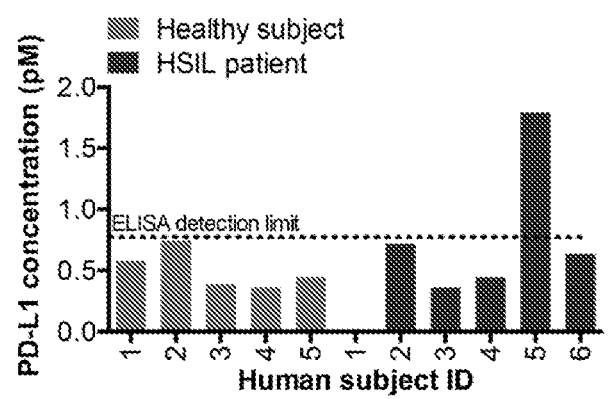
FIG. 10. ELISA of PD-L1 levels in plasma from high-grade cervical squamous epithelial neoplasia (HSIL) patients or healthy female blood donors. PD-L1 protein levels were measured by ELISA in plasma collected from HSIL patients (n=6; red bars), as well as healthy female (n=5; gray bars) blood donors (all subjects from the same cohort as in FIG. 6k and Table 2). Note: basal circulating PD-L1 levels in healthy blood donors fell below the ELISA detection limit (dotted line).

Single-molecule imaging was next used to characterize membrane-bound proteins shed into the blood. Programmed death-ligand 1 (PD-L1) is a membrane-bound immune checkpoint mediator which inhibits immune responses in a variety of disorders spanning from cancer to infection and has recently been found in human blood. PD-L1 antagonists have shown promise in treating chronic virus infection as well as multiple cancer types, and a non-invasive approach to determine likelihood of benefit from immune checkpoint blockade could help tailor clinical management to individual patients. Single-molecule imaging was thus employed to determine the level of circulating PD-L1 in human blood (FIG. 6h). Single-molecule imaging was first developed to detect PD-L1 down to fM concentrations and with a six-log dynamic range (FIG. 6i, j and FIG. 9a). By comparison, the detection limit of conventional ensemble methods such as ELISA was $10^4$-fold higher (~10 pM) (FIG. 9b). Single-molecule imaging was next applied to visualize circulating PD-L1 molecules in patients with a chronic virus infection-induced disease: human papillomavirus (HPV)-associated cervical high-grade squamous intraepithelial lesions (HSIL; Table 2). Baseline circulating PD-L1 levels spanned from 50-300 fM in healthy blood donors. By contrast, five of six HSIL patients had blood PD-L1 levels >300 fM, and two of these patients had levels >500 fM (FIG. 6k). By comparison, ELISA could detect circulating PD-L1 in only one of the six HSIL patients (FIG. 10). These results introduce opportunities for single-molecule imaging to investigate the role of circulating immune checkpoint mediators as well as other membrane-tethered proteins in human diseases.

Having demonstrated the detection of circulating secreted and membrane proteins in blood using SMAC, the detection of rare intracellular proteins shed from disease sites into the blood was next evaluated. While the release of intracellular proteins from cultured cancer cells can be observed (FIG. 11a), the presence of intracellular proteins in blood has not been reported, likely because they lie amidst a plethora of other circulating proteins and are too rare to be quantified by current methods.

Figure 11:
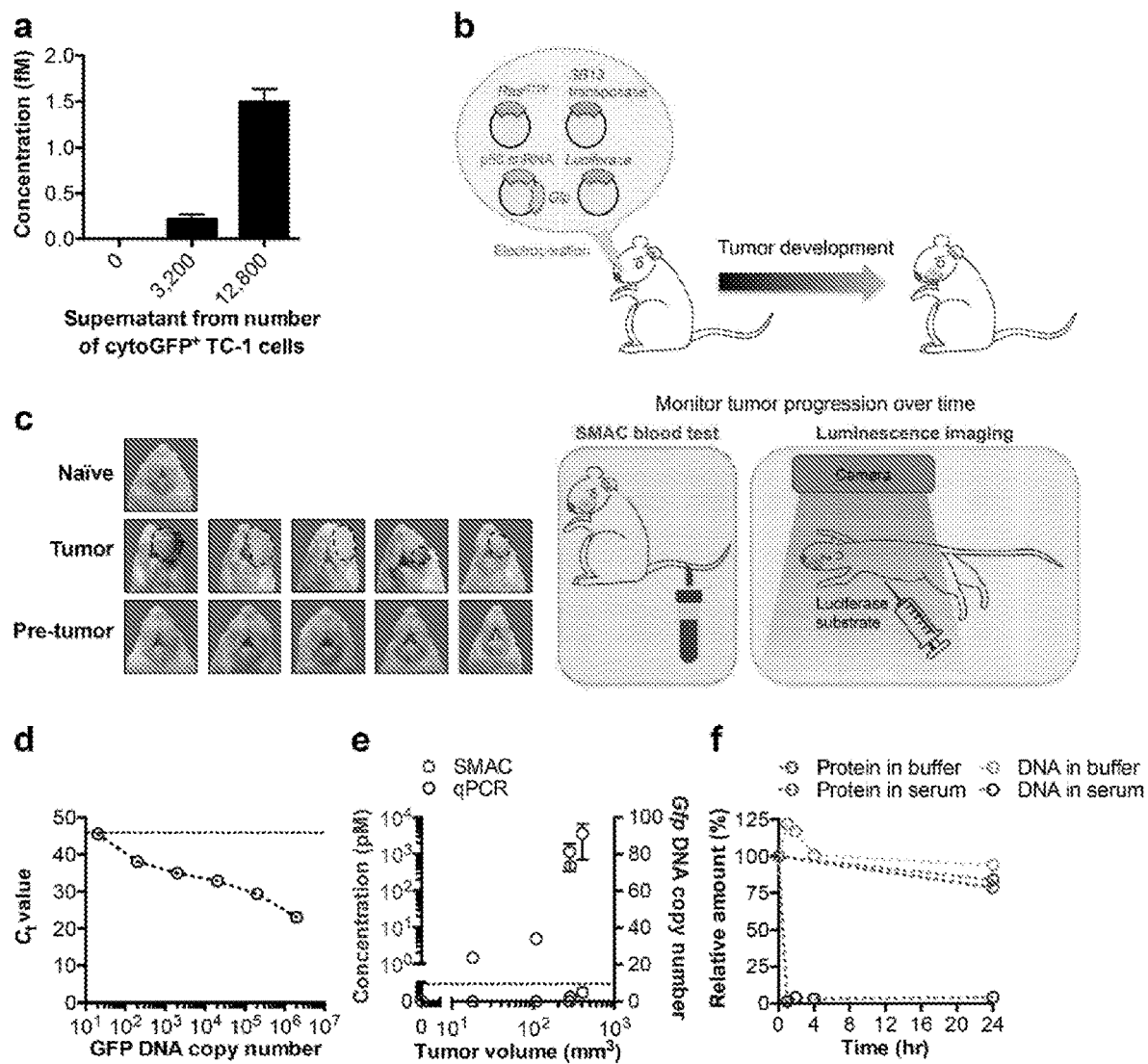
FIG. 11. Comparison of tumor intracellular protein versus DNA release into serum of mice by single-molecule imaging and qPCR, respectively. a, Single-molecule imaging quantification of cytoGFP released from a cultured cytoGFP+ tumor cell line (TC-1) into the supernatant. b, Schematic diagram of the preclinical tumor model setup and design of the single-molecule imaging and luminescence imaging experiments. c, Photographs of mice not induced with tumor (labeled 'naïve'), as well as mice induced with tumor that either displayed grossly visible tumor after more than two months (labeled 'tumor') or had no signs of tumor (labeled 'pre-tumor'). Single-molecule imaging and luminescence results are shown in FIG. 12c. d, Standard curve depicting the performance of qPCR for GFP DNA detection over a range of 20 to $2\times10^6$ DNA copies (goodness of fit $R^2=0.9626$). The dotted line indicates assay background. e, Serum cytoGFP protein levels (measured by single-molecule imaging; red circles) versus cyto-gffi DNA levels (measured by qPCR; blue circles) in mice with visible tumor (n=5; mice pictured in c) as a function of tumor volume. Circulating cytoGFP levels increased exponentially with transplanted tumor growth and ranged from 1 µM to 1 nM. The dotted line indicates the detection limit of qPCR. f, Comparison of GFP protein versus DNA stability over time at 37° C. in mouse serum or aqueous buffer, measured by single-molecule imaging and qPCR, respectively. An identical molar amount of protein and DNA was added in each group. All data are expressed as mean±SD.
Figure 12:
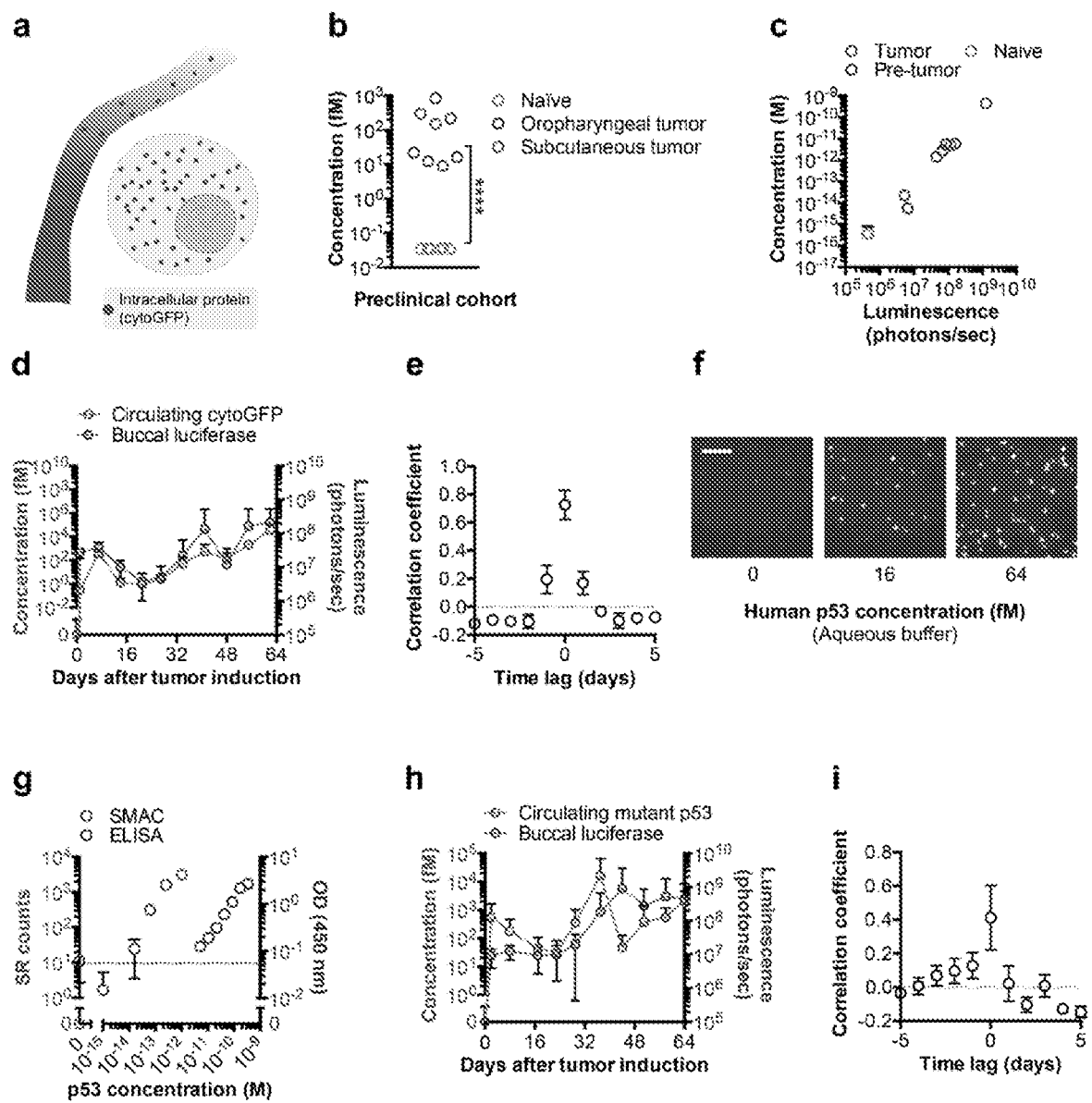
FIG. 12. Detection of cytoplasmic and nuclear proteins in blood by single-molecule imaging. a, Schematic diagram of intracellular cytoGFP release from a tumor cell (lime) into a blood vessel (red). b, Single-molecule imaging quantification of serum cytoGFP levels in naïve mice (gray circles; n=8) as well as tumor-bearing mice one week after oropharyngeal (blue circles; n=4) or subcutaneous (red circles; n=4) injection of cytoGFP+ tumor cells (TC-1). c-e, To induce a spontaneous cytoGFP+ tumor, mice (n=10) were administered with DNA encoding $Ras^{G12V}$, p53 shRNA, cytoGFP, and luciferase. Graph depicting the relationship between tumor luciferase and serum cytoGFP concentrations assessed by single-molecule imaging at an endpoint of more than two months (c) or throughout the first two months (d). In c, tumor-induced mice that displayed a grossly visible tumor were labeled 'tumor' (red circles), while those that did not were labeled 'pre-tumor' (blue circles). Using the kinetics data in d, the time correspondence between serum cytoGFP levels and tumor burden was determined by cross-correlation analysis (e). f, SMAC images of purified human p53 at fM concentrations in aqueous buffer. g, Comparison of the sensitivity of single-molecule imaging with shape analysis (SR counts, red circles) and ELISA ($OD_{450\ nm}$, blue circles) using purified human p53. The dotted line indicates the ELISA detection limit. h, To stimulate a spontaneous tumor carrying mutant human p53, mice (n=10) were administered with DNA encoding human $p53^{R175H}$, $Ras^{G12V}$, and luciferase. Time course (h) and cross-correlation (i) plots depicting the relationship between tumor luciferase and serum mutant p53 levels measured by single-molecule imaging. For cross-correlation plots, each unit time lag is around five days. All data are expressed as mean±SD. ****P<0.0001. P-values are from a two-sided unpaired t-test. Scale bar, 4 µm.
Figure 13:
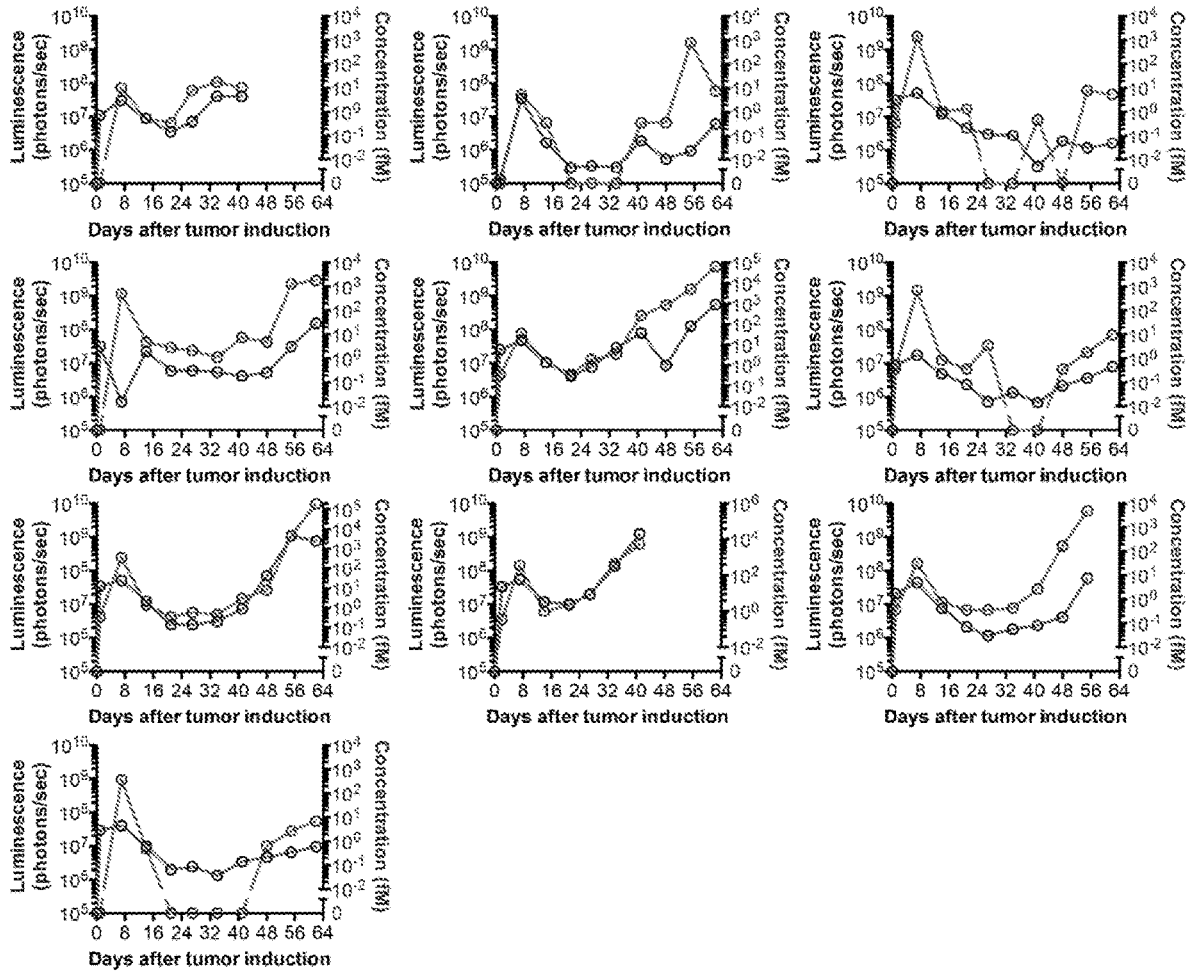
FIG. 13. Temporal progression of tumor burden and circulating intracellular protein levels in mice induced with spontaneous tumor. Spontaneous tumor formation in mice (n=10; same cohort as in FIG. 12d, e) was induced via intrabuccal delivery of $Ras^{G12V}$, shP53, cyto-gfp, and luciferase DNA (schematic in FIG. 11b). At different time points over the first two months, serum was collected, and circulating cytoplasmic GFP levels (red circles) were measured by single-molecule imaging. Circulating cytoGFP levels ranged from 1 fM to 100 µM throughout this experiment. Buccal luciferase activity (blue circles) was measured by luminescence imaging as an index of tumor burden.
Figure 14:
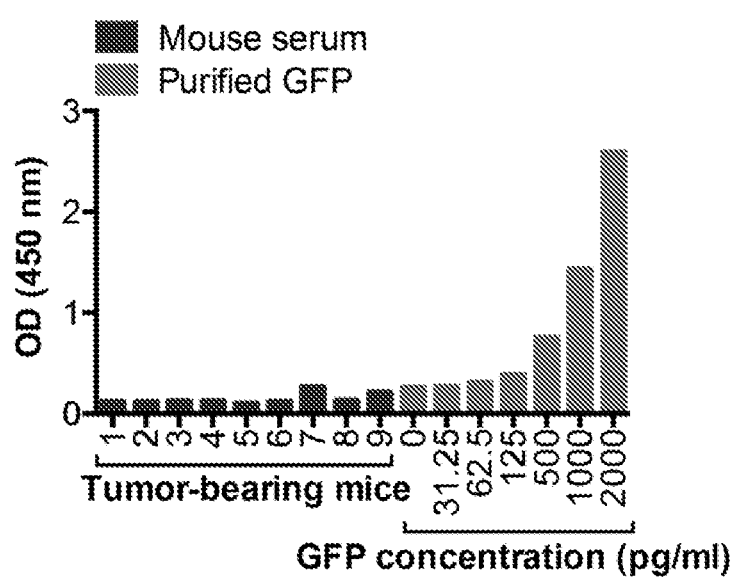
FIG. 14. ELISA of intracellular protein levels in the blood in tumor-bearing mice. GFP protein levels (red bars) were measured by ELISA in serum collected from tumor-bearing mice (n=9; same cohort as in FIG. 12d, e and FIG. 13) more than two months after tumor was induced. One of the mice had died by this time and was thus not included. For comparison, an ELISA standard curve with purified GFP is shown (gray bars).

Whether tumor intracellular proteins are shed into the bloodstream was first assessed using an animal model in which tumor cells (TC-1) are engineered to express cytoplasmic GFP (cytoGFP) as a prototype of intracellular protein (FIG. 12a). Mice were inoculated with cytoGFP$^+$ tumor cells in either subcutaneous or mucosal (buccal) tissue and were able to detect cytoGFP in the blood of these mice within one week after tumor challenge (FIG. 12b). The concentration of circulating cytoGFP ranged from 1 fM to 1 pM (FIG. 12b), which was in most cases below the ELISA detection limit (FIG. 5b). Mice were then induced with spontaneous tumor by electroporating into buccal tissue co-expression vectors of oncogenes (Ras$^{G12V}$ and p53 shRNA) and the intracellular biomarkers cytoGFP (cyto-gfp) and luciferase (FIG. 11b). the accumulation of cytoGFP in serum from these mice (from ~1 fM to ~1 nM) was able to be monitored, which reflected tumor burden as measured by buccal luminescence imaging of luciferase activity (FIG. 12c and FIG. 11c). Serum cyto-gfp DNA was not detectable by quantitative PCR (qPCR) even when the tumor reached >5 mm diameter (FIG. 11d, e), likely due to the low copy number and labile nature of DNA in the blood (FIG. 11f). These results are consistent with the minuscule levels of circulating tumor DNA (ctDNA), especially in early-stage cancer (Cohen et al., 2018 *Science*, 359:926-930; Bardelli et al., 2017 *Cancer cell* 31:172-179; and Cohen et al., 2017 *Proc Natl Acad Sci USA* 114:10202-10207). Using single-molecule imaging to follow the release of cytoGFP protein over time, it was found that circulating cytoGFP levels closely mimicked luminescence imaging of tumor onset and progression beyond week two, once the initial circulating cytoGFP peak (due to electroporation-mediated tissue damage) had waned (FIG. 12d and FIG. 13). These results were confirmed by cross-correlation analysis (FIG. 12e). Serum cytoGFP was imperceptible by ELISA even 42 days after tumor was induced (FIG. 14). These results underscore the potential of single-molecule imaging to study fundamental disease processes in animal models, as well as to identify rare intracellular proteins in the blood for early disease detection.

Figure 15:
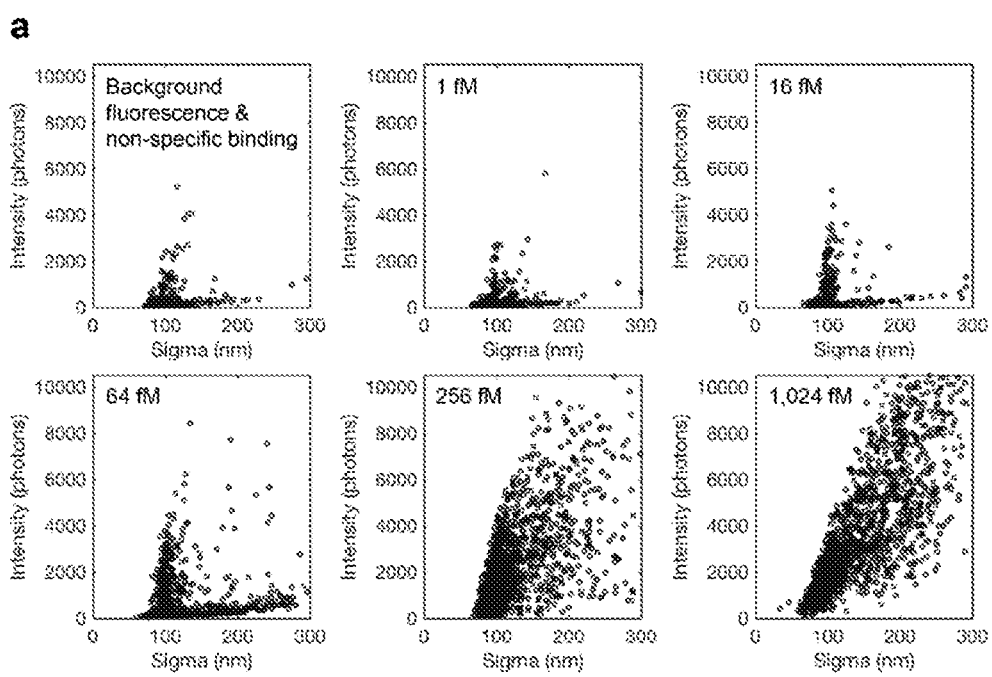
FIG. 15. Fluorescence shape distributions and outcomes of error correction using human p53 as a target protein. a, b, Scatter plots (a) and 2D histograms (b) depicting distributions of spot fluorescence intensity versus size (σ) at different purified human p53 concentrations in the fM range in aqueous buffer. Individual copies of p53 were pulled down on the single-molecule imaging chip and probed with a fluorophore-labeled antibody. In b, the numbers inside the boxes indicate remainder spots in the corresponding intensity-σ bins after 2D histogram processing.
Figure 15:
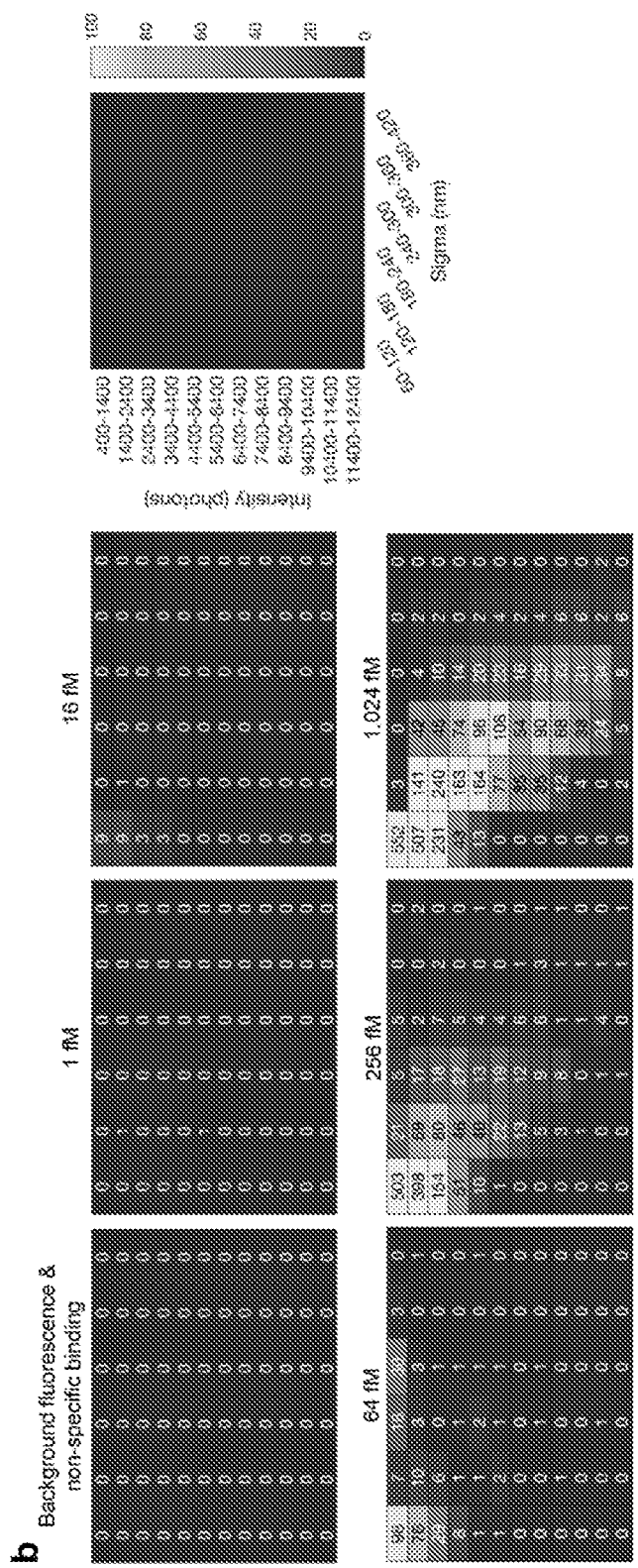
Figure 16:
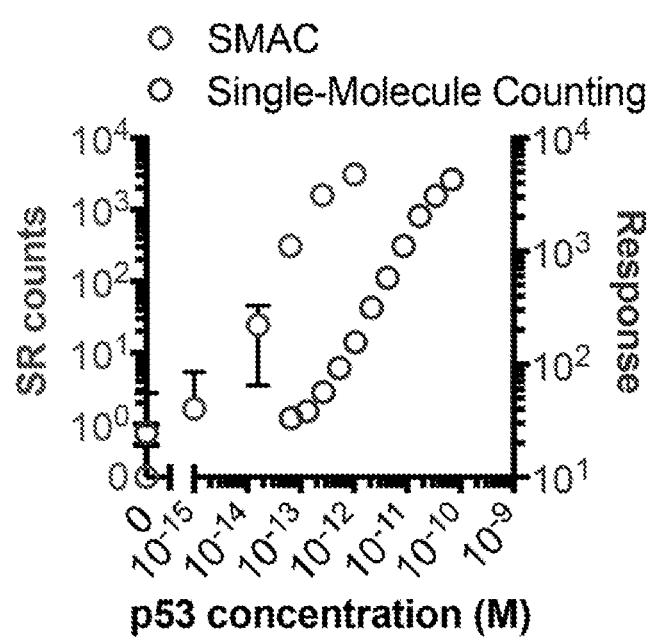
FIG. 16. Comparison of the sensitivity of single-molecule imaging with a commercialized single-molecule detection platform using purified human p53. The red circles represent the number of single-molecule imaging 'SR counts' after shape analysis. The blue circles represent the signal response obtained from a single-molecule p53 assay developed on the Single-Molecule Counting platform (Millipore). All data are expressed as mean±SD. Note: This side-by-side comparison indicates that single-molecule imaging is over 10 times more sensitive than the Single-Molecule Counting platform.

To investigate the release of rare intracellular proteins in a clinically important system, the transcription factor p53 was evaluated since it is a well-established tumor suppressor and the most commonly altered protein in human cancers. Single-molecule imaging was developed to detect <10 fM purified human p53 protein in an aqueous buffer, ~$10^4$-fold below the ELISA limit (FIG. 12f, g and FIG. 15). Single-molecule imaging was also compared to a commercial, ultra-sensitive single-molecule detection platform, Single-Molecule Counting (Millipore) (Todd et al., *Clinical chemistry* 53:1990-1995 (2007); Kaier et al., *Journal of the American Heart Association* 8:e013152 (2019); and Yeung et al., *Journal of immunological methods* 437:53-63 (2016)) and it was demonstrated that the single-molecule imaging p53 test described herein is over 10 times more sensitive than the Single-Molecule Counting p53 test (FIG. 16).

Figure 17:
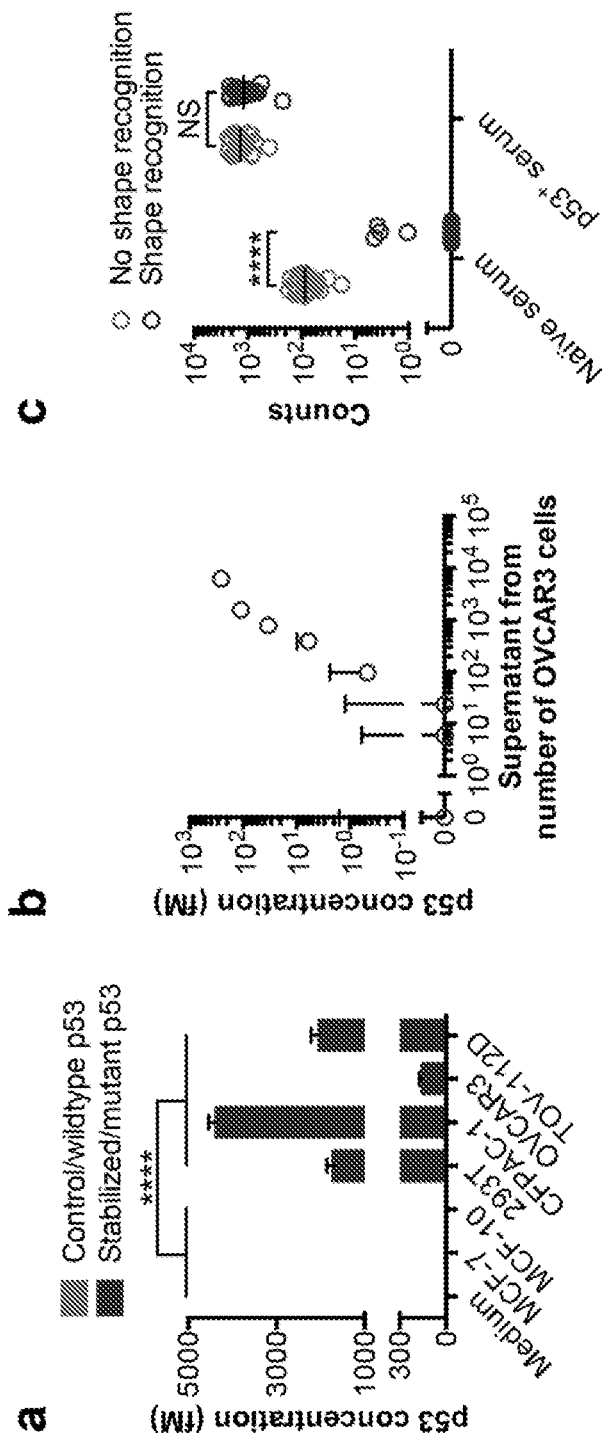
FIG. 17. Detection of mutant protein release from cancer cells by single-molecule imaging. a, Single-molecule imaging with shape analysis of p53 levels in lysate of a panel of cell lines carrying mutant p53 (CFPAC-1 (C242R), OVCAR3 (R248Q), TOV-112D (R175H)) or wildtype p53 (MCF-7, MCF-10). A total of 1,000 cells was used for each group. b, Shape analysis of mutant $p53^{R248Q}$ levels in 0.2 µm-filtered supernatant from a human ovarian cancer cell line (OVCAR3) cultured overnight. c, Comparison of human p53 single-molecule imaging results without (gray circles) or with (red circles) error correction using shape recognition algorithms. In these experiments, naïve mouse serum and serum spiked with human p53 (1 µM) were run over multiple independent trials (n=26). Data in a, b are expressed as mean±SD; individual data points with mean are shown in c. ****P<0.0001; NS, not significant. P-values are from a two-sided unpaired t-test.

Next, using single-molecule imaging substantial levels of p53 were measured in cancer cell lines carrying different mutant p53 variants but hardly any p53 was measured in cell lines with wildtype (wt) p53 (FIG. 17a). These results reflect the enhanced stability of mutant p53 relative to wt p53, as the latter undergoes rapid degradation by proteasomes. Mutant p53 release into the extracellular milieu was observed from as few as 300 human ovarian cancer cells (OVCAR3) cultured overnight (FIG. 17b) and it was found that single-molecule imaging with shape analysis could robustly correct background signals and detect 1 pM human p53 spiked into mouse serum (FIG. 17c).

Figure 18:
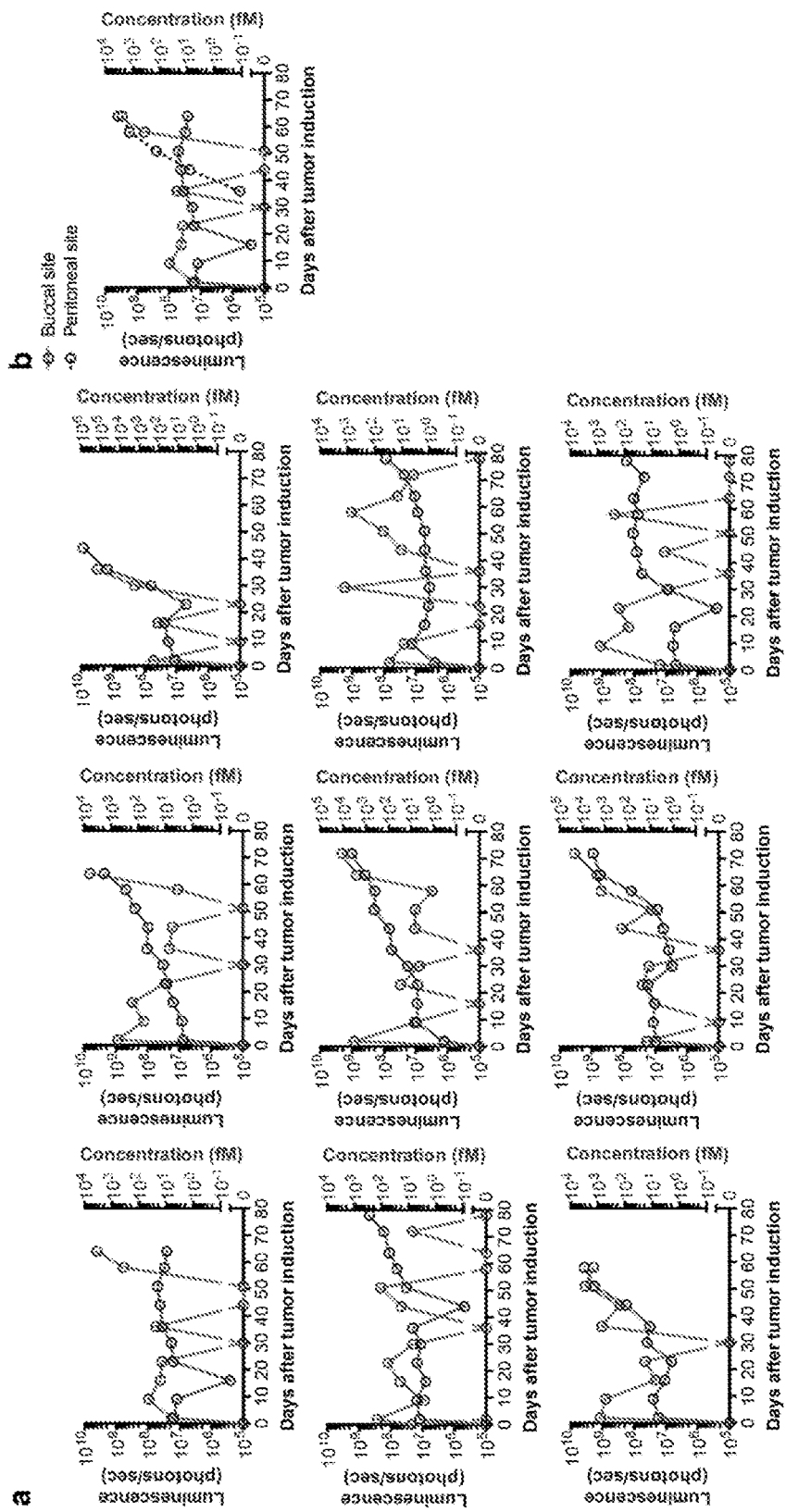
FIG. 18. Temporal progression of tumor burden and circulating mutant protein levels in mice induced with spontaneous tumor. a, Spontaneous tumor formation in immune-deficient mice (n=10; same cohort as in FIG. 12h, i) was induced via delivery of human $p53^{R175H}$, $Ras^{G12V}$, and luciferase DNA to the buccal mucosa. At different time points over the first two months, serum was collected, and circulating mutant p53 levels (red circles) were measured by single-molecule imaging. Local buccal luciferase activity (blue circles) was measured by luminescence imaging as an index of tumor burden. Circulating p53 concentrations ranged from 10 fM to 1 nM and correlated with tumor stage. b, In one of these mice, peritoneal metastasis of the buccal tumor was observed. Circulating mutant p53 levels in this mouse, as assessed by single-molecule imaging, paralleled the rise in peritoneal luminescence.
Figure 19:
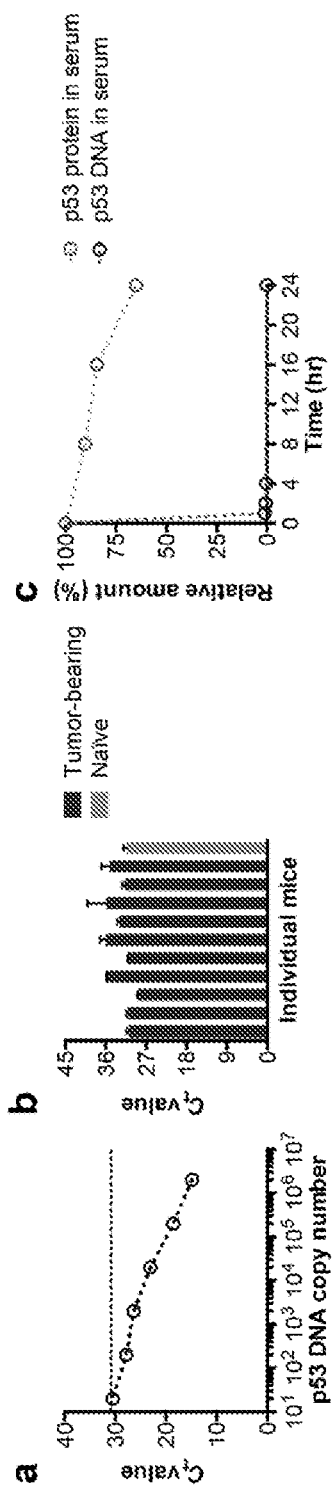
FIG. 19. Analysis of mutant p53 circulating tumor DNA in tumor-bearing mice by qPCR. a, Standard curve depicting the performance of qPCR for human mutant p53$^{R175H}$ DNA detection in mouse serum over a range of 20 to 2×10$^6$ DNA copies (goodness of fit R$^2$=0.9733). The dotted line indicates assay background in naïve mouse serum without added p53$^{R175H}$ ($C_t$=31.3). b, Quantification of serum human p53 DNA levels ($C_t$ values) by qPCR in mice (red bars) induced with tumor via human p53$^{R175H}$, Ras$^{G12V}$, and luciferase delivery to the buccal mucosa (n=10; same cohort as in FIG. 12h, i and FIG. 17) over two months after tumor was induced. For reference, the qPCR assay background ($C_t$ value) in naïve mouse serum is shown as a gray bar. c, Comparison of human p53 protein (green circles) and DNA (blue circles) stability over time in mouse serum at 37° C., measured by single-molecule imaging and qPCR, respectively. An identical molar amount of protein and DNA was added in each group. All data are expressed as mean±SD.

To characterize mutant p53 proteins shed into the bloodstream in an animal model, tumor formation was induced in mice by co-delivery of DNA encoding human mutant p53$^{R175H}$, Ras$^{G12V}$, and luciferase into the buccal mucosa using electroporation. Serum mutant p53 proteins were measured in these mice over time by single-molecule imaging with shape analysis. Circulating mutant p53 levels rose in parallel with tumor progression (from ~75 fM two weeks after tumor onset to ~2 pM after two months), even in the case of tumor metastasis, as assessed by luminescence imaging (FIG. 12h, i and FIG. 18a, b). By contrast, qPCR failed to detect p53 ctDNA in serum even in late-stage disease (FIG. 19a, b), owing to the poor stability and low levels of ctDNA (FIG. 19c).

Figure 20:
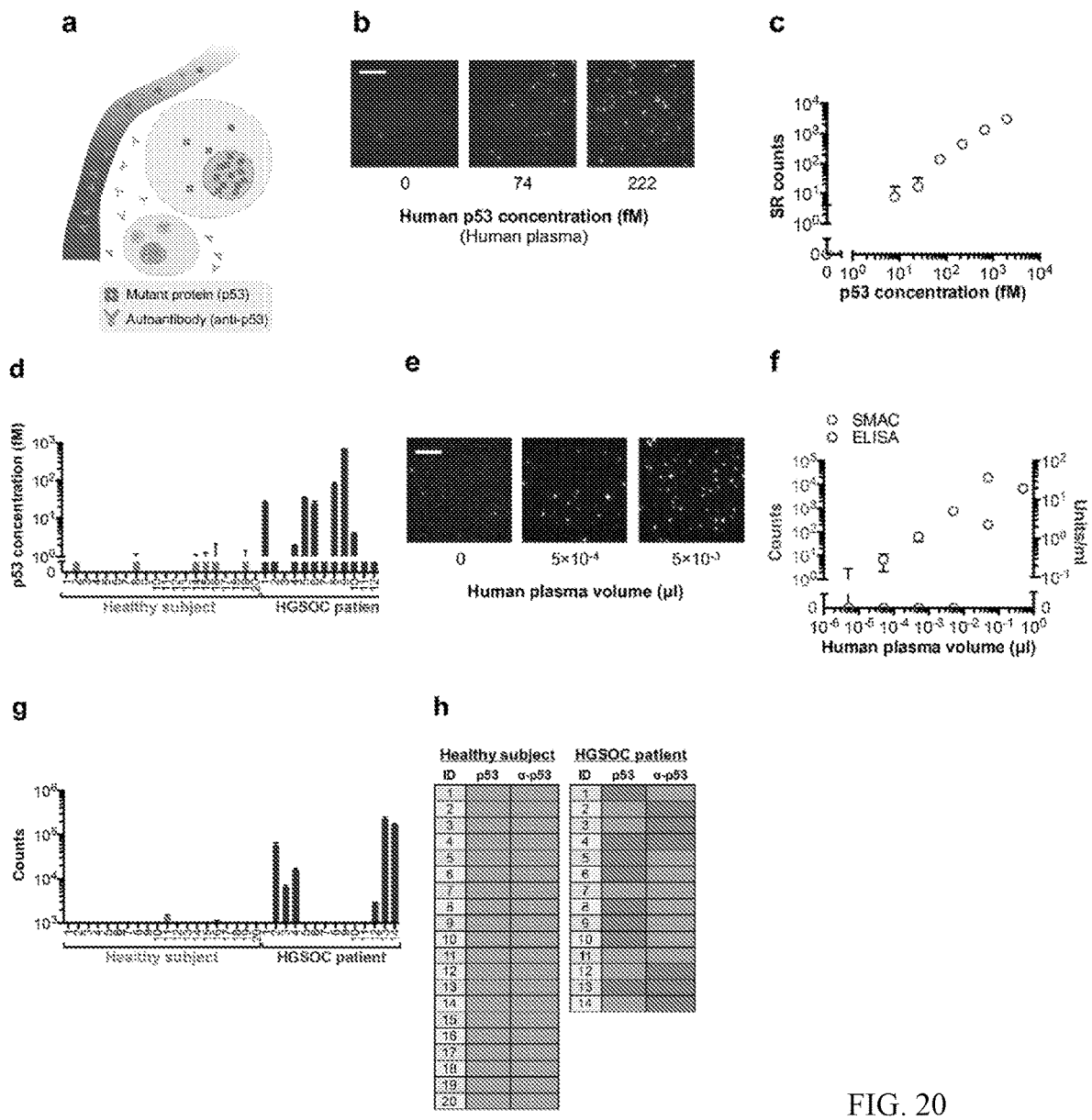
FIG. 20. Detection of circulating mutant proteins and autoantibodies in blood by single-molecule imaging. a, Schematic diagram depicting release of nuclear p53 from a tumor cell (lime) and anti-p53 autoantibodies from a tumor-specific B cell (aqua) into a blood vessel (red). b, c, SMAC images (b) and shape analysis (c) of purified human p53 added at fM concentrations in human plasma. A sample was considered to be positive if the number of counts two standard deviations below the mean number of SR counts was ≥1. d, Shape analysis of circulating mutant p53 levels in plasma from high-grade serous ovarian cancer (HGSOC) patients (n=14) and healthy female blood donors (n=20). e, SMAC images of endogenous anti-p53 autoantibodies in different plasma volumes, from the microliter (μl; 10$^{-6}$l) to picoliter (pl; 10$^{-12}$l) range, in an HGSOC patient. f, Comparison of the sensitivity of single-molecule imaging (counts, red circles) and ELISA (units/ml, blue circles) using human anti-p53 autoantibodies in human plasma. g, Quantification of endogenous plasma anti-p53 autoantibodies from HGSOC patients (n=14) and healthy female blood donors (n=20); same cohort as in d. h, Table summarizing the presence (green) or absence (gray) of mutant p53 or its autoantibodies in the blood of HGSOC patients and healthy donors. Data for individual human plasma samples (d, g) are expressed as mean±SE; all other data are expressed as mean±SD. Scale bars, 4 μm.
Figure 21:
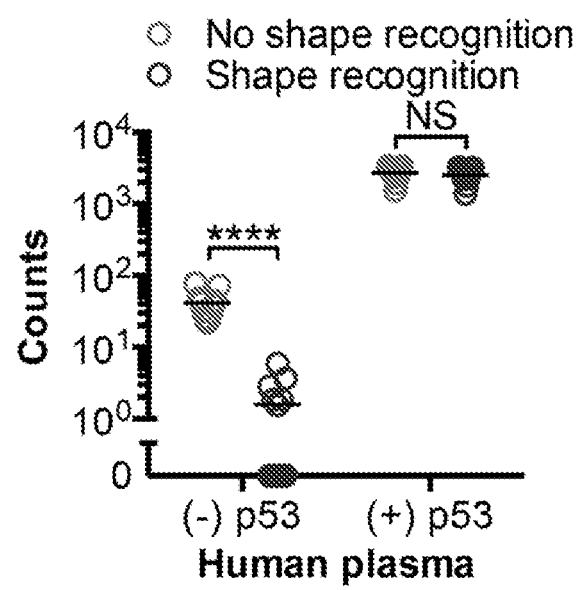
FIG. 21. Error correction outcomes using single-molecule shape recognition algorithms for rare proteins in human blood. Comparison of human p53 single-molecule imaging results without (gray circles) or with (red circles) error correction using shape recognition algorithms. In these experiments, plasma from individual healthy blood donors (n=10) was either spiked with human p53 (2 pM) or left untreated and then examined by single-molecule imaging. Individual data points with mean are shown. ****P<0.0001; NS, not significant. P-values are from a two-sided unpaired t-test.

Single-molecule imaging was next utilized to identify mutant p53 proteins in the blood of high-grade serous ovarian cancer (HGSOC; Table 3) patients (FIG. 20a), since the tumor from >96% of HGSOC patients contains mutations in the TP53 gene. Using normal human plasma spiked with purified p53, it was verified that single-molecule imaging with shape analysis maintained fM baseline sensitivity for p53 in human blood yet corrected >96% of background errors (FIG. 20b, c and FIG. 21). Mutant p53 molecules were visualized in ~60% of plasma samples from HGSOC patients (ranging from <10 fM to 1 pM) but were visualized in none of the samples from healthy female blood donors (FIG. 20d). For patients with undetectable circulating p53, host autoantibodies may have depleted p53 proteins or blocked their capture (FIG. 20a). Single-molecule imaging was therefore developed to identify autoantibodies against p53. Single-molecule imaging exhibited >$10^3$-fold greater sensitivity than existing assays and could detect autoantibodies in picoliter ($10^{-12}$ l) volumes of human blood (FIG. 20e, f). Using SMAC, copious amounts of plasma anti-p53 autoantibodies were measured in 43% of the cohort of HGSOC patients (~$10^3$-fold in excess of circulating mutant p53 levels) but were not measured in plasma from any healthy donors (FIG. 20g). Interestingly, the presence of circulating mutant p53 and its autoantibodies appeared anti-correlated (FIG. 20h), suggesting that host immune responses might have cleared mutant tumor antigens from the blood or that autoantibodies disrupted capture of p53. Altogether, single-molecule imaging discovered circulating p53 protein or abundant anti-p53 autoantibodies in 86% of HGSOC patients and in no healthy subjects (FIG. 20h).

The potential applications of ultra-sensitive single-molecule protein imaging extend beyond quantification of target proteins. In fact, single-molecule imaging can be used to investigate biochemical properties (e.g., secondary modifications, structural changes, aggregation status) of individual proteins-of-interest within a population, as well as unique combinations of proteins in macromolecular complexes. Because disease-associated proteins often differ between patients and healthy people not only in their total amount but also in their biochemical features, this analysis adds another dimension to the information obtainable from existing methods.

Figure 22:
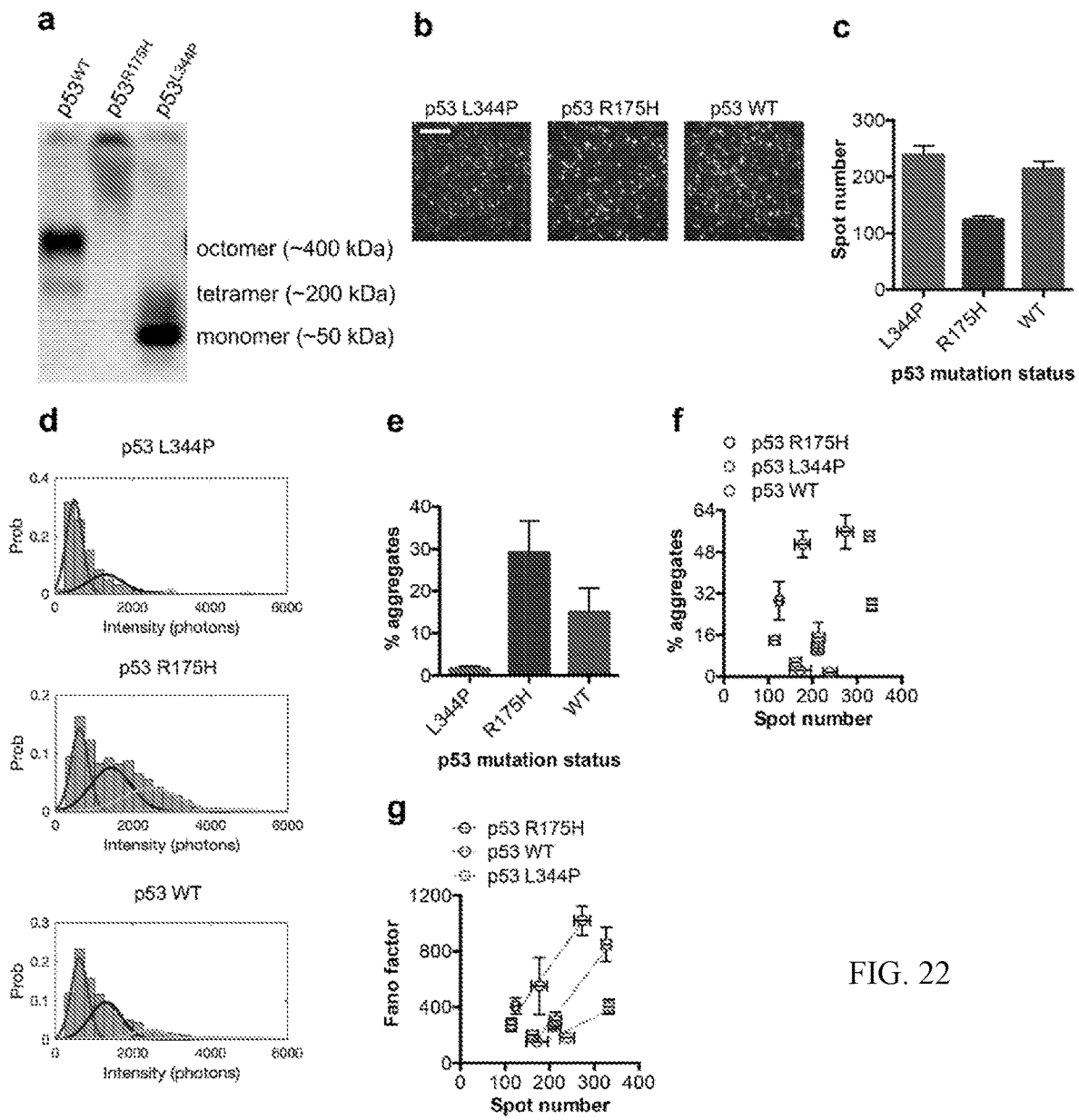
FIG. 22. Aggregation status of wildtype or mutant p53 conformational variants. a, Native PAGE and immunoblot of mutant and wt p53 to identify their oligomerization states. BHK21 cells were transfected with p53$^{WT}$, p53$^{R175H}$, or p53$^{L344P}$ cDNA linked to a GFP expression cassette. b, c, TIRF microscope images (b) and quantification (c) of fluorescent spots from equal total concentrations of individual mutant or wildtype p53 proteins and complexes. d, e, relationship between aggregate formation and p53 mutation status. d, Gaussian fitting of intensity histograms for p53$^{L344P}$, wildtype p53, and p53$^{R175H}$. The curves show the intensity distributions for monomer (pink), dimer (blue), or tetramer (green), and aggregate (aqua) populations of p53. e, percentage of aggregates in each group, calculated as the combined area under the tetramer and aggregate Gaussian curves in (d) divided by the total histogram area. For these experiments, identical concentrations were used for each sample. f, relationship between spot number and percentage of aggregates for different p53 conformational variants across a range of concentrations. g, Aggregation index of the various wildtype and p53 mutants, expressed as Fano factor to reflect the width of the intensity distribution of p53 in each sample.

To explore this, single-molecule imaging was developed to investigate the aggregation status of p53 complexes in test samples. Certain conformational mutants of p53 have been shown to self-assemble into high-order complexes within tumor cells, and these mutants have been correlated with aggressive disease. Thus, the ability to identify these conformational p53 mutants could improve disease detection and management. To test the idea that single-molecule imaging could distinguish between conformational p53 mutants, p53 mutants which have been reported to self-assemble into large complexes (p53$^{R175H}$) or which remain as monomers (p53$^{L344P}$) were generated (FIG. 22a). These mutants were fused to the GFP reporter protein. The recombinant mutant or wildtype p53 was then added into buffer at different concentrations and examined the p53 proteins by SMAC. It was found that the p53 conformational mutants produced different numbers of fluorescent spots despite equal protein amounts (FIG. 22b, c). For example, at the same p53 concentration, p53$^{L344P}$ had a large number of low intensity spots; by contrast, p53$^{R175H}$ had fewer spots, but these spots were of high intensity (FIG. 22b, c).

The intensity distributions of the fluorescent spots were characterized and the percentage of aggregates (defined as spots greater than or equal to tetramer) were measured in each group of conformational mutants (FIG. 22d-f). At the same p53 concentration, p53$^{R175H}$ had the largest percentage of aggregates, followed by the wildtype group and then p53$^{L344P}$ (FIG. 22e). Also, the relationship between the percentage of aggregates and fluorescent spot number was different among each group of conformational mutants (FIG. 22f). It was found that the aggregation-prone p53$^{R175H}$ mutant had the widest intensity distribution of fluorescent spots, followed by wildtype p53, and then the monomeric p53$^{L344P}$ mutant for a given spot number (FIG. 22d). Overall, these data were quantified using the Fano factor (defined as the variance in intensity divided by the mean intensity) as a relative index of the aggregation status (and therefore the likely mutation status) of p53. The p53$^{R175H}$ mutant had the greatest change in Fano factor per unit change in spot number, followed by wildtype p53 and then the p53$^{L344P}$ mutant (FIG. 22g). These data indicate that single-molecule imaging approaches described herein can reveal conformational properties of disease-associated proteins and open up the possibility of using single-molecule imaging to investigate the structural properties of mutant p53, as well as other disease-associated proteins, in clinical samples.

In summary, these results illustrate broad applications of single-molecule imaging to characterize disease-associated secreted, membrane, and intracellular proteins in the blood, opening new avenues to detect, diagnose, and study disease. The insight gained from single-molecule imaging may shed light on pathologic processes, such as dysfunctional signaling pathways, gene expression networks, or immune responses unfolding within disease and point to effective therapies. The platform described here may be adapted to investigate unique biochemical, conformational, and structural features of proteins-of-interest in the blood. The design of single-molecule imaging can also be readily converted into multiplex and high-throughput formats to enable large-scale, single-molecule profiling of proteins in human disease.

Materials and Methods

Materials

Polydimethylsiloxane (PDMS) elastomer for the synthesis of the single-molecule microfluidic capture device was purchased from Dow Corning. 22×22 mm borosilicate cover glass (Thermo Fisher Scientific) served as the substrate for the capture surface. Surface passivation required the following reagents: N-(2-aminoethyl)-3-aminopropyltrimethoxysilane (United Chemical Technologies), Alconox (Alconox, Inc.), methanol (Fisher Scientific), acetic acid (Sigma-Aldrich), sodium bicarbonate (Sigma-Aldrich), biotin-mPEG-succinimidyl valerate MW 5,000 (biotin-mPEG-SVA) (Laysan Bio), and mPEG-succinimidyl valerate MW 5,000 (mPEG-SVA) (Laysan Bio). For GFP detection, biotinylated anti-GFP antibodies (clone RQ2, MBL) were used. For PSA detection, biotinylated (BAF1344, R&D Systems) and Alexa Fluor 488-conjugated (clone 8301, Medix Biochemica) anti-human PSA antibodies were used. For PD-L1 detection, biotinylated (BAF156, R&D Systems) and Alexa Fluor 555-conjugated (clone 28-8, Abcam) anti-human PD-L1 antibodies were used. For human p53 detection, biotinylated (BAF1355, R&D Systems) and Alexa Fluor 555-conjugated (clone E47, Abcam) anti-human p53 antibodies were used. For human p53 detection in mice, biotinylated (BAF1355) and Alexa Fluor 488-conjugated (FL-393, Santa Cruz Biotechnology) antibodies were used. For detection of human anti-p53 autoantibodies, Alexa Fluor 555-conjugated anti-human IgG (H+L) cross-absorbed secondary antibodies (A-21433; Thermo Fisher Scientific) were used. Purified recombinant GFP (Cell Biolabs), human PSA (R&D Systems), human PD-L1 (R&D Systems), and human p53 (R&D Systems) were used to generate standard curves. BSA (New England BioLabs) and polyoxytheylene (20) sorbitan monolaurate (Tween-20; Thermo Fisher Scientific) were used for sample wash and dilution in single-molecule experiments. ELISA for GFP, PSA, PD-L1, p53, and anti-p53 autoantibodies was performed with GFP ELISA Kit (Cell Biolabs), PSA Quantikine ELISA Kit (R&D), PD-L1 Quantikine ELISA Kit (R&D), p53 SimpleStep ELISA Kit (Abcam), and Mesacup Anti-p53 Test (MBL International), respectively, according to manufacturer instructions.

Antibody Conjugation

Antibodies were labeled with biotin or organic fluorophores via NHS-reactive ester. For biotin conjugation, antibodies (0.1-1 mg/ml) were incubated with 50-fold molar excess of NHS-LC-biotin (Thermo Fisher Scientific) for 30-60 minutes and then isolated on 7 kD gel filtration columns (Thermo Fisher Scientific). For dye conjugation, antibodies were pre-captured on protein G magnetic beads (Thermo Fisher Scientific) and incubated with 10-fold molar excess of Alexa Fluor dye-NHS (Thermo Fisher Scientific) for 30-60 minutes. Free dye was washed out, and antibodies were further purified on 7 kD gel filtration columns. Degree of labeling and concentration of antibodies was measured by spectrophotometry.

Pairwise Antibody Screening

To select the best pair of capture and detection antibodies recognizing proteins-of-interest, candidate antibodies were each labeled with biotin or organic dye as described above. Pairwise combinations of these candidate antibodies were then evaluated by flow cytometry on microbeads. Biotinylated capture antibodies (1 µg) were incubated with streptavidin M-280 magnetic Dynabeads (10$^5$ beads per sample; Thermo Fisher Scientific) for 30 minutes. The beads were washed with PBS and incubated with or without purified target proteins for 30 minutes. Beads were washed with PBS and incubated with different dye-labeled detection antibodies (1 µg) for 30 minutes. These procedures were carried out in 50 µl total volume at 25° C. with constant mixing. Beads were then washed, resuspended in PBS (500 µl), and interrogated by flow cytometry on a FACSCalibur device (BD Biosciences). The capture/detection efficiency for each pair of antibodies was calculated based on the shift in mean fluorescence intensity in the presence versus absence of target proteins. Antibodies that yielded the greatest shift were considered to have superior performance.

Purification of Recombinant Human p53

Human p53 (hp53) plasmid was generated for anti-p53 autoantibody detection experiments. Plasmid encoding human p53 (hp53; Addgene) was inserted into the pET28a bacterial expression vector. hp53 was first amplified by PCR with the following primer set: 5' AAAGGATCCATGGAG-GAGCCGCAGTCAGA 3' (SEQ ID NO:5) and 5' AAAGAATTCCAGGTGGCTGGAGTGAGCCC 3' (SEQ ID NO:6). The PCR product was cloned into the BamHI/EcoRI sites of the pET28a vector to create pET28a-hp53. This plasmid was transformed into E. coli BL21 competent cells (Novagen). Protein expression was induced with 1 mM isopropyl-b-D-thiogalactopyranoside (IPTG) at 37° C. for 5 hr. Bacteria were lysed, and the soluble fraction was collected. Recombinant protein was purified by affinity chromatography on Ni-NTA agarose (Qiagen) per manufacturer instructions. Purified p53 was verified by 10-15% gradient sodium dodecyl sulfate polyacrylamide gel electrophoresis (Bio-Rad) and Coomassie Brilliant Blue (Thermo Fisher Scientific) staining, dialyzed with PBS, and stored at −80° C. in PBS containing 20% glycerol.

Cells

TC-1 tumor cells were previously generated in the laboratory and have been reported (Lin et al., 1996 Cancer Res 56:21-26). For experiments involving cytoGFP, TC-1 cells were retrovirally transduced with a cyto-gfp DNA expression cassette. LnCaP human prostate cancer cells were obtained from ATCC. Human cells without p53 (BHK21) and with mutant p53 (CFPAC-1 (C242R), OVCAR3 (R248Q), and TOV-112D (R175H)), cells with wildtype p53 (MCF-7, MCF-10), and HEK 293T cells were from ATCC. Cells were cultured in RPMI-1640 medium or DMEM (Thermo Fisher Scientific) with 10% FBS in the absence of phenol red and maintained under 5% $CO_2$ atmosphere. Lysate was prepared using commercial lysis buffer (Abcam). Briefly, cells were harvested and resuspended in lysis buffer at a stock concentration of $10^4$ cells per µl. The resultant solution was centrifuged at 10,000×g at 4° C. for 10 minutes. Target protein concentration in the stock lysate was determined by ELISA. For single-molecule imaging experiments, lysate was diluted $10^3$-$10^5$× in T50 buffer (also referred to as 'SMAC buffer') (10 mM Tris-HCl pH 8.0, 50 mM NaCl, 0.05% Tween-20) with 0.1 mg/ml BSA. For experiments involving supernatant, conditioned medium was collected from cells cultured for 12-24 hour and centrifuged at 1,000×g for 5 minutes. The resultant supernatant was passed through 0.22-µm filters to further remove debris. The number of viable cells was determined using an automated cytometer (Countess II, Invitrogen) with trypan blue dye exclusion.

Mice 6- to 8-week old female C57BL/6 and immune-deficient athymic nude ($Foxn1^{-/-}$) mice were obtained from the National Cancer Institute. C57BL/6 mice were used for experiments in which tumor cells were directly inoculated. $Foxn1^{-/-}$ transgenic mice were used for experiments in which a spontaneous tumor was induced by oncogene delivery. All animal procedures complied with protocols approved by the Johns Hopkins Institutional Animal Care and Use Committee and with recommendations for the proper use and care of laboratory mice.

Transplanted Tumor Challenge

C57BL/6 mice were injected with cytoGFP-transduced TC-1 cells ($10^5$ cells per animal) in the flank (subcutaneous tissue) or buccal mucosa. At one week after tumor challenge, whole blood was collected from the tail vein and processed into serum for downstream experiments. Tumor growth was monitored by visual inspection, palpation, and digital caliper measurement.

Spontaneous Tumor Induction $Foxn1^{-/-}$ transgenic mice were injected in the buccal mucosa with a plasmid DNA cocktail encoding (1) mutant $Ras^{G12V}$, (2) SB13 transposase, (3) firefly luciferase, and (4) either anti-p53 shRNA carrying a GFP expression cassette or mutant human $p53^{R175H}$ (10 µg of each plasmid diluted with PBS to 30 µl total volume); plasmids were acquired from Addgene. Immediately afterward, mice received electroporation (eight pulses of 72 V, 50 ms duration, and 200 ms interval) at the injection site with an ECM830 device (BTX). Tumor burden was monitored over time by whole body luminescence imaging of luciferase activity with an IVIS Spectrum device (PerkinElmer) following intraperitoneal D-luciferin (Promega) injection. At defined time points after tumor induction, whole blood was collected from the tail vein and processed into serum for downstream experiments.

Cross-Correlation Analysis

To characterize the time relationship between tumor progression and fluctuations in circulating target protein levels in mice, the covariance was calculated between time series of error-corrected single-molecule serum target counts and luminescence photon counts. The covariance coefficient was computed via the 'xcov' function in Matlab (MathWorks). The time lag was narrowed down to five units, with each lag unit corresponding to approximately five days.

Human Subjects

Blood samples were obtained from volunteer patients previously diagnosed with prostate adenocarcinoma (n=5), high-grade cervical intraepithelial lesions (n=6), and high-grade serous ovarian cancer (n=14) who underwent clinical evaluation and management. Descriptions of the clinical characteristics of individual patients are provided in Tables 1-3. Plasma from healthy human volunteers was acquired, and processed from whole blood in dipotassium ethylenediaminetetraacetic acid (K2-EDTA; BD Biosciences).

TABLE 1

Clinical characteristics of prostate cancer patient samples

| ID | Age | Sex | Race | Tumor type |
|---|---|---|---|---|
| 1 | 61 | M | Caucasian | Adenocarcinoma of the prostate gland |
| 2 | 65 | M | Caucasian | Adenocarcinoma of the prostate gland |
| 3 | 72 | M | Caucasian | Adenocarcinoma of the prostate gland |
| 4 | 64 | M | Caucasian | Adenocarcinoma of the prostate gland |
| 5 | 58 | M | Caucasian | Adenocarcinoma of the prostate gland |

TABLE 2

Clinical characteristics of HPV-induced cervical intraepithelial lesion patient samples.

| ID | Age | Sex | Race | Tumor type |
|---|---|---|---|---|
| 1 | 20 | F | Caucasian | High-grade squamous intraepithelial lesion (CIN 2) |
| 2 | 26 | F | Caucasian | High-grade squamous intraepithelial lesion |
| 3 | 69 | F | African American | High-grade squamous intraepithelial lesion |
| 4 | 38 | F | Caucasian | High-grade squamous intraepithelial lesion (CIN 3) |
| 5 | 51 | F | African American | High-grade squamous intraepithelial lesion (CIN 2) |
| 6 | 65 | F | Caucasian | High-grade squamous intraepithelial lesion (CIN 3) |

TABLE 3

Clinical characteristics of ovarian cancer patient samples.

| ID | Age | Sex | Race | Tumor type* | FIGO stage |
|---|---|---|---|---|---|
| 1 | 77 | F | Caucasian | Serous carcinoma | III |
| 2 | 32 | F | Caucasian | Metastatic clear cell carcinoma | IV |
| 3 | 55 | F | Caucasian | Metastatic serous carcinoma | N/A |
| 4 | 74 | F | Caucasian | Metastatic serous carcinoma | IIIC |
| 5 | 59 | F | Caucasian | Serous carcinoma | IIIC |
| 6 | 75 | F | European | Serous adenocarcinoma | IV |
| 7 | 49 | F | Caucasian | Metastatic serous carcinoma | IIIC |
| 8 | 88 | F | Caucasian | Metastatic serous carcinoma | IIIC |
| 9 | 60 | F | African American | Adenocarcinoma | IIIC |
| 10 | 64 | F | Caucasian | Metastatic serous adenocarcinoma | N/A |
| 11 | 64 | F | Caucasian | Serous adenocarcinoma | N/A |
| 12 | 68 | F | Caucasian | Serous carcinoma | IIIC |

TABLE 3-continued

Clinical characteristics of ovarian cancer patient samples.

| ID | Age | Sex | Race | Tumor type* | FIGO stage |
|---|---|---|---|---|---|
| 13 | 64 | F | Caucasian | Metastatic serous carcinoma | IIIC |
| 14 | 61 | F | Caucasian | Metastatic serous carcinoma | IV |

*All tumors were of ovarian origin and classified as high-grade. N/A: not available.

Human Plasma Preparation

Whole blood was drawn from test subjects and anticoagulated with K2-EDTA. Samples were processed within 4 hours after collection. Blood samples were diluted with an equal volume of 1×HBSS (Corning) and added slowly on top of Lymphoprep solution (15 ml; Stem Cell Technologies) in 50-ml conical tubes. Samples were centrifuged at 1,200×g for 10 minutes at room temperature. The top plasma layer was harvested and stored at −80° C.

Single-Molecule Capture Surface Passivation

Borosilicate coverslips of 130-170 μm thickness and 22×22 mm area served as the substrate for the capture surface. Coverslips were first cleaned in 1% Alconox with sonication for 10 min, washed with Milli-Q water (Millipore) for 10 min, and dried with filtered air. Coverslips were exposed to high power atmospheric plasma using a PE25-JW device (Plasma Etch) for 5 minutes for surface cleaning and activation, and then immediately dipped in methanol containing 1% N-(2-aminoethyl)-3-aminopropyltrimethoxysilane and 5% glacial acetic acid. Coverslips were washed thoroughly with methanol and Milli-Q water, and then dried with filtered air. Coverslips were conjugated with biotin-mPEG-SVA (0.3 mg) in 10 mM sodium bicarbonate (pH 8.5) for 6 hours in a sandwich arrangement. The glass surface was then conjugated with a mixture of biotin-mPEG-SVA (0.3 mg) and PEG-mSVA (16 mg, 1:50 mass ratio) for 12 hours in a sandwich arrangement. After passivation, coverslips were washed with Milli-Q water and dried as described above. Coverslips were transferred to a clean container, vacuumed, flushed with pure nitrogen, sealed with paraffin film, and stored at −20° C. Tween-20 was added into SMAC buffers during downstream experiments to further block the surface.

Microfabrication of Single-Molecule Imaging Chip Enclosure

A master template for the device enclosure was synthesized by photolithography. Briefly, a silicon wafer was rinsed with acetone and isopropanol, and then dehydrated at 200° C. for 15 minutes. The wafer was exposed to high power oxygen plasma (100 W for 3 minutes at 300-500 mTorr oxygen pressure) using a PE II-A apparatus (Technics) to promote photoresist adhesion. SU-8 photoresist 2050 (MicroChem) was spin-coated onto the wafer to 100 μm thickness. The wafer was then soft-baked (65° C./95° C.) for 5 minutes and exposed to UV light in an EVG620 mask aligner (EVG) loaded with a mask printed at 32,512 DPI resolution (Fineline Imaging). The wafer was then hard-baked (65° C./95° C.) for 15 minutes. The first layer of the microfluidic device consisted of the main channel with side boxes while the second layer contained arrays of staggered herringbone grooves. After all layers of photoresist were deposited, the wafer was developed under ultrasonic agitation to yield a master template for synthesis of the silicone elastomer enclosure. To produce this enclosure, PDMS elastomer was mixed with curing agent in a 10:1 ratio (by weight), poured onto the patterned wafer, degassed, and incubated at 80° C. overnight. The PDMS was then removed from the master, cut into individual devices, and bored with inlet/outlet tubing holes (750 μm diameter). The devices were washed in an ultrasonic bath with isopropanol for 20 minutes and then with Milli-Q water for 5 minutes. Devices were dried with filtered air.

Assembly of Single-Molecule Imaging Chip

Prior to assembly, the uncoated side of the borosilicate coverslip was taped to an alignment guide imprinted with a two-dimensional replica of the flow channel. An elastomer cover microfabricated with μm-precision by photolithography to match the exact size and shape of the flow channel was then placed on the coated side of the coverslip at the position of the channel replica on the alignment guide. This cover protects the PEG/biotin-PEG layer from oxygen plasma bombardment during the assembly procedure. The coated coverslip surface with elastomer cover and PDMS enclosure were placed inside a PE-25JW plasma etcher and treated with oxygen plasma for 30 seconds at 40 W RF power under 100 mTorr oxygen atmosphere. The elastomer cover was removed, and PDMS devices were then sealed to the coated side of the coverslip under a stereomicroscope with the alignment guide as a reference for the channel position. The microfluidic chip was incubated at 80° C. for 3 minutes to drive the bonding to completion.

Preparation of the Single-Molecule Imaging Chip

Reagent introduction, removal, and wash steps were performed in parallel under automated flow actuated by a multi-channel peristaltic pump (Ismatec). The single-molecule imaging chip was connected to inlet and outlet non-shrinkable Teflon tubing (internal diameter 0.015 in; Weico Wire and Cable) and infused with SMAC buffer. The inclusion of Tween-20 in the SMAC buffer further blocked non-specific protein absorption to the PDMS chamber and the capture surface. To evacuate any air trapped inside the PDMS channel, the chip was immediately degassed under vacuum for 1 minute. The chip was equilibrated with SMAC buffer at 50 μl/minute flow rate for 10 minutes. The chip was then incubated with NeutrAvidin (20 μl; 0.1 mg/ml; Thermo Fisher Scientific) in SMAC buffer for 10 minutes. The chip was washed with SMAC buffer (1 ml) at 500 μl/minute and incubated for 30 minutes with biotinylated antibodies (2 μl; 0.1-1 mg/ml) in SMAC buffer with 0.1 mg/ml BSA ($SMAC^{BSA}$ buffer). The chip was then washed with $SMAC^{BSA}$ buffer (1 ml) at 500 μl/minute and ready for sample circulation.

Sample Circulation in the Single-Molecule Imaging Chip

Continuous oscillating flow was actuated by a multi-channel bidirectional AL-8000 syringe pump (World Precision Instruments) connected to the single-molecule imaging chip via a 26-gauge 1-cc syringe (Becton Dickinson). The single-molecule imaging chip was connected at the other tubing port to the sample prepared in $SMAC^{BSA}$ buffer. For oscillating flow, the blood sample was diluted to anywhere between 2% to 50% with T50-BSA buffer in 200-500 μl final volume. Although 200-500 μl final sample volumes were used in, the single-molecule imaging chip can accommodate volumes up to 10 ml without significant loss in sensitivity because of its oscillating flow scheme and efficient target capture. By contrast, most other methods are unable to reliably detect proteins in sample volumes much greater than 100 μl. The syringe pump was programmed to carry out repeated infusion/withdrawal cycles at 500 μl/minute for 2-4 hours. Afterwards, the single-molecule imaging chip was washed with T50-BSA buffer (1 ml) at 500 μl/minute, incubated with fluorophore-labeled detection antibodies (1-10 nM) for 30 minutes, and then washed with T50 buffer (1 ml) at 500 μl/minute again. For circulation of clinical plasma samples, the prostate cancer patient samples were diluted 50 times. HSIL patient samples were diluted two times. HGSOC patient samples were diluted two times for p53 detection $10^3$-$10^6$ times for anti-p53 autoantibody detection. For circulation of mouse samples, serum was diluted four times. All dilutions were carried out in $SMAC^{BSA}$ buffer. For experiments involving human samples, ~$10^4$-fold excess IgG matched to the isotypes of the capture and detection antibodies was further added to reduce non-specific binding.

Single-Molecule TIRF Microscopy

An objective-based TIRF setup was employed with a PlanApo 60× oil objective (Olympus) of high numerical aperture (1.45). While acquiring data, a 1.6× field lens was used to capture single-molecule images at 96× total magnification. The incident laser angle was adjusted to full TIRF mode with a prism. Flow channels in the single-molecule imaging chip were identified under brightfield illumination. An imaging region of 15×15 µm² was then set. An electron multiplying charge-coupled device camera (Andor) was programmed to capture a consecutive time stream of 500 frames with 50 ms exposure time under continuous laser excitation of 40-140 W/cm². Immediately prior to imaging, laser power and TRF angles were measured to confirm that they were consistent. After imaging each region, the stage was displaced 80 µm down the length of the channel, and imaging was performed again as above. This process was repeated until at least 10 view fields were recorded per sample. Data were acquired with custom journals written in MetaMorph software (Molecular Devices).

Integrated Intensity Analysis.

This method was used to quantify relatively abundant proteins-of-interest (e.g. >10 fM) across a wide dynamic range (6-9 logs). Single-molecule TIRF data were first recorded using a camera EM gain setting of 300. The EM gain of the camera (i.e., 300, 10, or 1) was chosen according to predefined criteria based on the standard curve for that protein. These criteria were set such that the florescence for the sample would fall within the linear range of the standard curve for that EM gain setting.

Single-Molecule Shape Analysis

This method was used for rare proteins-of-interest to correct detection errors due to diffusive background and non-specific binding. The first 50-100 frames of each TIRF image were initially averaged to reduce background fluorescence from compounds arbitrarily deposited on the microfluidic capture chip, as these compounds bind weakly and rapidly dissociate from the chip. The total number of fluorescent spots over 10 view fields were measured in order to maximize sensitivity for rare target proteins. Single-molecule data were interpreted with the ThunderSTORM plug-in in ImageJ software (Ovesny et al., 2014 *Bioinformatics* 30:2389-2390). In ThunderSTORM, a wavelet filter was applied to remove noise and automatically identify fluorescent spots at a constant low threshold for each sample independent of the target protein. A low threshold setting was chosen in order to ensure that all potential target spots were selected regardless of variations in laser illumination intensity.

The major principle behind shape analysis is that, because target proteins are pulled down as complexes by multivalent antibodies via NeutrAvidin adapters, the shape of fluorescent spots, each represented in coordinates of (I, measured in number of photons) and diffraction-limited spot size (measured by the σ of the Gaussian fitting of the spot), was non-identical between real signals and false signals from diffusive and non-specifically absorbed antibody molecules. Therefore, a raw SMAC image can be deconvoluted into its real and false (i.e. background) components. To do so, each selected spot in the raw SMAC image was converted into an I-σ coordinate and sorted each spot into its respective bin in a 2D I-σ histogram. Each bin i of this histogram contains both real and false spots, adding up to a total of $T_i$ spots. The next step in the analysis is to determine the number of false spots in each bin. For each target protein under different conditions, single-molecule imaging was performed on control samples lacking the target protein. For experiments involving aqueous buffer and cell supernatant, $SMAC^{BSA}$ buffer and culture medium, respectively, were used as reference samples. For animal experiments, serum from naïve mice was used as reference samples. For experiments involving human blood, plasma from multiple independent healthy blood donors was used as reference samples.

The identified spots in these control images were also sorted into bins in a 2D I-σ histogram. Each bin of this reference histogram contains only false spots. By running this assay and analysis procedure on a large set of reference samples (e.g. buffer only or blood samples from many individual healthy donors), the mean ($R_i^\mu$) and standard deviation ($R_i^{SD}$) of the number of spots in each bin was calculated. To correct detection errors and compute the number of real spots ($C_i^\mu$) for each bin, the following formula was used: $C_i^\mu = T_i - (R_i^\mu + n \times R_i^{SD})$, where n can be adjusted the control the maximum number of projected false spots in each bin. For this study, n=2 was chosen, as statistically there is a <3% chance that the number of false spots in each bin exceeds $R_i^\mu + 2R_i^{SD}$. The total number of real spots was reported as 'SR counts', which was calculated by summing $C_i^\mu$ for every bin of the test sample 2D histogram. A sample was considered to be positive if the number of counts two standard deviations below the mean number of SR counts was ≥1 (i.e. statistically a 97.5% probability of SR counts ≥1 across multiple independent experiments with the same sample).

Analysis of Protein Aggregation

Various GFP-fused mutant p53 ($p53^{R175}$, $p53^{L344P}$) or wildtype p53 were expressed in a p53-deficient cell line, BHK21. The concentrations of p53 in the cell lysates were normalized by on denaturing SDS-PAGE. Serial dilutions were performed based on these normalized concentrations. Individual fluorescent spots were initially selected on the first imaging frame using ThunderSTORM for the various p53 protein conformational variants at different concentrations. Because the conformational variants produce spots with distinct intensity distributions, intensity histograms were generated from these spots, and Gaussian fitting was applied to identify curves for different structural populations of p53 (e.g., monomer, dimer, tetramer, octamer). The areas under the curve for populations greater than or equal to tetramer were integrated and defined as aggregates. The structural compositions of p53 in each sample were hence determined based on the relationship between percentage of aggregates and spot number. Although spot number is directly influenced by protein concentration, the relationship between protein concentration and spot number varies depending on p53 conformation (for example, monomers yield a larger number of imaging spots than aggregates for any given total p53 protein concentration). The spread of intensity distributions allowed us to distinguish among the different p53 variants; mutant $p53^{R175H}$ aggregates had a wider dispersion of fluorescent spot intensities compared to wildtype p53, which likewise had a wider dispersion than mutant $p53^{L344P}$ monomers. The dispersion of these intensity distributions was quantified using the Fano factor, defined as the variance in intensity of an image divided by the mean intensity. The Fano factor serves as an index of aggregation status. For instance, p53$^{R175H}$ complexes showed a higher Fano factor than p53$^{L344P}$ monomers. There was a linear relationship between Fano factor and spot number for all p53 conformational variants, each with distinct slopes. Therefore, by plotting standard curves for Fano factor versus spot number for each of the conformational variants, the aggregation status of p53 could be determined.

p53 Autoantibody Detection

Recombinant human p53 protein was biotinylated with EZ-Link Sulfo-NHS-Biotin reagent and purified by gel filtration chromatography on 7 kD columns as described above. Biotinylated protein was stored at −20° C. in PBS containing 20% glycerol and 0.1% sodium azide. The purified biotinylated protein was coated in one channel of a dual-channel single-molecule microfluidic capture chip via a streptavidin linker (Thermo Fisher Scientific); the other channel was kept uncoated as a background control. Streptavidin was used instead of NeutrAvidin (a deglycosylated form of avidin protein found in chicken egg white) since most individuals had large amounts of circulating anti-NeutrAvidin IgG, probably because these people eat eggs. Human plasma samples were diluted $10^3$-$10^6\times$ in SMAC$^{BSA}$ buffer and passed continuously through both channels of the single-molecule imaging chip for 2 hours by oscillating flow. The chip was then washed with SMAC$^{BSA}$ buffer (1 ml) and incubated with Alexa Fluor 488-labeled goat anti-human IgG (1-10 nM) for 30 minutes. The chip was washed again and visualized by TIRF microscopy. The spots in the uncoated channel reflected the amount of basal human IgG deposited on the chip via non-specific binding. Autoantibody levels were hence calculated by subtracting this number of non-specific IgG counts from total counts in the p53-coated channel.

qPCR

Serum DNA was extracted with the Plasma/Serum Cell-Free Circulating DNA Purification Micro Kit (Norgen Biotek) according to the manufacturer's instructions. Briefly, 50 µl of mouse serum was collected and eluted with nuclease-free water (50 µl). The eluate (2 µl) was then used for PCR amplification with 2×SsoFast EvaGreen Supermix (Bio-Rad) (10 µl), 5 µM GFP primer mix (2 µl), and nuclease-free water (6 µl) on a CFX96 qPCR system (Bio-Rad) with the following thermal cycling conditions: 98° C. for 1 minute followed by 60 cycles of 98° C. for 5 seconds and 60° C. for 10 seconds. A melt curve was performed from 65° C. to 95° C. To generate qPCR standard curves for gfp and p53, gfp and hp53 plasmid DNA (2 pg), respectively, were serially diluted. Standard curves displayed cycle threshold ($C_t$) values as a function of DNA copy number. Primer pairs for p53 qPCR were: 5' CCTTGCCGTCC-CAAGCA 3' (forward; SEQ ID NO:1) and 5' GTGTAG-GAGCTGCTGGTG 3' (reverse; SEQ ID NO:2). Primer pairs for GFP qPCR were: 5' ACGTAAACGGC-CACAAGTTC 3' (forward; SEQ ID NO:3) and 5' AAGTCGTGCTGCTTCATGTG 3' (reverse; SEQ ID NO: 4).

p53 Native Protein Gel Electrophoresis

BHK21 cells were transfected using Lipofectamine 2000 with mutant or wildtype p53 constructs (0.1-20 µg DNA) in 6-well plates. After 16 hours, lysate was prepared as described above with 18 mM CHAPS in TBS containing DNase and protease inhibitor. Lysate was added with 20% glycerol and 5 mM Coomassie G-250 dye then loaded onto a 3-12% native PAGE Bis-Tris gel (Invitrogen). Electrophoresis was performed in 50 mM Bis-Tris and 50 mM Tricine plus 0.02% Coomassie G-250 dye in the cathode buffer for 2 hours at 100 V. Proteins were transferred to a polyvinylidene membrane and stained with Coomassie G-250 dye. The membrane was fixed with 8% acetic acid for 20 minutes and destained with 100% methanol. p53 proteins were detected by immunoblot with DO-1 antibodies and HRP-conjugated anti-mouse secondary antibodies.

Isolation of Nuclear and Cytoplasmic Fractions from Cancer Cells

Human ovarian cancer cells (OVCAR3) were dissociated using 0.05% trypsin (Thermo Fisher Scientific) with mechanical agitation and washed with PBS. Cells were centrifuged at 400×g for 5 minutes and then resuspended at a concentration of $10^6$ cells/ml in lysis buffer (10 mM HEPES pH 7.5, 10 mM KCl, 0.1 mM EDTA, 1 mM DTT, 0.5% NP-40, and protease inhibitor cocktail (Sigma-Aldrich)). Cells were incubated on ice for 15 minutes, vortexed vigorously to disrupt the plasma membrane, and then centrifuged at 12,000×g for 10 minutes at 4° C. The resulting supernatant was collected as the cytoplasmic fraction and stored at −20° C. The pellet contained the nuclear fraction and was washed with lysis buffer and then resuspended in nuclear extraction buffer (20 mM HEPES pH 7.5, 400 mM NaCl, 1 mM EDTA, 1 mM DTT, and protease inhibitor cocktail). The solution was incubated on ice for 30 minutes. The solution was then centrifuged at 12,000×g for 15 minutes at 4° C., and the resulting supernatant was collected as the nuclear extract.

Exosome Isolation

Human ovarian cancer cells (OVCAR3) were cultured for 24 hours in reduced-serum medium (Opti-MEM, Thermo Fisher Scientific). Supernatant was collected, centrifuged at 2,000×g for 30 minutes to remove debris, and then filtered through a 0.22 µm membrane. Exosomes were purified using Total Exosome Isolation reagent (Thermo Fisher Scientific). 500 µl of the reagent was added per ml of supernatant, mixed thoroughly, and incubated at 4° C. overnight. The supernatant was then centrifuged at 10,000×g for 1 hour at 4° C. The resulting supernatant was discarded, and exosomes were collected in the pellet. The pellet was resuspended in lysis buffer (Abcam) for SMASH.

Absolute Threshold Analysis for Direct Fluorescence Spot Counting

This analysis method was employed for relatively abundant target proteins and for comparison with the shape analysis algorithm. Single-molecule TIRF data were analyzed with the ThunderSTORM plug-in in ImageJ software (Ovesny et al., 2014 *Bioinformatics* 30:2389-2390). An absolute threshold was applied to filter out low intensity spots over 500 time-averaged imaging frames. The absolute threshold was set individually for each target protein. To determine the threshold for a particular target molecule, a calibration test similar to that described in FIG. 3A, B was performed with two groups: (1) a defined concentration of the target protein in buffer (positive control), and (2) buffer only without the target protein (negative control). The algorithm described above was applied to both groups, and the number of counts per field in each control was calculated over threshold intensities ranging from $10^3$ to $1.6 \times 10^4$. The number of counts per field in the positive control was divided by that in the negative control at each threshold value to compute the signal-to-noise score for that threshold value. The threshold that yielded the highest signal-to-noise score was chosen for absolute threshold analysis of the particular target protein. Spots within a cutoff distance of 20 nm across multiple frames were then identified as the same fluorescence spots.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for detecting a target polypeptide in a fluid sample, the method comprising:
    providing a microfluidic chip comprising a) a capture surface comprising a plurality of multi-valent capture antibodies, wherein said capture surface has a side comprising a biotin-poly(ethylene)glycol (PEG) coating, wherein said capture antibodies are conjugated to said biotin-PEG moieties via a deglycosylated avidin linker, and wherein said avidin linker conjugates a plurality of capture antibodies to each biotin moiety on said biotin-PEG coating; and b) a chip enclosure comprising a flow channel disposed on said capture surface, wherein said flow channel is in fluid contact with said capture surface, and wherein said flow channel comprises staggered herringbone grooves on an inner channel surface;
    infusing the fluid sample through the flow channel of said microfluidic chip, wherein said target polypeptide, when present in said fluid sample, binds to said capture antibodies;
    infusing fluorophore-labeled detection antibodies through the flow channel of said microfluidic chip, wherein said target polypeptide, when bound to said capture antibodies, binds to said fluorophore-labeled detection antibodies;
    imaging the presence or absence of said fluorophore-labeled detection antibodies in at least 10 regions of said capture surface, wherein said imaging comprises time-stream total internal reflection (TIRF) microscopy, wherein said imaging can spatially resolve individual clusters of target proteins, and wherein each cluster is a fluorescent spot;
    performing a fluorescent shape analysis, wherein the fluorescent shape analysis comprises determining a number of fluorescent counts, wherein said determining comprises generating 2D scatter plots of σ and intensity of each fluorescence spot, converting said 2D scatter plots into 2D histograms, converting said 2D scatter plots into a heat map, and correcting for detection errors; and
    determining the presence of said target polypeptide, wherein said number of fluorescent counts corresponds to the presence of said target polypeptide.

2. The method of claim 1, wherein said target polypeptide is present in said sample in sub-femtomolar amounts.

3. The method of claim 1, wherein converting said 2D scatter plots into heat maps comprises calculating a mean count and standard deviation of count in each bin of said heat map.

4. The method of claim 1, wherein said correcting for detection errors comprises subtracting the mean of each bin by a sum of a mean count and two times a standard deviation of a reference sample.

5. The method of claim 1, wherein said infusing comprises an oscillating flow.

6. The method of claim 1, wherein said TIRF microscopy is single-molecule TIRF microscopy.

7. The method of claim 1, wherein each imaged region of said capture surface is about 80 μm apart.

8. The method of claim 1, wherein said sample is obtained from a human.

9. The method of claim 1, wherein said sample is a blood sample, a saliva sample, or a urine sample.

10. The method of claim 1, wherein said target polypeptide is a tumor-specific antigen.

11. The method of claim 10, wherein said tumor-specific antigen is a mutant p53.

12. The method of claim 10, wherein said tumor-specific antigen is an anti-p53 autoantibody.

* * * * *

```
                         SEQUENCE LISTING

<160> NUMBER OF SEQ ID NOS: 6

<210> SEQ ID NO 1
    <211> LENGTH: 17
    <212> TYPE: DNA
    <213> ORGANISM: Artificial
    <220> FEATURE:
    <223> OTHER INFORMATION: synthetic primer

<400> SEQUENCE: 1
ccttgccgtc ccaagca                                                  17

<210> SEQ ID NO 2
    <211> LENGTH: 18
    <212> TYPE: DNA
    <213> ORGANISM: Artificial
    <220> FEATURE:
    <223> OTHER INFORMATION: synthetic primer

<400> SEQUENCE: 2
gtgtaggagc tgctggtg                                                 18

<210> SEQ ID NO 3
    <211> LENGTH: 20
    <212> TYPE: DNA
    <213> ORGANISM: Artificial
    <220> FEATURE:
    <223> OTHER INFORMATION: synthetic primer

<400> SEQUENCE: 3
acgtaaacgg ccacaagttc                                               20

<210> SEQ ID NO 4
    <211> LENGTH: 20
    <212> TYPE: DNA
    <213> ORGANISM: Artificial
    <220> FEATURE:
    <223> OTHER INFORMATION: synthetic primer

<400> SEQUENCE: 4
aagtcgtgct gcttcatgtg                                               20

<210> SEQ ID NO 5
    <211> LENGTH: 29
    <212> TYPE: DNA
    <213> ORGANISM: Artificial
    <220> FEATURE:
    <223> OTHER INFORMATION: synthetic primer

<400> SEQUENCE: 5
aaaggatcca tggaggagcc gcagtcaga                                     29
```

```
<210> SEQ ID NO 6
<211> LENGTH: 29
<212> TYPE: DNA
<213> ORGANISM: Artificial
<220> FEATURE:
<223> OTHER INFORMATION: synthetic primer

<400> SEQUENCE: 6
aaagaattcc aggtggctgg agtgagccc                                             29
```